United States Patent
Thyer et al.

(10) Patent No.: US 12,493,855 B2
(45) Date of Patent: Dec. 9, 2025

(54) VALIDATION SYSTEM FOR CONVEYOR

(71) Applicant: Rehrig Pacific Company, Monterey Park, CA (US)

(72) Inventors: Daniel James Thyer, Charlotte, NC (US); Matthew Doucette, Parker, TX (US); Peter Douglas Jackson, Alpharetta, GA (US); Robert Lee Martin, Jr., Lucas, TX (US); Justin Michael Brown, Coppell, TX (US); Justin Corless, Flower Mound, TX (US); Swapna Muthuru, Frisco, TX (US); Carolina Lopez, Fort Worth, TX (US)

(73) Assignee: Rehrig Pacific Company, Monterey Park, CA (US)

( * ) Notice: Subject to any disclaimer, the term of this patent is extended or adjusted under 35 U.S.C. 154(b) by 0 days.

(21) Appl. No.: 18/977,458

(22) Filed: Dec. 11, 2024

(65) Prior Publication Data

US 2025/0200513 A1    Jun. 19, 2025

Related U.S. Application Data

(60) Provisional application No. 63/662,876, filed on Jun. 21, 2024, provisional application No. 63/563,918, (Continued)

(51) Int. Cl.
*G06Q 10/0875* (2023.01)
(52) U.S. Cl.
CPC ................ *G06Q 10/0875* (2013.01)
(58) Field of Classification Search
CPC ................................ G06Q 10/0875
See application file for complete search history.

(56) References Cited

U.S. PATENT DOCUMENTS

| | | |
|---|---|---|
| 1,086,727 A | 2/1914 | Palmer |
| 4,509,636 A | 4/1985 | Godbois |
| | (Continued) | |

FOREIGN PATENT DOCUMENTS

| | | |
|---|---|---|
| AU | 2021212010 A1 | 2/2022 |
| CN | 202729702 U | 2/2013 |
| | (Continued) | |

OTHER PUBLICATIONS

"Wave picking _Cancellation", Aug. 2020, https://community.sap.com/t5/supply-chain-management-q-a/wave-picking-cancellation/qaq-p/12256666, hereinafter "SAP" (Year: 2020).*

(Continued)

*Primary Examiner* — Allen C Chein
(74) *Attorney, Agent, or Firm* — Carlson, Gaskey & Olds, P.C.

(57) ABSTRACT

A pallet loading and validation system provides several features that are particularly beneficial in the context of a conveyor product distribution system, such as a pallet loading system, although some features are not exclusive to a conveyor system. In some aspects, the techniques described herein relate to a method for identifying a SKU of a package using a computer system having at least one processor, the method including: (a) taking at least one image of a package on a conveyor; (b) receiving the at least one image in the computer system; and (c) based upon the at least one image, the computer system determining a SKU associated with the package.

27 Claims, 28 Drawing Sheets

Related U.S. Application Data filed on Mar. 11, 2024, provisional application No. 63/559,839, filed on Feb. 29, 2024, provisional application No. 63/557,466, filed on Feb. 23, 2024, provisional application No. 63/611,198, filed on Dec. 17, 2023.

(56) References Cited

U.S. PATENT DOCUMENTS

| | | |
|---|---|---|
| 4,562,689 A | 1/1986 | Hannen |
| 4,575,989 A | 3/1986 | Hannen |
| 4,798,275 A | 1/1989 | Leemkuil et al. |
| 4,832,204 A | 5/1989 | Handy et al. |
| 5,018,339 A | 5/1991 | Hannen et al. |
| 5,140,795 A | 8/1992 | Steding |
| 5,188,210 A | 2/1993 | Malow |
| 5,450,709 A | 9/1995 | Steding |
| 5,623,808 A | 4/1997 | Franklin et al. |
| 5,701,722 A | 12/1997 | Franklin et al. |
| 5,730,252 A | 3/1998 | Herbinet |
| 6,026,378 A | 2/2000 | Onozaki |
| 6,626,634 B2 | 9/2003 | Hwang et al. |
| 6,721,762 B1 | 4/2004 | Levine et al. |
| 6,892,515 B2 | 5/2005 | Cere |
| 6,918,229 B2 | 7/2005 | Lancaster et al. |
| 7,097,045 B2 | 8/2006 | Winkler |
| 7,480,640 B1 | 1/2009 | Elad et al. |
| 7,548,166 B2 | 6/2009 | Roeder et al. |
| 7,557,714 B2 | 7/2009 | Roeder et al. |
| 7,602,288 B2 | 10/2009 | Broussard |
| 7,679,504 B2 | 3/2010 | Wang et al. |
| 7,698,179 B2 | 4/2010 | Leung et al. |
| 7,739,147 B2 | 6/2010 | Branigan et al. |
| 7,765,668 B2 | 8/2010 | Townsend et al. |
| 7,865,398 B2 | 1/2011 | Schon |
| 7,877,164 B2 | 1/2011 | Grunbach et al. |
| 7,882,366 B2 | 2/2011 | Sen et al. |
| 8,494,673 B2 | 7/2013 | Miranda et al. |
| 8,718,372 B2 | 5/2014 | Holeva et al. |
| 8,739,502 B2 | 6/2014 | Lancaster, III |
| 8,839,132 B2 | 9/2014 | Reichert |
| 8,849,007 B2 | 9/2014 | Holeva et al. |
| 8,885,948 B2 | 11/2014 | Holeva et al. |
| 8,892,241 B2 | 11/2014 | Weiss |
| 8,908,995 B2 | 12/2014 | Benos et al. |
| 8,918,976 B2 | 12/2014 | Townsend et al. |
| 8,934,672 B2 | 1/2015 | Holeva et al. |
| 8,938,126 B2 | 1/2015 | Holeva et al. |
| 8,965,559 B2 | 2/2015 | Pankratov et al. |
| 8,977,032 B2 | 3/2015 | Holeva et al. |
| 8,978,984 B2 | 3/2015 | Hennick et al. |
| 8,995,743 B2 | 3/2015 | Holeva et al. |
| 9,025,827 B2 | 5/2015 | Holeva et al. |
| 9,025,886 B2 | 5/2015 | Holeva et al. |
| 9,082,195 B2 | 7/2015 | Holeva et al. |
| 9,087,384 B2 | 7/2015 | Holeva et al. |
| 9,171,278 B1 | 10/2015 | Kong et al. |
| 9,224,120 B2 | 12/2015 | Grabiner et al. |
| 9,367,827 B1 | 6/2016 | Lively et al. |
| 9,373,098 B2 | 6/2016 | Nashif et al. |
| 9,481,516 B1 * | 11/2016 | Kraus .................... B65G 47/82 |
| 9,488,466 B2 | 11/2016 | Hanson |
| 9,488,986 B1 | 11/2016 | Solanki |
| 9,489,655 B1 | 11/2016 | Lecky |
| 9,503,704 B2 | 11/2016 | Toshiyuki |
| 9,505,554 B1 | 11/2016 | Kong et al. |
| 9,725,195 B2 | 8/2017 | Lancaster, III et al. |
| 9,727,840 B2 | 8/2017 | Bernhardt |
| 9,734,367 B1 | 8/2017 | Lecky et al. |
| 9,811,632 B2 | 11/2017 | Grabiner et al. |
| 9,821,344 B2 | 11/2017 | Zsigmond et al. |
| 9,826,213 B1 | 11/2017 | Russell et al. |
| 9,830,485 B1 | 11/2017 | Lecky |
| 9,944,417 B2 | 4/2018 | Lemieux et al. |
| 9,969,572 B2 | 5/2018 | Pankratov et al. |
| 9,984,339 B2 | 5/2018 | Hance et al. |
| 9,990,535 B2 | 6/2018 | Phillips et al. |
| 10,005,581 B2 | 6/2018 | Lancaster, III et al. |
| 10,026,044 B1 | 7/2018 | Wurman et al. |
| 10,042,079 B2 | 8/2018 | Patnaik |
| 10,055,805 B2 | 8/2018 | Satou |
| 10,071,856 B2 | 9/2018 | Hance et al. |
| 10,089,509 B2 | 10/2018 | Nachtrieb |
| 10,133,990 B2 | 11/2018 | Hance et al. |
| 10,134,120 B2 | 11/2018 | Jovanovski et al. |
| 10,140,724 B2 | 11/2018 | Benos et al. |
| 10,155,199 B2 | 12/2018 | Sakai et al. |
| 10,198,653 B2 | 2/2019 | Kotula |
| 10,198,805 B2 | 2/2019 | Halata |
| 10,217,075 B1 | 2/2019 | Ward et al. |
| 10,220,970 B2 | 3/2019 | Lemieux et al. |
| 10,227,152 B2 | 3/2019 | Lancaster, III et al. |
| 10,229,301 B2 | 3/2019 | Cumoli et al. |
| 10,229,487 B2 | 3/2019 | Goyal et al. |
| 10,265,871 B2 | 4/2019 | Hance et al. |
| 10,266,349 B2 | 4/2019 | Pankratov et al. |
| 10,280,009 B2 | 5/2019 | Taylor et al. |
| 10,328,578 B2 | 6/2019 | Holz |
| 10,346,987 B1 | 7/2019 | Landman |
| 10,347,095 B2 | 7/2019 | Mattingly et al. |
| 10,363,664 B2 | 7/2019 | Yoshii |
| 10,369,701 B1 | 8/2019 | Diankov et al. |
| 10,402,956 B2 | 9/2019 | Jovanovski et al. |
| 10,430,969 B2 | 10/2019 | Kopelke et al. |
| 10,442,640 B2 | 10/2019 | Pankratov et al. |
| 10,456,915 B1 | 10/2019 | Diankov |
| 10,482,401 B2 | 11/2019 | Wurman et al. |
| 10,491,881 B1 | 11/2019 | Russell et al. |
| 10,504,343 B2 | 12/2019 | Mattingly et al. |
| 10,518,973 B2 | 12/2019 | Hance et al. |
| 10,562,188 B1 | 2/2020 | Diankov et al. |
| 10,562,189 B1 | 2/2020 | Diankov et al. |
| 10,569,416 B1 | 2/2020 | Diankov |
| 10,569,417 B1 | 2/2020 | Diankov |
| 10,576,631 B1 | 3/2020 | Diankov |
| 10,592,842 B2 | 3/2020 | High et al. |
| 10,596,701 B1 | 3/2020 | Diankov |
| 10,607,182 B2 | 3/2020 | Shah et al. |
| 10,614,319 B2 | 4/2020 | Douglas et al. |
| 10,616,553 B1 | 4/2020 | Russell et al. |
| 10,618,172 B1 | 4/2020 | Diankov et al. |
| 10,621,457 B2 | 4/2020 | Schimmel |
| 10,627,244 B1 | 4/2020 | Lauka et al. |
| 10,628,763 B2 | 4/2020 | Hance et al. |
| 10,643,038 B1 | 5/2020 | Mccalib, Jr. et al. |
| 10,643,170 B2 | 5/2020 | Lee et al. |
| 10,655,945 B2 | 5/2020 | Nanda et al. |
| 10,657,341 B2 | 5/2020 | Wilkinson |
| 10,679,379 B1 | 6/2020 | Diankov et al. |
| 10,685,197 B2 | 6/2020 | Plummer et al. |
| 10,703,584 B2 | 7/2020 | Diankov et al. |
| 10,703,585 B2 | 7/2020 | Pankratov et al. |
| 10,706,571 B2 | 7/2020 | Sugimura et al. |
| 10,724,973 B2 | 7/2020 | Paresi |
| 10,745,210 B2 | 8/2020 | Aljoe et al. |
| 10,759,599 B2 | 9/2020 | Hance et al. |
| 10,769,806 B2 | 9/2020 | Driegen et al. |
| 10,796,423 B2 | 10/2020 | Goja |
| 10,810,534 B2 | 10/2020 | Taylor et al. |
| 10,810,540 B1 | 10/2020 | Gopal et al. |
| 10,845,184 B2 | 11/2020 | Benos et al. |
| 10,845,499 B2 | 11/2020 | Paresi |
| 10,867,275 B1 | 12/2020 | Dholakia et al. |
| 10,984,207 B2 | 4/2021 | Sone et al. |
| 11,046,519 B2 | 6/2021 | Martin, Jr. et al. |
| 11,068,841 B1 | 7/2021 | Lui et al. |
| 11,087,160 B2 | 8/2021 | Martin, Jr. et al. |
| 11,087,273 B1 | 8/2021 | Bergamo |
| 11,205,059 B2 | 12/2021 | Wagner et al. |
| 11,227,458 B1 | 1/2022 | Farah et al. |
| 11,275,815 B2 | 3/2022 | Siani Cohen et al. |
| 11,308,616 B2 | 4/2022 | Ceballos Lentini et al. |
| 11,383,930 B2 | 7/2022 | Martin, Jr. et al. |
| 11,494,580 B2 | 11/2022 | Naito et al. |

(56) References Cited

U.S. PATENT DOCUMENTS

| | | |
|---|---|---|
| 11,531,953 B2 | 12/2022 | Taylor et al. |
| 11,542,047 B2 | 1/2023 | Parrucci |
| 11,620,607 B2 | 4/2023 | Yanagihashi et al. |
| 11,648,676 B2 | 5/2023 | Diankov et al. |
| 11,667,416 B2 | 6/2023 | Lancaster, III et al. |
| 11,685,605 B2 | 6/2023 | Makhal et al. |
| 11,724,895 B1* | 8/2023 | Kocheta .............. B07C 3/08 700/217 |
| 11,767,169 B2 | 9/2023 | Ericson et al. |
| 11,783,606 B2 | 10/2023 | Jackson et al. |
| 11,823,440 B2 | 11/2023 | Brown et al. |
| 11,868,947 B2 | 1/2024 | Taylor et al. |
| 11,922,253 B2 | 3/2024 | Jackson et al. |
| 11,972,624 B2 | 4/2024 | Jackson et al. |
| 2003/0200730 A1 | 10/2003 | Cere |
| 2004/0069850 A1 | 4/2004 | De Wilde |
| 2004/0220694 A1 | 11/2004 | Smith |
| 2005/0071234 A1 | 3/2005 | Schon |
| 2005/0138897 A1 | 6/2005 | Eldridge |
| 2005/0223683 A1 | 10/2005 | Cere' |
| 2005/0246056 A1 | 11/2005 | Marks et al. |
| 2006/0096244 A1 | 5/2006 | Cere' |
| 2006/0187041 A1 | 8/2006 | Olsen, III et al. |
| 2006/0242820 A1 | 11/2006 | Townsend et al. |
| 2006/0255949 A1 | 11/2006 | Roeder et al. |
| 2006/0255950 A1 | 11/2006 | Roeder et al. |
| 2007/0017986 A1 | 1/2007 | Carrender et al. |
| 2007/0126578 A1 | 6/2007 | Broussard |
| 2007/0156281 A1 | 7/2007 | Leung et al. |
| 2007/0163099 A1 | 7/2007 | Townsend et al. |
| 2007/0174148 A1 | 7/2007 | Schuler et al. |
| 2008/0046116 A1* | 2/2008 | Khan .............. B25J 9/1687 700/215 |
| 2008/0131255 A1 | 6/2008 | Hessler et al. |
| 2008/0267759 A1 | 10/2008 | Morency et al. |
| 2009/0008450 A1 | 1/2009 | Ebert et al. |
| 2009/0112675 A1 | 4/2009 | Servais |
| 2009/0293425 A1 | 12/2009 | Carter et al. |
| 2010/0127870 A1 | 5/2010 | Rinkes et al. |
| 2010/0150689 A1 | 6/2010 | Berry et al. |
| 2010/0176964 A1 | 7/2010 | Kobayashi et al. |
| 2010/0202702 A1 | 8/2010 | Benos et al. |
| 2010/0316470 A1 | 12/2010 | Lert et al. |
| 2011/0118130 A1 | 5/2011 | Loring et al. |
| 2011/0132800 A1 | 6/2011 | Cerf |
| 2011/0238207 A1 | 9/2011 | Bastian, II et al. |
| 2012/0057022 A1 | 3/2012 | Nechiporenko et al. |
| 2012/0106787 A1 | 5/2012 | Nechiporenko et al. |
| 2012/0175170 A1 | 7/2012 | Martin et al. |
| 2012/0175412 A1 | 7/2012 | Osborn |
| 2012/0274784 A1 | 11/2012 | Hofman |
| 2013/0017051 A1 | 1/2013 | Therkildsen |
| 2013/0063567 A1 | 3/2013 | Burns et al. |
| 2013/0101166 A1 | 4/2013 | Yoder |
| 2013/0101167 A1 | 4/2013 | Yoder |
| 2013/0101173 A1 | 4/2013 | Yoder |
| 2013/0101201 A1 | 4/2013 | Seelinger |
| 2013/0101202 A1 | 4/2013 | Seelinger |
| 2013/0101203 A1 | 4/2013 | Yoder |
| 2013/0101204 A1 | 4/2013 | Yoder |
| 2013/0101227 A1 | 4/2013 | Seelinger |
| 2013/0101228 A1 | 4/2013 | Yoder |
| 2013/0101229 A1 | 4/2013 | Yoder |
| 2013/0101230 A1 | 4/2013 | Yoder |
| 2013/0282165 A1 | 10/2013 | Pankratov et al. |
| 2013/0300047 A1 | 11/2013 | Hendren et al. |
| 2014/0197926 A1 | 7/2014 | Nikitin et al. |
| 2015/0101281 A1 | 4/2015 | Kudia |
| 2015/0102100 A1 | 4/2015 | Hattrup et al. |
| 2015/0149946 A1 | 5/2015 | Benos et al. |
| 2015/0166272 A1 | 6/2015 | Pankratov et al. |
| 2015/0325013 A1 | 11/2015 | Patnaik |
| 2015/0363758 A1 | 12/2015 | Wu et al. |
| 2016/0104274 A1 | 4/2016 | Jovanovski et al. |
| 2016/0104290 A1 | 4/2016 | Patnaik |
| 2016/0110630 A1 | 4/2016 | Heusch et al. |
| 2016/0154939 A1 | 6/2016 | Grabiner et al. |
| 2016/0260161 A1 | 9/2016 | Atchley et al. |
| 2016/0275441 A1 | 9/2016 | Barber et al. |
| 2016/0371512 A1 | 12/2016 | Hattrup et al. |
| 2017/0011364 A1 | 1/2017 | Whitman et al. |
| 2017/0032285 A1 | 2/2017 | Sharma et al. |
| 2017/0076469 A1 | 3/2017 | Sonoura et al. |
| 2017/0132773 A1 | 5/2017 | Toedtli |
| 2017/0154397 A1 | 6/2017 | Satou |
| 2017/0161673 A1 | 6/2017 | High et al. |
| 2017/0193432 A1 | 7/2017 | Bernhardt |
| 2017/0193434 A1 | 7/2017 | Shah et al. |
| 2017/0286876 A1 | 10/2017 | Tingler et al. |
| 2017/0286907 A1 | 10/2017 | Rizkallah et al. |
| 2017/0300742 A1 | 10/2017 | Wei et al. |
| 2017/0316253 A1 | 11/2017 | Phillips et al. |
| 2017/0323376 A1 | 11/2017 | Glaser et al. |
| 2018/0001481 A1 | 1/2018 | Shah et al. |
| 2018/0025185 A1 | 1/2018 | Hattrup et al. |
| 2018/0029797 A1 | 2/2018 | Hance et al. |
| 2018/0043547 A1 | 2/2018 | Hance et al. |
| 2018/0057284 A1 | 3/2018 | Carpenter et al. |
| 2018/0060630 A1 | 3/2018 | Nachtrieb |
| 2018/0060764 A1 | 3/2018 | Hance et al. |
| 2018/0089517 A1 | 3/2018 | Douglas et al. |
| 2018/0108120 A1 | 4/2018 | Venable et al. |
| 2018/0218247 A1 | 8/2018 | Lee et al. |
| 2018/0224569 A1 | 8/2018 | Paresi |
| 2018/0225597 A1 | 8/2018 | Hance et al. |
| 2018/0247404 A1 | 8/2018 | Goyal et al. |
| 2018/0253857 A1 | 9/2018 | Driegen et al. |
| 2018/0257879 A1 | 9/2018 | Pankratov et al. |
| 2018/0260772 A1 | 9/2018 | Chaubard et al. |
| 2018/0273226 A1 | 9/2018 | Lancaster, III et al. |
| 2018/0304468 A1 | 10/2018 | Holz |
| 2018/0314866 A1 | 11/2018 | Kotula |
| 2018/0314867 A1 | 11/2018 | Kotula |
| 2018/0322424 A1 | 11/2018 | Wurman et al. |
| 2018/0370046 A1 | 12/2018 | Hance et al. |
| 2018/0370727 A1 | 12/2018 | Hance et al. |
| 2019/0005668 A1 | 1/2019 | Sugimura et al. |
| 2019/0026878 A1 | 1/2019 | Jovanovski et al. |
| 2019/0034839 A1 | 1/2019 | Hance et al. |
| 2019/0041341 A1 | 2/2019 | Paresi |
| 2019/0049234 A1 | 2/2019 | Benos et al. |
| 2019/0080207 A1 | 3/2019 | Chang et al. |
| 2019/0102146 A1 | 4/2019 | Swift |
| 2019/0102654 A1 | 4/2019 | Trehan |
| 2019/0102874 A1 | 4/2019 | Goja |
| 2019/0122173 A1 | 4/2019 | Souder et al. |
| 2019/0156086 A1 | 5/2019 | Plummer et al. |
| 2019/0156316 A1 | 5/2019 | Simske et al. |
| 2019/0197561 A1 | 6/2019 | Adato et al. |
| 2019/0206059 A1 | 7/2019 | Landman |
| 2019/0220990 A1 | 7/2019 | Goja et al. |
| 2019/0236793 A1 | 8/2019 | Chan |
| 2019/0248604 A1 | 8/2019 | Pankratov et al. |
| 2019/0251385 A1 | 8/2019 | Kotula |
| 2019/0279017 A1 | 9/2019 | Graham et al. |
| 2019/0295385 A1 | 9/2019 | Mattingly et al. |
| 2019/0322451 A1 | 10/2019 | Bastian, II et al. |
| 2020/0005531 A1 | 1/2020 | Jiang |
| 2020/0034658 A1 | 1/2020 | Chung et al. |
| 2020/0039765 A1 | 2/2020 | Pankratov et al. |
| 2020/0074523 A1 | 3/2020 | Wang et al. |
| 2020/0087068 A1 | 3/2020 | Hance et al. |
| 2020/0104785 A1 | 4/2020 | Ehrman et al. |
| 2020/0105008 A1 | 4/2020 | Ehrman et al. |
| 2020/0130961 A1 | 4/2020 | Diankov et al. |
| 2020/0130962 A1 | 4/2020 | Yu et al. |
| 2020/0134828 A1 | 4/2020 | Diankov et al. |
| 2020/0134830 A1 | 4/2020 | Yu et al. |
| 2020/0139553 A1 | 5/2020 | Diankov et al. |
| 2020/0156254 A1 | 5/2020 | Li et al. |
| 2020/0202175 A1 | 6/2020 | Hieida et al. |
| 2020/0210768 A1 | 7/2020 | Turkelson et al. |
| 2020/0238517 A1 | 7/2020 | Diankov |
| 2020/0238519 A1 | 7/2020 | Diankov et al. |

(56) References Cited

U.S. PATENT DOCUMENTS

| | | |
|---|---|---|
| 2020/0265494 A1* | 8/2020 | Glaser .................... G06V 20/20 |
| 2020/0273131 A1 | 8/2020 | Martin, Jr. et al. |
| 2020/0283176 A1 | 9/2020 | Lancaster, III et al. |
| 2020/0294244 A1 | 9/2020 | Diankov et al. |
| 2020/0302207 A1 | 9/2020 | Perkins et al. |
| 2020/0302243 A1 | 9/2020 | Fryshman |
| 2020/0311362 A1 | 10/2020 | Plummer et al. |
| 2020/0334856 A1 | 10/2020 | Staudinger et al. |
| 2020/0356798 A1 | 11/2020 | Kotula |
| 2021/0004589 A1 | 1/2021 | Turkelson et al. |
| 2021/0009362 A1* | 1/2021 | Grupp ....................... B07C 3/08 |
| 2021/0042662 A1 | 2/2021 | Pu et al. |
| 2021/0070483 A1 | 3/2021 | Parrucci |
| 2021/0082220 A1 | 3/2021 | Boerger et al. |
| 2021/0125199 A1 | 4/2021 | Woodbeck et al. |
| 2021/0133666 A1 | 5/2021 | Eckman et al. |
| 2021/0149948 A1 | 5/2021 | Nayak |
| 2021/0198042 A1 | 7/2021 | Martin, Jr. et al. |
| 2021/0287109 A1 | 9/2021 | Cmielowski et al. |
| 2021/0326544 A1 | 10/2021 | Jackson et al. |
| 2021/0342708 A1 | 11/2021 | Klug et al. |
| 2021/0342857 A1 | 11/2021 | Tzur et al. |
| 2021/0350485 A1 | 11/2021 | Majumdar et al. |
| 2021/0357429 A1 | 11/2021 | Watson et al. |
| 2021/0398045 A1 | 12/2021 | Hanebeck |
| 2021/0403066 A1 | 12/2021 | Martin, Jr. et al. |
| 2022/0016779 A1 | 1/2022 | Wang et al. |
| 2022/0021803 A1 | 1/2022 | Miller et al. |
| 2022/0055840 A1 | 2/2022 | Schumacher |
| 2022/0058511 A1 | 2/2022 | McCusker et al. |
| 2022/0100935 A1 | 3/2022 | Chen |
| 2022/0121866 A1 | 4/2022 | Balch et al. |
| 2022/0122029 A1 | 4/2022 | Martin, Jr. et al. |
| 2022/0129836 A1 | 4/2022 | Jackson et al. |
| 2022/0219846 A1 | 7/2022 | Jackson et al. |
| 2022/0237530 A1* | 7/2022 | Franey ................. G06Q 10/047 |
| 2022/0250845 A1 | 8/2022 | Martin, Jr. et al. |
| 2023/0054508 A1 | 2/2023 | Brown et al. |
| 2023/0058363 A1 | 2/2023 | Reynolds et al. |
| 2023/0059103 A1 | 2/2023 | Jackson et al. |
| 2023/0096840 A1 | 3/2023 | Perkins et al. |
| 2023/0140119 A1 | 5/2023 | Jackson et al. |
| 2023/0147974 A1 | 5/2023 | Martin, Jr. et al. |
| 2023/0183019 A1 | 6/2023 | Pilney et al. |
| 2023/0252542 A1* | 8/2023 | Bjelcevic .................. G06T 7/55 |
| | | 705/26.61 |
| 2023/0259951 A1 | 8/2023 | Weintraub et al. |
| 2023/0360419 A1 | 11/2023 | Jackson et al. |
| 2024/0020957 A1 | 1/2024 | Brown et al. |
| 2024/0095650 A1 | 3/2024 | Taylor et al. |
| 2024/0127012 A1 | 4/2024 | Jackson et al. |
| 2024/0211712 A1* | 6/2024 | Barkan ................ G06K 7/1096 |
| 2024/0242470 A1* | 7/2024 | Yarlagadda .......... G07G 1/0018 |
| 2024/0290121 A1 | 8/2024 | Jackson et al. |
| 2024/0308711 A1 | 9/2024 | Jackson et al. |

FOREIGN PATENT DOCUMENTS

| | | |
|---|---|---|
| CN | 107516220 A | 12/2017 |
| CN | 109906486 A | 6/2019 |
| CN | 107944454 B | 9/2021 |
| CN | 215554778 U | 1/2022 |
| CN | 113377850 B | 4/2022 |
| CN | 114354637 A | 4/2022 |
| EP | 3399329 A1 | 11/2018 |
| EP | 3667356 A1 | 6/2020 |
| KR | 20100051156 A | 5/2010 |
| RU | 2708504 C1 | 12/2019 |
| TW | 201926167 A | 7/2019 |
| TW | 1755918 B | 2/2022 |
| WO | 2010123458 A1 | 10/2010 |
| WO | 2015004502 A1 | 1/2015 |
| WO | 2017040933 A1 | 3/2017 |
| WO | 2018166652 A1 | 9/2018 |
| WO | 2018195200 A1 | 10/2018 |
| WO | 2022052959 A1 | 3/2022 |

OTHER PUBLICATIONS

Laviale, "Deep Dive on KNN: Understanding and Implementing the K-Nearest Neighbors Algorithm", Mar. 2023, https://arize.com/blog-course/knn-algorithm-k-nearest-neighbor/ (Year: 2023).*

Decision on Appeal for U.S. Appl. No. 17/508,021 dated Nov. 20, 2024.

International Search Report and Written Opinion for International Application No. PCT/US2024/060367 dated Feb. 17, 2025.

* cited by examiner

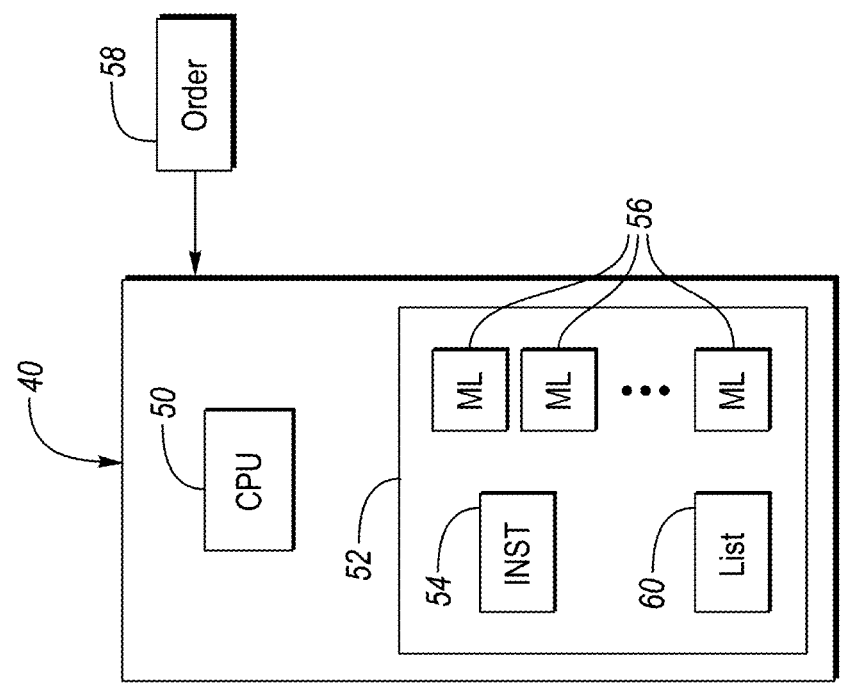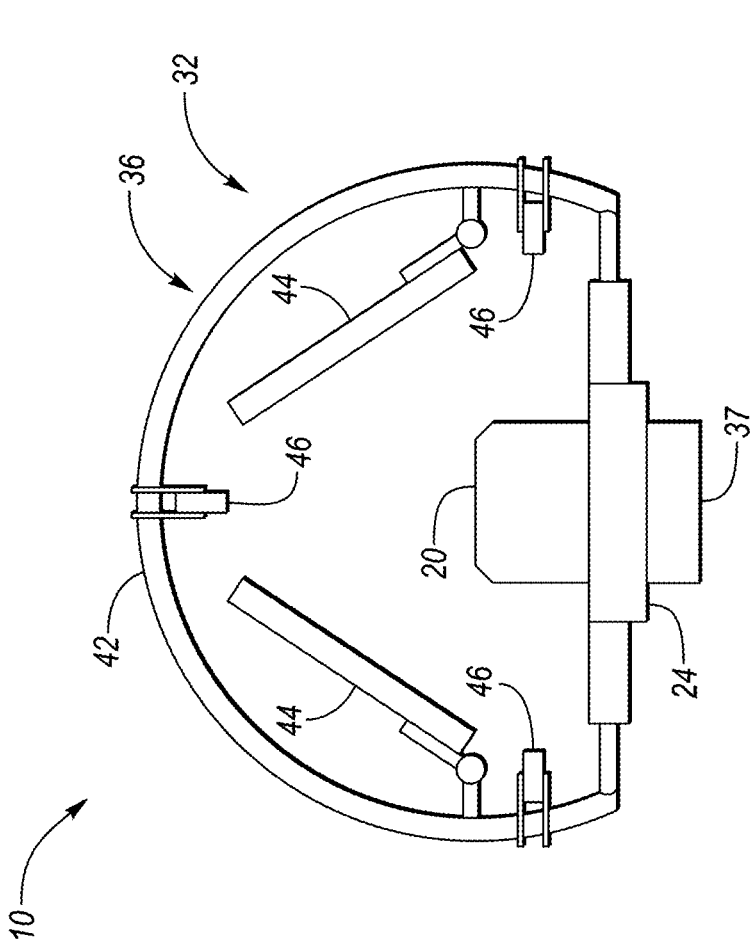
FIG. 2

| SKU | Description | Package Type | Brand |
|---|---|---|---|
| 818094006385 | 16OZ CN RKSTR XDRNC SS GRNAPL 1/24 | 16OZ_CN_1_24 | RKSTR XD SS GRNAP |
| 818094003926 | 16OZ CN RKSTR RVLT KLR CIT 1/24 | 16OZ_CN_1_24 | RKSTR RVLT KLR CT |
| 818094005258 | 16OZ CN RKSTR PRZR ORG 1/24 | 16OZ_CN_1_24 | RKSTR PRZR ORG |
| 078000017434 | 16.9OZ PL CRSH STW 6/4S | 16_9OZ_PL_PK_6_4S | CRSH STRW |
| 012000102059 | 16.9OZ PL MDEW CD RD 6/4S | 16_9OZ_PL_PK_6_4S | MDEW CD RD |
| 012000811197 | 16.9OZ PL PK PEPSI WLD CHRY 6/4S | 16_9OZ_PL_PK_6_4S | PEPSI WCHE |
| 818094005555 | 16OZ CN RKSTR XDRNC KW STW 1/24 | 16OZ_CN_1_24 | RKSTR XDRNC KWSTW |

62 — SKU column; 64 — Description column; 66 — Package Type column; 68 — Brand column

FIG. 3

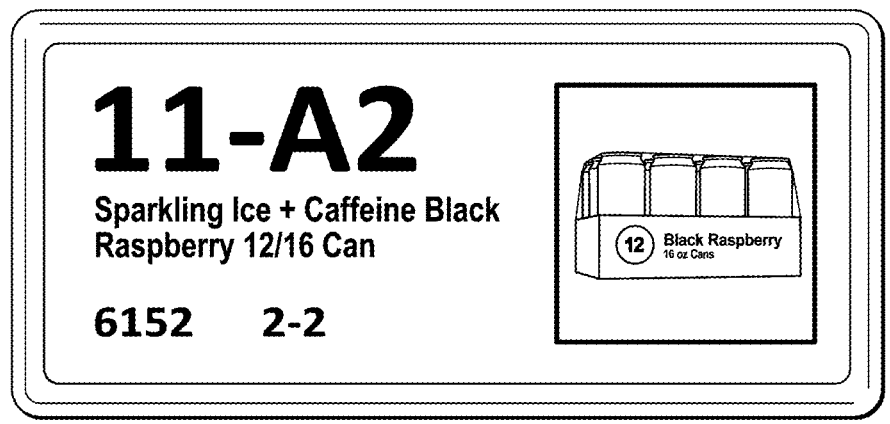
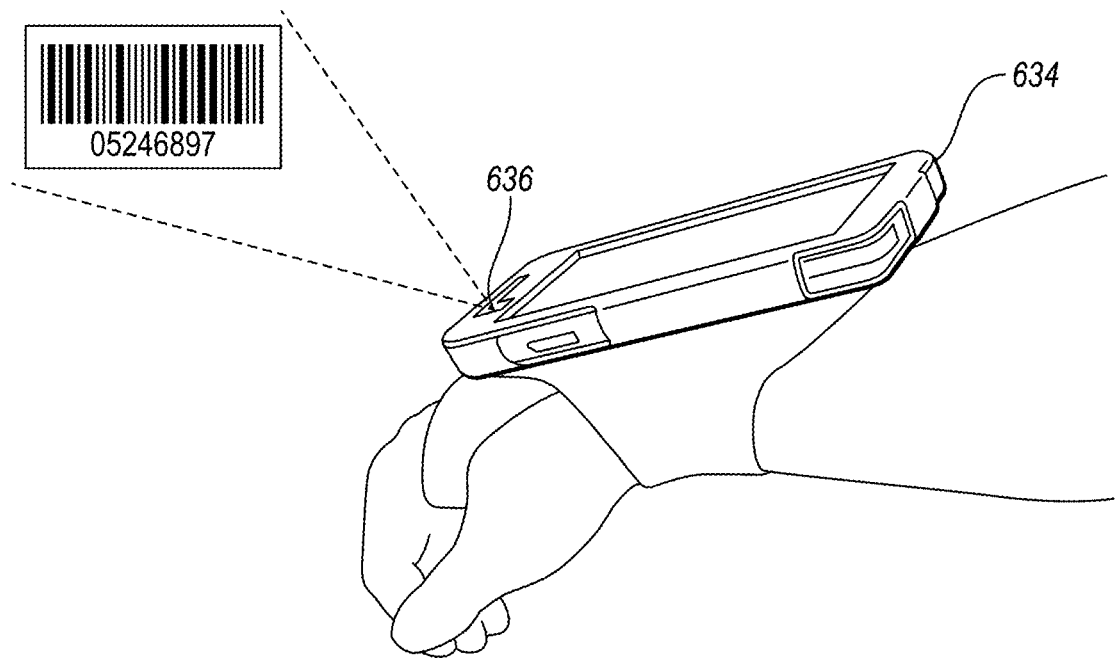
FIG. 20

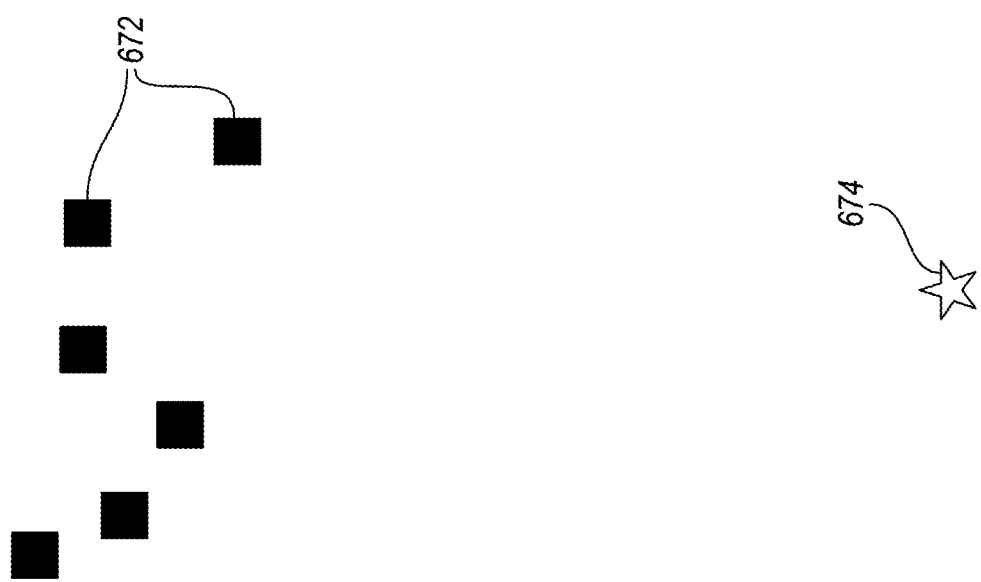
FIG. 25

VALIDATION SYSTEM FOR CONVEYOR

BACKGROUND

An existing pallet loading system instructs workers to pick packages associated with SKUs. The workers place the packages on a conveyor one at a time. The conveyor then delivers that package to an assigned pallet. This process is repeated to load the pallet with a plurality of packages of different SKUs based upon a pick list. The pick list indicates a quantity of each SKU that should be placed on a pallet.

The existing pallet loading system loads many (e.g. eighteen) pallets at a time. The system instructs the worker to pick a package associated with a particular SKU. The worker places a package associated with the requested SKU on a first conveyor. The package is then diverted from the first conveyor onto one of a plurality of second conveyors, each of which lead to a different one of the plurality of pallets. The package is diverted based upon the pick lists and based upon which SKU was instructed.

The system may include a rough check that the proper SKU was picked. For example, the height of the package may be roughly determined while traveling on the conveyor. If the height of the package on the conveyor does not match an expected height of the expected SKU, the conveyor stops and manual intervention is required. Sequential picks may be for packages of different expected heights to facilitate error detection.

The pick lists for each of the plurality of pallets in the current wave may be aggregated, so that all the packages associated with the same SKU for all the pallets in the current wave are picked at the same time. The proper quantity of each package associated with that SKU is diverted to the assigned pallets. The system then instructs a pick for a SKU with a different height, if possible, to discern the proper count of each package based on height.

Once the current wave of pallets is finished, then the pickers start picking for the next wave of pallets. The system includes a light beam (breakbeam sensor) spaced every five feet or so on the conveyor track to detect how far back the last product is placed on the conveyor. This information is used to see if that initial location on the conveyor is likely based on the slot location of the product. However, this logic prohibits the system from assigning more than one person to pick packages on the first conveyor. Additionally, the current system experiences frequent stoppages based upon detected package height differences.

SUMMARY

A product loading and validation system provides several features that are particularly beneficial in the context of a conveyor product distribution system, such as a pallet loading system. However, some features disclosed herein are not exclusive to a conveyor system and could be used in other validation systems in a distribution center (or other product validation).

In some aspects, the techniques described herein relate to a method for identifying a SKU of a package using a computer system having at least one processor, the method including: (a) taking at least one image of a package on a conveyor; (b) receiving the at least one image in the computer system; and (c) based upon the at least one image, the computer system determining a SKU associated with the package.

In some aspects, the techniques described herein relate to a method wherein the computer system stores a plurality of pick lists, wherein each pick list indicates a quantity of each of a plurality of desired SKUs to be placed on one of a plurality of pallets, the method further including: d) comparing the SKU determined in step c) with at least one of the plurality of desired SKUs.

In some aspects, the techniques described herein relate to a method wherein step d) includes comparing the SKU determined in step c) with the plurality of desired SKUs on the the plurality of pick lists.

In some aspects, the techniques described herein relate to a method further including: e) based upon the comparison in step d), directing the package toward one of the plurality of pallets.

In some aspects, the techniques described herein relate to a method wherein the computer system stores a plurality of pick lists, wherein each pick list indicates a quantity of each of a plurality of desired SKUs to be placed on one of a plurality of pallets, the method further including: d) comparing the SKU determined in step c) with at least one of the plurality of desired; e) based upon the comparison in step d), directing the package toward one of the plurality of pallets; f) instructing a pick of a first SKU of the plurality of desired SKUs of the plurality of pick lists, wherein the plurality of pick lists for the plurality of pallets are a first wave; g) receiving an instruction to close the first wave without the computer system determining that a package is associated with the first SKU in step c); and h) adjusting an invoice associated with one of the plurality of pallets based upon step g).

In some aspects, the techniques described herein relate to a method wherein the computer system stores a plurality of pick lists, wherein each pick list indicates a quantity of each of a plurality of desired SKUs to be placed on one of a plurality of pallets, the method further including: d) comparing the SKU determined in step c) with at least one of the plurality of desired SKUs; e) based upon the comparison in step d), directing the package toward one of the plurality of pallets; f) instructing a pick of a first SKU of the plurality of desired SKUs of the plurality of pick lists, wherein the plurality of pick lists for the plurality of pallets are a first wave; g) after step f), receiving an instruction to skip the pick of the first SKU; h) after step g), instructing a pick of a second SKU of the desired SKUs of the plurality of pick lists, wherein the first SKU is different from the second SKU; and i) after step h), instructing the pick of the first SKU.

In some aspects, the techniques described herein relate to a method wherein step a) is performed by an imaging system including at least one camera, the method further including: e) based upon the comparison in step d), directing the package to an area proximate the conveyor upstream of the imaging system.

In some aspects, the techniques described herein relate to a method further including: d) the computer system identifying an initial location of the package prior to step a); wherein step c) includes the computer system determining the SKU associated with the package based upon the initial location and based upon the at least one image.

In some aspects, the techniques described herein relate to a method wherein the initial location of the package in step d) is the initial location of the package on the conveyor.

In some aspects, the techniques described herein relate to a method wherein the initial location of the package on the conveyor is determined based upon a signal from at least one presence sensor on the conveyor.

In some aspects, the techniques described herein relate to a method wherein the initial location of the package in step d) is the initial location of the package prior to being placed on the conveyor.

In some aspects, the techniques described herein relate to a method wherein the initial location of the package is determined based upon at least one image.

In some aspects, the techniques described herein relate to a method wherein the initial location of the package is on one of a plurality of shelves.

In some aspects, the techniques described herein relate to a method wherein step c) includes the computer system inferring the SKU associated with the package using at least one machine learning model, wherein the computer system includes at least one non-transitory computer-readable media storing the at least one machine learning model, wherein the at least one machine learning model is trained with a plurality of images of packages.

In some aspects, the techniques described herein relate to a method wherein the computer system includes at least one non-transitory computer-readable media storing at least one machine learning model, wherein the at least one machine learning model is trained with a plurality of images of packages and wherein the method includes: d) the computer system inferring the SKU associated with the package using the at least one machine learning model; e) the computer system analyzing the at least one image using text matching; f) the computer system analyzing the at least one image using supervised contrastive learning and nearest neighbor methods; and g) the computer system determining the SKU associated with the package in step c) based upon at least one of step d), step e), or step f).

In some aspects, the techniques described herein relate to a method wherein step e) includes using a decision forest.

In some aspects, the techniques described herein relate to a method wherein step c) includes the computer system inferring a plurality of classifications each at a confidence level, the method further including: d) the computer system analyzing the image to detect text; and e) the computer augmenting the confidence level of at least one of the plurality of classifications based upon the text detected in step d), wherein the augmentation is based upon a number of classifications with which the detected text is associated.

In some aspects, the techniques described herein relate to a method wherein the at least one image in step a) is a plurality of images, the method further including: d) the computer system determining a SKU independently based upon each of the plurality of images; wherein in step c) the computer system determines the SKU associated with the package based upon the SKUs determined in step d).

In some aspects, the techniques described herein relate to a method wherein step d) includes the computer system inferring the SKU independently based upon each of the plurality of images using at least one machine learning model, wherein the computer system includes at least one non-transitory computer-readable media storing the at least one machine learning model, wherein the at least one machine learning model is trained with a plurality of images of packages.

In some aspects, the techniques described herein relate to a computing system for identifying a SKU of a package including: at least one processor; and at least one non-transitory computer-readable media storing: instructions that, when executed by the at least one processor, cause the computer system to perform the following operations: a) receiving at least one image of a package on a conveyor; b) identifying a SKU associated with the package based upon the at least one image; and c) comparing the SKU identified in step b) to at least one desired SKU.

In some aspects, the techniques described herein relate to a computing system wherein the at least one non-transitory computer-readable media stores at least one machine learning model that has been trained with a plurality of images of packages.

In some aspects, the techniques described herein relate to a computing system wherein the plurality of images of packages is a plurality of images of packages of beverage containers.

In some aspects, the techniques described herein relate to a computing system wherein the computer system stores a plurality of pick lists, wherein each pick list indicates a quantity of each of a plurality of desired SKUs to be placed on one of a plurality of pallets, wherein operation c) includes comparing the SKU determined in step b) with at least one of the plurality of desired SKUs.

In some aspects, the techniques described herein relate to a computing system wherein the operations further include: d) based upon the comparison in step c), directing the package toward one of the plurality of pallets.

In some aspects, the techniques described herein relate to a computing system wherein the operations further include: e) instructing a pick of a first desired SKU of the desired SKUs of the plurality of pick lists, wherein the plurality of pick lists for the plurality of pallets are a first wave; f) receiving an instruction to close the first wave without the computer system determining that a package is associated with the first desired SKU in operation c); and g) adjusting an invoice associated with one of the plurality of pallets based upon operation f).

In some aspects, the techniques described herein relate to a computing system wherein the operations further include: e) instructing a pick of a first desired SKU of the desired SKUs of the plurality of pick lists, wherein the plurality of pick lists for the plurality of pallets are a first wave; f) after operation e), receiving an instruction to skip the pick of the first desired SKU; g) after operation f), instructing a pick of a second desired SKU of the desired SKUs of the plurality of pick lists; and h) after operation g), instructing the pick of the first SKU.

In some aspects, the techniques described herein relate to a validation system including the computer system, the validation system further including an imaging system including at least one camera, the operations further including: d) based upon the comparison in operation c), directing the package to an area proximate the conveyor upstream of the imaging system.

In some aspects, the techniques described herein relate to a computing system wherein the operations further include: d) the computer system receiving an initial location of the package prior to operation b); wherein operation b) includes the computer system determining the SKU associated with the package based upon the initial location and based upon the at least one image.

In some aspects, the techniques described herein relate to a computing system wherein the initial location of the package in operation d) is the initial location of the package on the conveyor.

In some aspects, the techniques described herein relate to a validation system including the computer system, the validation system including at least one presence sensor on the conveyor, wherein the initial location of the package on the conveyor is determined based upon a signal from the at least one presence sensor on the conveyor.

In some aspects, the techniques described herein relate to a computing system wherein the initial location of the package in step d) is the initial location of the package prior to being placed on the conveyor.

In some aspects, the techniques described herein relate to a computing system wherein the initial location of the package is determined based upon at least one initial image.

In some aspects, the techniques described herein relate to a computing system wherein the initial location of the package is on one of a plurality of shelves.

In some aspects, the techniques described herein relate to a computing system wherein operation b) further includes inferring a plurality of classifications each at a confidence level, analyzing the image to detect text, and augmenting the confidence level of at least one of the plurality of classifications based upon the detected text, wherein the augmentation is based upon a number of classifications with which the detected text is associated.

In some aspects, the techniques described herein relate to a computing system wherein the at least one image is a plurality of images and wherein operation b) includes: d) determining at least one classification independently based upon each of the plurality of images; and e) identifying the SKU associated with the package based upon the classifications determined in step d).

In some aspects, the techniques described herein relate to a computing system wherein operation d) includes inferring the classifications independently based upon each of the plurality of images using at least one machine learning model, wherein the computer system includes at least one non-transitory computer-readable media storing the at least one machine learning model, wherein the at least one machine learning model is trained with a plurality of images of packages.

In some aspects, the techniques described herein relate to a method for identifying a SKU of a package using a computer system having at least one processor, the method including: a) receiving at least one image of a package in the computer system; b) the computer system generating an output based upon the at least one image using at least one machine learning model; c) the computer system comparing the output of step b) to a plurality of known outputs each having an associated known SKU using a nearest neighbor technique; and d) the computer system identifying a SKU of the package based upon step c).

In some aspects, the techniques described herein relate to a method wherein in step c) the computer system weighs each of the plurality of nearest neighbors based upon a distance of each of the plurality of nearest neighbors to the output of step b).

In some aspects, the techniques described herein relate to a method wherein the computer system determines that the SKU of the package is different from the SKUs of all the plurality of nearest neighbors.

In some aspects, the techniques described herein relate to a method wherein the computer system determines that the SKU of the package is a known SKU, but that an appearance of the known SKU has changed.

In some aspects, the techniques described herein relate to a computing system for identifying a SKU of a package including: at least one processor; and at least one non-transitory computer-readable media storing: instructions that, when executed by the at least one processor, cause the computer system to perform the following operations: a) receiving a plurality of overhead images of a package as it picked and placed on a conveyor; b) determining a location of the package in at least one of the plurality of images; and c) identifying a SKU associated with the package based upon the location.

In some aspects, the techniques described herein relate to a computing system further including: d) comparing the SKU identified in step c) to at least one desired SKU on at least one picklist.

In some aspects, the techniques described herein relate to a computing system further including an overhead camera configured to generate the plurality of images.

In some aspects, the techniques described herein relate to a computing system wherein the at least one non-transitory computer-readable media further stores at least one machine learning model and wherein the operations further include: d) receiving at least one package image of the package; e) generating an output based upon the at least one package image using the at least one machine learning model; and f) using the output to identify an associated SKU of a subsequent package.

In some aspects, the techniques described herein relate to a method for identifying a SKU of a package using a computer system having at least one processor, the method including: a) receiving at least one image of a package in the computer system; b) the computer system generating an output based upon the at least one image using an image feature extractor; c) the computer system comparing the output of step b) to a plurality of known outputs each having an associated known SKU using a feature similarity technique; and d) the computer system identifying a SKU of the package based upon step c).

In some aspects, the techniques described herein relate to a method wherein in step c) the computer system performs a nearest neighbor technique and weighs each of a plurality of known outputs based upon a distance of each of the plurality of known outputs to the output of step b).

In some aspects, the techniques described herein relate to a method wherein the computer system determines that the SKU of the package is different from the known SKUs associated with the plurality of known outputs.

In some aspects, the techniques described herein relate to a method wherein in step d) the computer system determines that the SKU of the package is a known SKU, but that an appearance of the known SKU has changed.

BRIEF DESCRIPTION OF THE DRAWINGS

FIG. 2 is an end view of the validation station and a schematic view of the computer of FIG. 1.

FIG. 3 shows sample text descriptions of a plurality of sample SKUs, including how SKUs are identified by both package type and brand.

FIG. 20 shows the mobile device of FIG. 19 secured to a worker's wrist.

FIG. 25 illustrates the SupCon and Nearest Neighbor method of FIG. 22 identifying a previously-unknown SKU.

DETAILED DESCRIPTION

Figure 1:
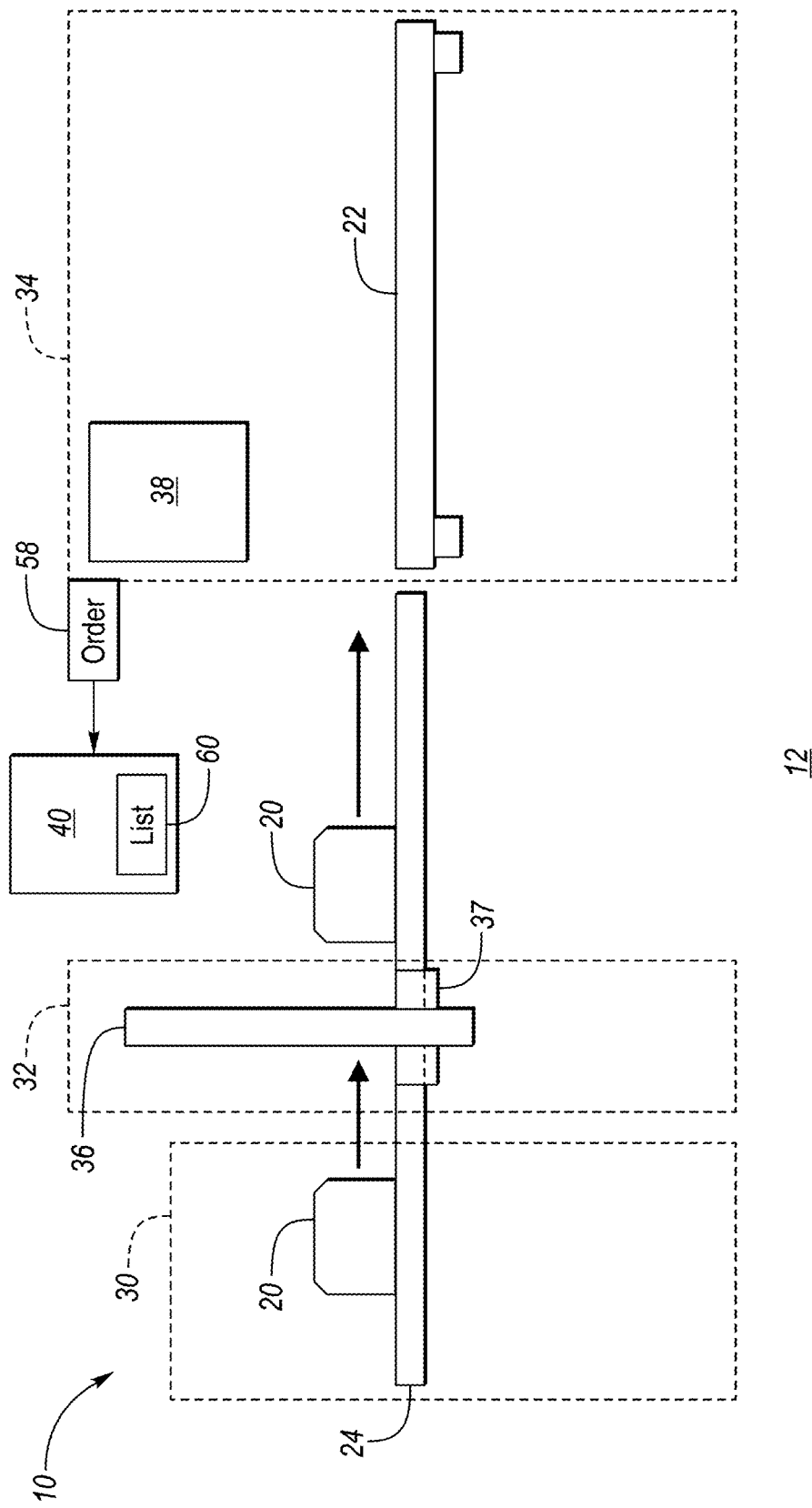
FIG. 1 is a side view of a simplified example of a pallet loading and validation system.

FIGS. 1 and 2 are highly simplified side and end views of portions of a pallet loading and validation system 10 installed at a distribution center 12. In this particular example, the distribution center 12 distributes packages 20, such as packages 20 of beverage containers, such as cans and bottles of soft drinks, beer, energy drinks, sports drinks, etc. on a pallet 22. The system could also be used with other types of packages or other products or other items.

There are many different packages 20 in the distribution center 12. Each package 20 is associated with one of a plurality of different Stock-Keeping Units or "SKUs." A SKU may be a single variation of a product that is available from the distribution center 12.

For example, each SKU may be associated with a particular package type, e.g. the number of containers (e.g. 12 pack, 24 pack) in a particular form (e.g. can vs bottle) and of a particular size (e.g. 24 ounces, 500 mL) optionally with a particular secondary container (cardboard vs reuseable plastic crate, cardboard tray with plastic overwrap, etc). In other words, the package type may specify both the size, quantity and type of primary packaging (can, bottle, etc, in direct contact with the beverage or other product) and any secondary packaging (crate, tray, cardboard box, etc, containing the plurality of primary packaging containers).

Each SKU may also be associated with a particular "brand," which in this case means the manufacturer and/or the specific variation, e.g. flavor, diet vs regular, caffeine vs no caffeine. The "brand" may also be considered to be the specific content of the primary package and secondary package (if any) for which there is a package type. Each of the plurality of available SKUs in the distribution center 12 is stored in at least one computer 40 (hereinafter "the computer 40"). FIG. 3 shows a plurality of SKUs stored on the computer 40 with associated information. Each SKU 62 may have an associated text description 64, an associated package type 66, and an associated brand 68. Each SKU 62 may also have associated dimensions (L×W×H), an associated weight, and an indication whether the SKU 62 is new to the system and/or has new packaging.

It is also possible that more than one variation of a product may share a single SKU, such as where only the packaging, aesthetics, and outward appearance of the product varies, but the content and quantity/size is the same. For example, sometimes promotional packaging may be utilized, which would have different image information for a particular SKU, but it is the same beverage in the same primary packaging with secondary packaging having different colors, text, and/or images. Alternatively, the primary packaging may also be different (but may not be visible, depending on the secondary packaging).

The packages 20 may also each have a UPC (Universal Product Code) or other barcode. For some SKUs, the UPC or barcode may be unique to that SKU. Other UPCs or barcodes may be shared among a plurality of SKUs. The UPC may not always uniquely distinguish packages 20 of different sizes, packaging, brands, or packaging. For example, a barcode or UPC on a beverage can may be unique, but the package being sold may be a 24-pack of those cans or an 18-pack of those cans.

Turning back to FIGS. 1 and 2, the pallet loading and validation system 10 includes a picking station 30, a validation station 32 and a loading station 34. A conveyor 24 provides an upper surface on which workers place packages 20 at the picking station 30. The conveyor 24 carries the packages 20 from the picking station 30 to the validation station 32 and then to the loading station 34.

The computer 40 receives an order 58 from a store and generates at least one pick list 60 (and more likely, a plurality of pick lists 60). Each pick list 60 indicates a quantity of each of a plurality of SKUs to be placed on a pallet 22. The computer 40 may determine a loading sequence and instructs the worker (via a display or audible commands or indicators) SKU by SKU what to place on the conveyor 24 at the picking station 30.

As should be recognized, FIGS. 1 and 2 are highly simplified. As will be shown later below, there would often be a plurality of conveyors 24 leading from a plurality of picking stations 30. The conveyors 24 may merge at some points and then branch at other points. There may be a plurality of validation stations 32 and a plurality of loading stations 34. Many different configurations are known or could be implemented and would be within the scope of the inventions described herein. The validation systems and methods described herein could be used with many different configurations of loading and picking systems.

Referring to FIG. 1, the validation station 32 includes an imaging system 36 configured to image a package 20 on the conveyor 24 proximate the imaging system 36. The validation station 32 optionally includes a scale 37 configured to weigh the package 20 on the conveyor 24. The loading station 34 may include a robot arm 38 or other apparatus for moving the package 20 from the end of the conveyor 24 and stacking it in a proper location on the current pallet 22 being loaded. Alternatively, workers may manually lift and place the package 20 from the end of the conveyor 24 onto the current pallet 22.

As will be explained further below, the validation station 32 sends data to the computer 40 and is controlled by the computer 40. The computer 40 creates the pick list(s) 60 based upon an order 58 from a store. Each pick list 60 includes a plurality of SKUs each with an associated quantity to be loaded on that pallet 22.

Figure 2A:
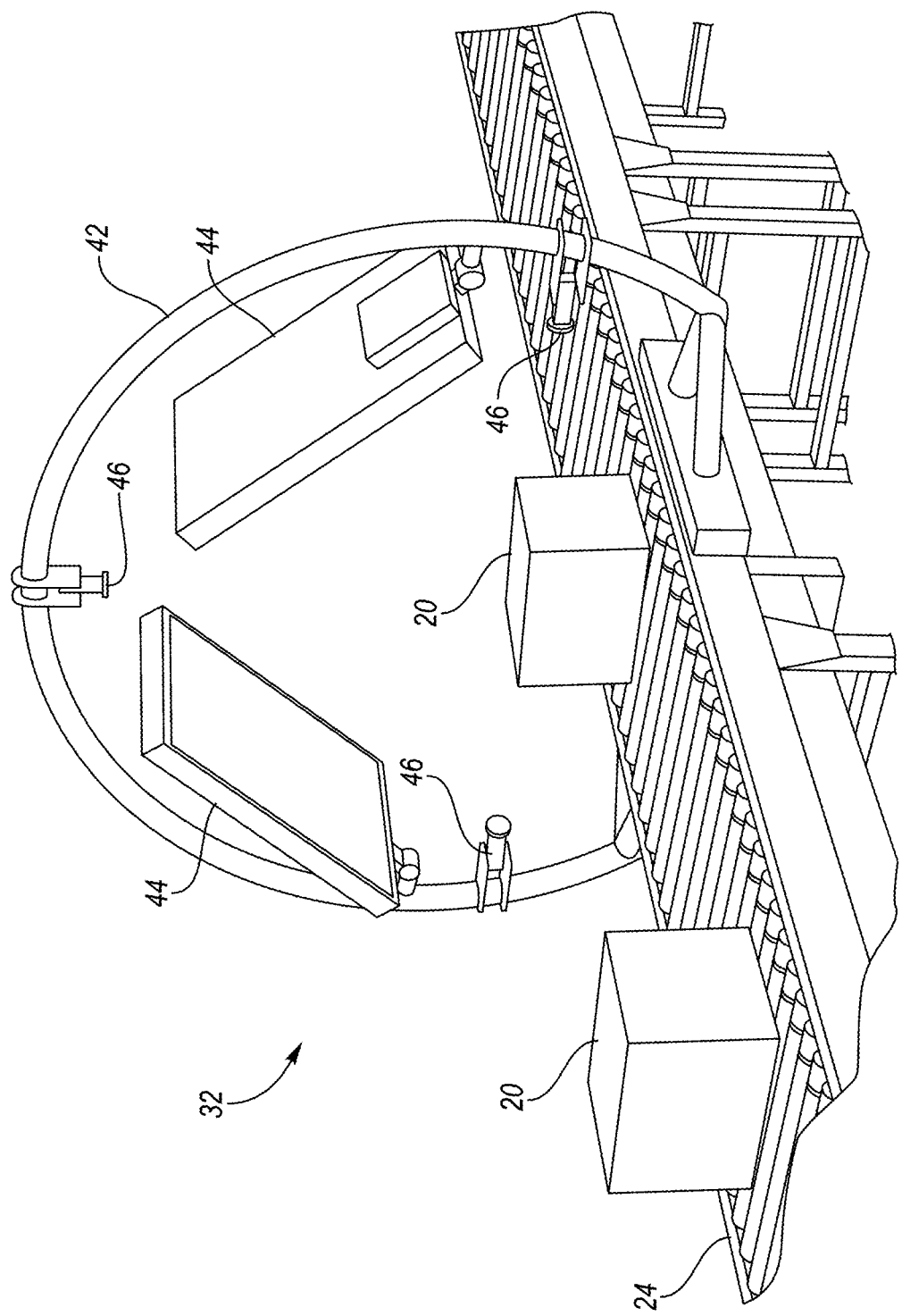
FIG. 2A is a perspective view of the validation station of FIG. 2.

FIG. 2 is an end view of the validation station 32 and a schematic view of the computer 40. FIG. 2A is a perspective view of the validation station 32. Referring to FIGS. 2 and 2A, the validation station 32 includes a frame 42 (or "doghouse") surrounding the package 20 on the conveyor 24 on three sides. A plurality of lights 44 and a plurality of cameras 46 are mounted to the frame 42, so that the package 20 can be illuminated and imaged from the top and two opposite sides. In this example the plurality of lights 44 includes two panel lights and the plurality of cameras 46 includes three cameras.

As the conveyor 24 brings each package 20 through the frame 42, at least one of the cameras 46 (such as the top camera 46—or some other presence sensor) detects the presence of the package 20 within the frame 42 and initiates imaging by all three cameras 46. A top image and two side images of the package 20 (or some sub-combination thereof) are taken by the cameras 46 and sent to the computer 40.

Optionally, the top camera 46 may be used only to detect the presence of the package 20 and the two side cameras 46 are used to generate the images used by the at least computer to determine the SKU of the package 20.

Alternatively, a single camera 46 could be positioned such that it can capture two or three surfaces of the package 20 in a single image. For example, the camera 46 could be directed toward an upper corner of the package 20, such that it would capture the upper surface and two adjacent side surfaces simultaneously (and at substantially equal angles) in one image. The computer 40 would then separate the image into three images and optionally process the three images to adjust the skewed angle so that it appeared to be taken substantially orthogonally to the respective surface.

In FIG. 2, the computer 40 includes at least one processor 50 and at least one electronic storage 52. The at least one electronic storage 52 stores instructions 54 which when executed by the at least one processor 50 causes the pallet loading and validation system 10 to perform the functions described herein. The at least one electronic storage 52 also stores at least one machine learning model 56 (preferably a plurality of machine learning models 56, as will be described below). The at least one machine learning model 56 may be trained on the SKUs that are associated with the packages 20 that are available at the distribution center 12.

It should be understood that each of the computers, servers or mobile devices described herein, including the computer 40, includes at least one processor and at least one non-transitory computer-readable media storing instructions that, when executed by the at least one processor, cause the computer, server, or mobile device to perform the operations described herein. The precise location where any of the operations described herein takes place is not important and some of the operations may be distributed across several different physical or virtual servers at the same or different locations. Thus unless otherwise explicitly stated otherwise in a claim, the terms "a computer" or "the computer" may include more than one computer, each having more than one processor and more than one storage, where all of the computers may be in the same or different physical locations, in any arrangement (e.g. remote server, cloud computers, remote compute services (e.g. AWS Lambda), local computer, networked computers, virtual computers, portable devices, tablets, smartphones, etc).

The computer 40 is programmed to receive an image from at least one of the cameras 46 (preferably the top camera 46) detecting the presence of the package 20. The computer 40 is configured to initiate imaging by the cameras 46 and to receive the images from at least one (and preferably all three) of the three cameras 46. The computer 40 is programmed to use the at least one machine learning model 56 to infer a SKU based upon the image(s). The computer 40 then determines if the inferred SKU matches the current SKU that the computer 40 instructed the user to pick.

For of the embodiments disclosed herein, one simple variation that could be implemented is that the computer 40 generates an error message if the computer 40 determines that the SKU of the package 20 is incorrect and stops the conveyor 24 and/or prevents robot arm 38 from loading the package 20 onto the pallet 22. Alternative more advanced and more efficient ways of handling mis-picks are described in detail later below.

In one embodiment, to detect the presence of a package, at least one of the cameras 46 generates an image every few hundred milliseconds (i.e. several times per second) and sends these images to the computer 40. The machine learning models 56 may also include a generic SKU detector, which may be trained on all of the SKUs, solely for the purpose of recognizing when a package 20 is present at the validation station 32. When a package 20 is detected, then the plurality of cameras 46 (or optionally just one or two of the cameras 46) each generate an image every few hundred milliseconds. Clipped or partial images are eliminated (e.g. the package 20 is not completely captured in the image), but between three and six (preferably four) images are kept per camera 46.

The computer 40 uses the machine learning models 56 in the manner described herein on each of these images (e.g. nine to eighteen images) to infer SKUs (e.g. package type and then brand). If the inferences from some of the images are significant outliers from the others, they may be eliminated. Statistical or other analyses can be performed on the inferences from the multiple images to determine the SKU of the package 20.

Figure 4:
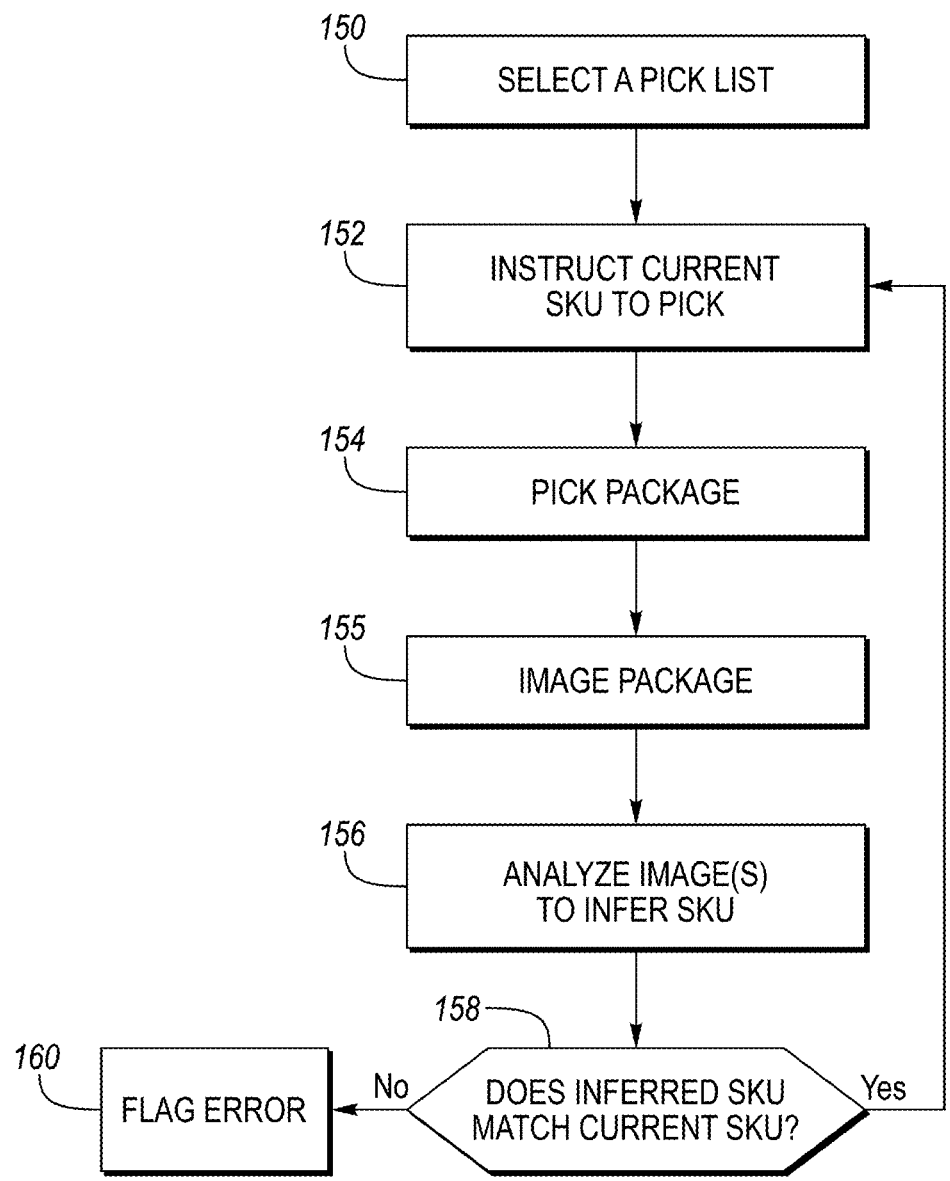
FIG. 4 is a high level flowchart for the validation system of FIG. 1.

Referring to FIGS. 1, 2 and the flow chart of FIG. 4, the computer 40 is configured to select the pick list 60 in step 150 and display or otherwise instruct the user to pick the packages 20 corresponding to the SKUs on the pick list 60, one SKU at a time (although the instruction may be for a plurality of packages 20 associated with a particular SKU), in step 152. The user then picks the SKU (i.e. retrieves a package 20 corresponding to the "current SKU" and places it on the conveyor 24 at the picking station 30) in step 154.

The computer commands the imaging system 36 to image the package in step 155. The computer 40 receives the images and is programmed to analyze the images of the picked package 20 in step 156 and infer a SKU based upon the images. The computer is programmed to compare the inferred SKU to the Current SKU in step 158. If they match, then the next SKU is instructed. If not, then an error is generated in step 160, such as an audible alert, visible alert and/or the conveyor 24 may be stopped and/or the robot arm 38 is interrupted from placing the picked package 20 onto the pallet 22. The user may then correct the error and revalidate the new picked package 20. Again, alternative ways of handling mis-picks are described in detail later below.

The pallet loading and validation system 10 validates each package 20 quickly because the flow of packages 20 is rapid. For example, packages 20 may pass through the validation station 32 every two seconds.

Figure 5:
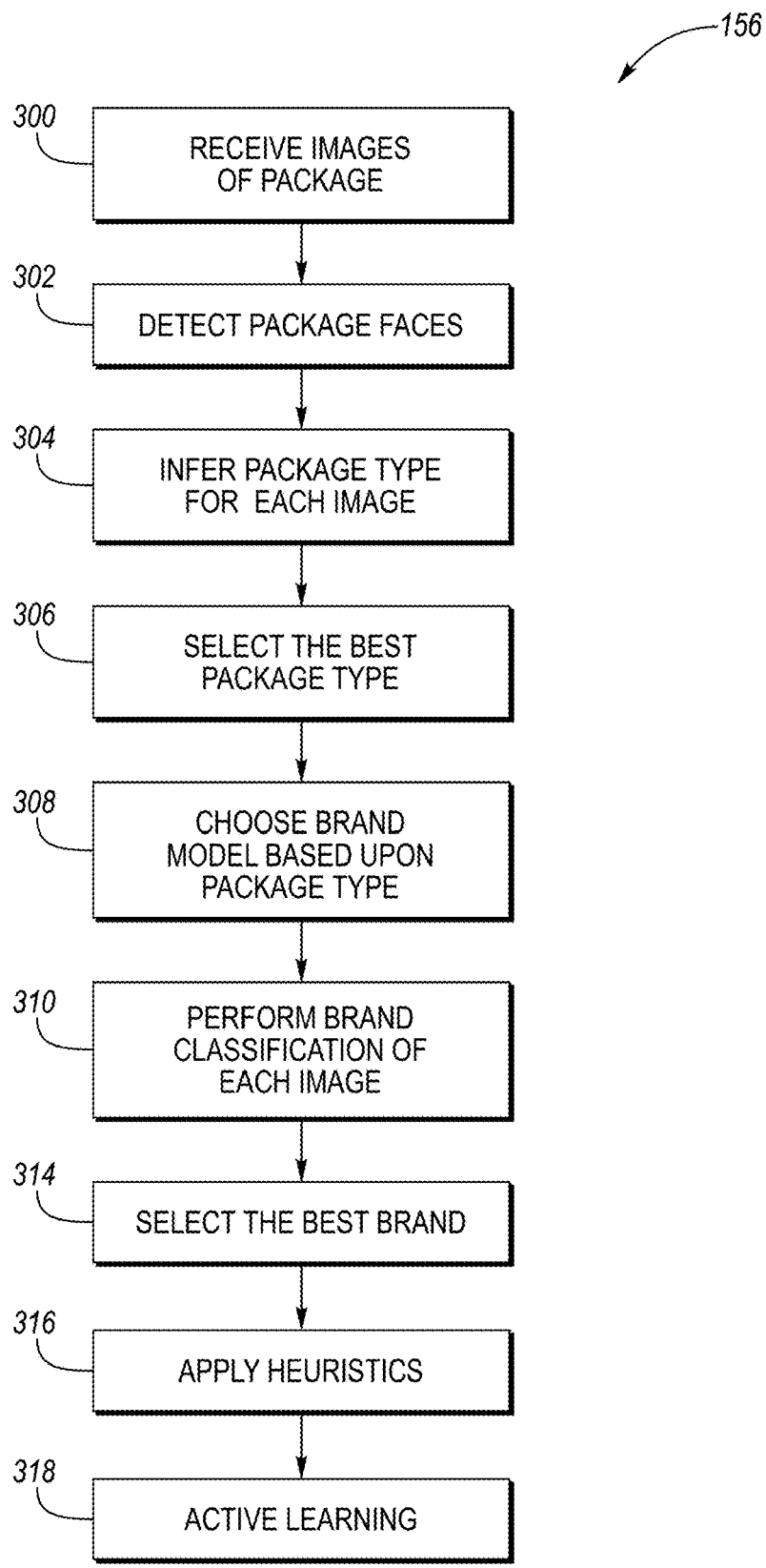
FIG. 5 is a flowchart showing one possible example for performing the analysis step of FIG. 4.

The method of FIG. 4 is a "single flow" method, i.e. one SKU is instructed to be picked and the validation station 32 determines whether the SKU matching the instruction was picked. However, it is not necessary to validate one SKU before instructing the next SKU. For example, a plurality of SKUs can be instructed in a particular order, and the validation station 32 will expect those SKUs in that order. If the validation station 32 detects a mismatch, it will continue to validate packages 20 to determine if the wrong SKU was picked or if it was skipped, or if a few SKUs were picked out of order, etc. The computer 40 may use an algorithm similar to a gene-matching algorithm One example method for performing the analysis step 156 of FIG. 4 is shown in more detail in the flowchart of FIG. 5. The computer 40 receives the images of the package 20 in the validation station 32 from at least one (and preferably all three) of the plurality of cameras 46 in step 300. In step 302, the package faces are detected (e.g. for the top and two opposite sides).

In step 304, the package type of the package 20 is inferred for each of the images (i.e. one or more images for each package face), using a machine learning model 56 for determining package type. The package type machine learning model 56 infers at least one package type based upon each image independently and generates an associated confidence level for that determined package type for that image. The package type machine learning module 56 may infer a plurality of package types (e.g. five to twenty) based upon each image with a corresponding confidence level associated with each such inferred package type.

The images with lower confidence package types are overridden with the highest confidence package type out of the package face images for that package 20 in step 306. The package type with the highest confidence out of all the package face images for that package 20 is used to override any different package type of the rest of the package faces for that package 20.

For example, a package type inferred based upon one package side face image at a confidence of 62% would be overridden by a package type inferred at a higher confidence level of 98% based upon a different image of that package to give a better package type accuracy. Again, "package type" may include a combination of the primary and secondary packaging, such as reusable beverage crate with certain bottle sizes or can sizes, corrugated tray with translucent plastic wrap a certain bottle or can sizes, or fully enclosed cardboard or paperboard box In step 308 of FIG. 5, for each image, a brand model (e.g. brand models 231a, b, or c of FIG. 9) is loaded based upon the package type that was determined in step 306 (i.e. after the lower-confidence package types have been overridden). Some brands are only available in certain package types. For example, Gatorade is sold in approximately a dozen package types but those package types are unique to Gatorade and other Pepsi products are not packaged that way. If it is determined that a package has a Gatorade package type then the images in that package are classified using the Gatorade brand model (for example, brand model 231c of FIG. 9). For example, the brand model for Gatorade may contain over forty flavors that can be classified. It is much more accurate to classify a brand from forty brands than to classify a brand from many hundreds or more than a thousand brands, which is why the possibilities are first limited by the inferred package type. However, depending on the application, e.g. how many SKUs are possible and how distinct the SKUs are, it may not be necessary or desirable to infer package type and brand separately and it may be practical to directly infer the SKUs based upon a single machine learning model.

In step 310, the computer 40 uses the machine learning model 56 that has been loaded based upon the best inferred package type to infer at least one brand independently for each image of the package 20. The computer 40 associates a confidence level each inferred brand for each image. Again, a plurality of brands may be inferred for each image, each at a different confidence level. Initially, at least, higher-confidence inferred brands are used to override lower-confidence inferred brands of other images for the same package in step 314.

Having determined the package type and then the brand for the package 20 in the validation station 32, the SKU of that package 20 has been uniquely determined.

In a particular implementation, one may choose to have a high confidence that there is an error before reporting the error so there are not too many false errors. In optional step 316, one or more example algorithms or heuristics disclosed herein may leverage the expected SKU being instructed by the pick list to make corrections so that there are not too many false errors reported.

In an optional step 318, the images received in step 300 can be used to train the computer 40, by storing or mapping the numerical output of the machine learning models 56 based upon the images, or by using an image similarity technique and/or by training the machine learning models with the images, all described in more detail below.

Indistinguishable SKU Sets

Figure 6:
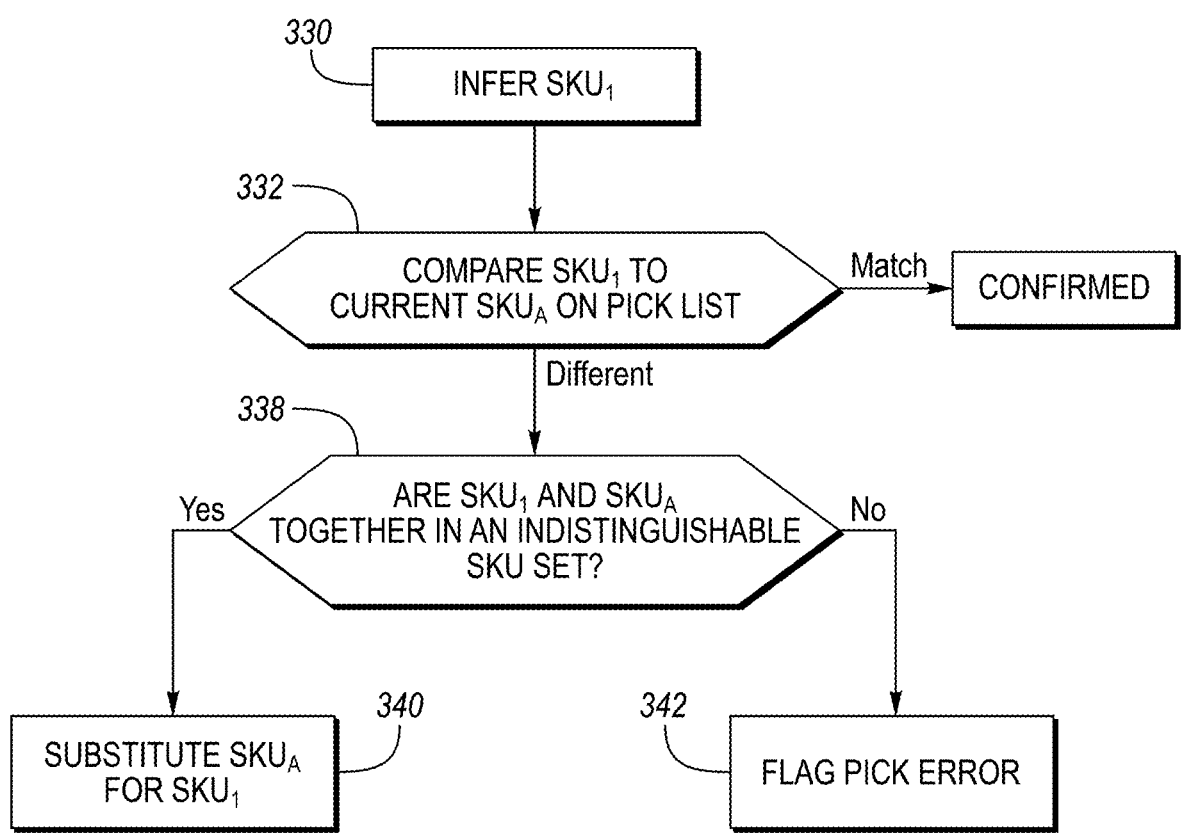
FIG. 6 is a flowchart showing one possible example for the handling of indistinguishable SKU sets.

In certain applications, the inference may have a difficult time distinguishing between particular sets of two or more SKUs. These lists of SKUs are stored as "SKU sets" or "indistinguishable SKU sets." One optional example flowchart regarding the handling of indistinguishable SKU sets is shown in FIG. 6. More advanced ways of handling SKU sets will be described later below.

For example, the end package face of a 24-pack package of beverage containers sometimes looks very similar to the end package face of the 32-pack package of that same beverage container. Based on how the product is oriented on the conveyor, the inferences on the end faces may have a roughly 50% chance of inferring correctly before this adjustment. The two SKUs in this set are "indistinguishable." It is known that one of the SKUs in the set is present but it cannot be confidently determined which one of the SKUs in the set is present. Similar SKUs where the inference often mixes up between two or more SKUs are placed into SKU Sets. The algorithm of FIG. 6 will adjust the inferred results between this SKU set based upon the Current SKU on the pick list. If the package is inferred to be the 24 pack but the current SKU to be picked is a 32 pack of the same beverage containers then an adjustment is made to the inferred SKU so that an error is not reported. The algorithm essentially balances what is very likely not a picking error.

Referring to FIG. 6, in step 330, the SKU of the picked package is inferred according to any of the methods described herein. In step 332, the inferred $SKU_1$ is compared to the Current $SKU_A$ on the pick list (i.e. the SKU from the pick list that the user was instructed to pick). If they match, then the SKU is confirmed and the package 20 is placed on the pallet 22 (FIG. 1). If they are different, then in step 338, it is determined whether $SKU_1$ and $SKU_A$ are associated with one another in an "indistinguishable SKU set" or "SKU set." If so, then $SKU_A$ is substituted for $SKU_1$ in step 340, and no error is flagged, but the $SKU_A$ may be flagged as "unconfirmed." If $SKU_A$ and $SKU_1$ are not in an indistinguishable sku set, then a pick error is flagged (via lights, alarms, conveyor stoppage, and/or conveyor diversion) in step 342.

If an inferred result is updated based on the indistinguishable SKU set logic such that the inferred SKU now matches current SKU being picked, then a property is set for that SKU to indicate that the system cannot confirm that SKU. No error is flagged, but the SKU is labeled "unconfirmed." The package 20 is placed on the pallet 22 (FIG. 1).

Note that more advanced methods for resolving SKU sets in certain implementations are described in detail later below.

In parallel with the inference of package type, brand, and/or SKU the system (e.g. the computer 40) can also perform a text classification (e.g. Optical Character Recognition ("OCR")) on each image of each package face. Certain text (characters, strings of characters, or numerals) can be used in combination with the inferred package types, brands, or SKUs. For example, if the inferred package types for that package face indicates that a 24-pack of cans is the highest confidence inferred package type and that a 12-pack of cans is the second highest inferred package type, but the independent OCR of the package face indicates the presence of the numeral "12," then the highest confidence inferred package type may be overridden by the detected text, or by the combination of the detected text and the existence of a matching inferred package type (optionally, within a threshold confidence level or a threshold confidence level difference from the highest confidence level inferred package type), albeit not the highest-confidence package type. Alternatively, the detected text can be used to resolve a SKU set, e.g. detecting a "24" on the package will resolve a SKU set comprising a 24-pack and a 32-pack.

Similarly, the computer 40 may also read one or more barcodes (e.g. UPCs) on the package 20. Barcodes may not completely resolve the SKU, as there may be several SKUs with the same barcode (e.g. a barcode on a can would not resolve whether the package 20 is an 18 pack or a 24 pack). But the barcode may resolve a SKU set.

Additionally, or alternatively, the independent OCR and/or the barcode can also be used in the brand classifier. For example, if the inferred brands include certain flavors of beverages both regular and their diet counterparts, and the independent OCR detects the presence of "di" or even "diet," then the non-diet beverages may be removed from the list or overridden in favor of the inferred diet beverages (e.g. Pepsi vs Diet Pepsi, Mountain Dew vs Diet Mountain Dew). The remaining highest-confidence inferred brand for that package face could then be assigned to that package face (subject to all of the other methods explained above). Similarly, flavor words like "strawberry" or "watermelon" or portions of those words could be used to override the highest-confidence brand.

The detected text or barcode may be used to resolve indistinguishable SKU sets. If an 18 pack and a 24 pack of the same brand are in an indistinguishable SKU set, a detection of the text "18" is used by the computer to resolve the SKU. There may also be a list of keywords that are designated to resolve indistinguishable SKU sets. Some keywords, such as the numbers indicating quantity of beverage containers or numbers indicating capacity of beverage containers, or words indicating flavors, or the word "diet," may be designated to resolve more than one possible SKU set. In one implementation, the confidence level augmentation based upon a detected keyword may be larger for keywords that are associated with fewer SKUs or that are associated with resolving fewer SKU sets.

Additionally, or alternatively, these text and/or barcode identifications could be brought in after the SKU has been identified. For example, if the inferred SKU does not match the expected SKU (the current SKU from the pick list), and if the text/barcode identification from one or more package faces of the inferred SKU supports the probability that the inferred SKU is in fact the expected SKU from the pick list, this can be used as an additional factor to decide to override the inferred SKU with the expected SKU from the pick list. For example, text identification of numbers could be related to package type such as number of beverage containers (e.g. 12 cans, 24 cans), or beverage container size (e.g. 20 oz, 32 oz). As another example, the text identification can indicate a brand (e.g. "diet" or "strawberry" or parts of those words).

Figure 7:
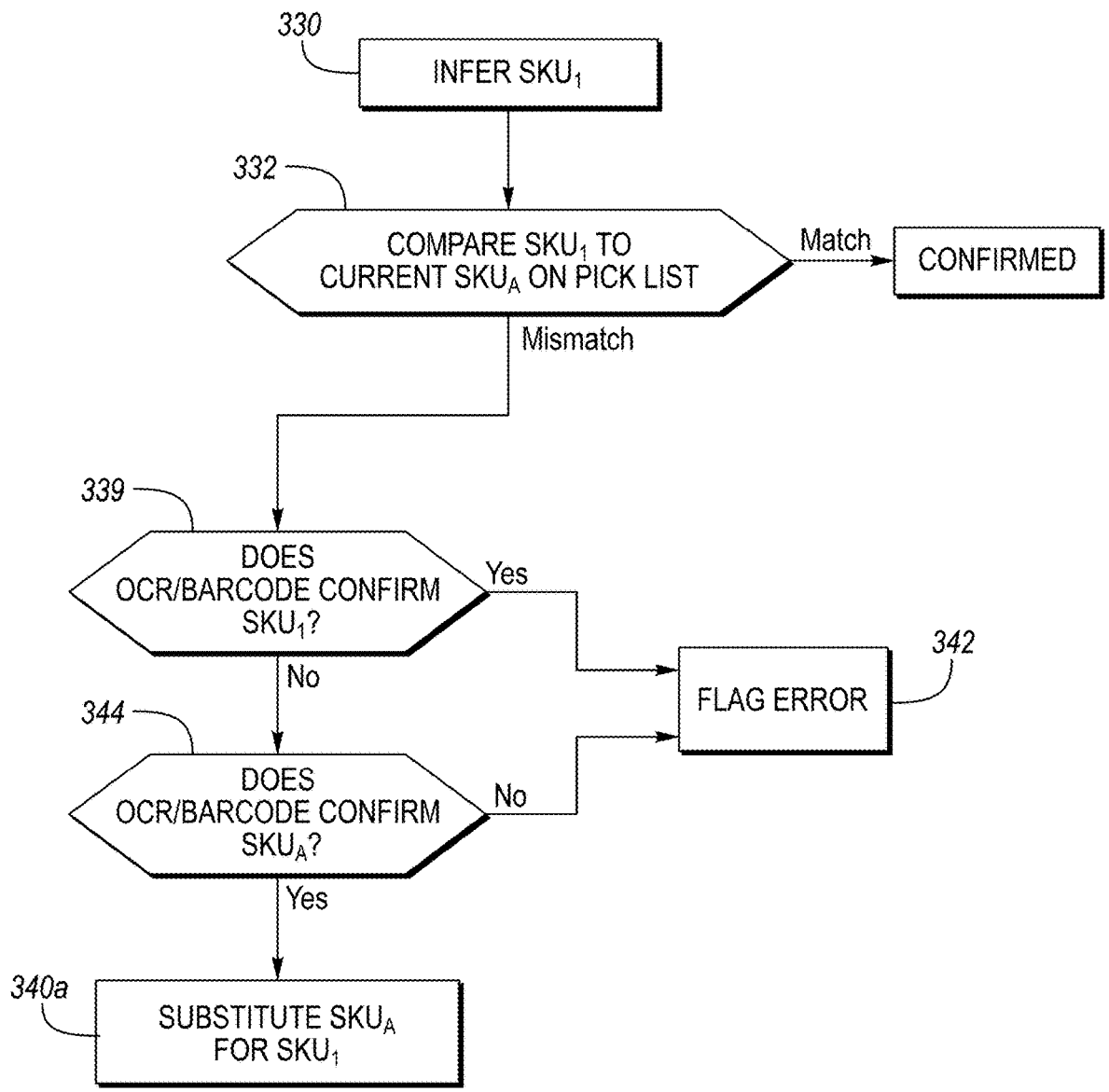
FIG. 7 is a flowchart showing one possible example for using OCR and/or barcode for validation.

One example method for using OCR and/or barcode in parallel with the machine learning methods is shown in the flowchart of FIG. 7. In step 330, at least one SKU is inferred based upon the current package 20 according to any of the methods described herein. In step 332, the highest confidence SKU, $SKU_1$, is compared to Current $SKU_A$ from the pick list that was instructed to be picked. If there is a match, the pick and the SKU is confirmed. If there is a mismatch, then in step 339, it is determined whether the OCR and/or barcode results of the image or images associated with the inferred $SKU_1$ can be used to confirm that the current package 20 is $SKU_1$. In other words, do the OCR and/or barcode results from this package 20 include any text that matches keywords 298 (FIG. 3) associated with $SKU_1$ or does the barcode match $SKU_1$ and distinguish $SKU_A$? If so, the pick is flagged as an error in step 342 (e.g. "$SKU_1$ was detected but should be $SKU_A$") and there may be a stoppage or diversion.

If not, then it is also determined in step 344 whether the OCR results or the detected barcode confirm that the package 20 is $SKU_A$. In other words, do the OCR results include any text that matches keywords 298 (FIG. 3) associated with $SKU_A$ or does the barcode match $SKU_A$ and distinguish $SKU_1$? If not, then the pick is flagged as an error in step 342.

If the OCR results and/or barcode confirm $SKU_A$, then $SKU_A$ is substituted for $SKU_1$ in the inferred set and the SKU is marked as verified in step 340a.

Figure 8:
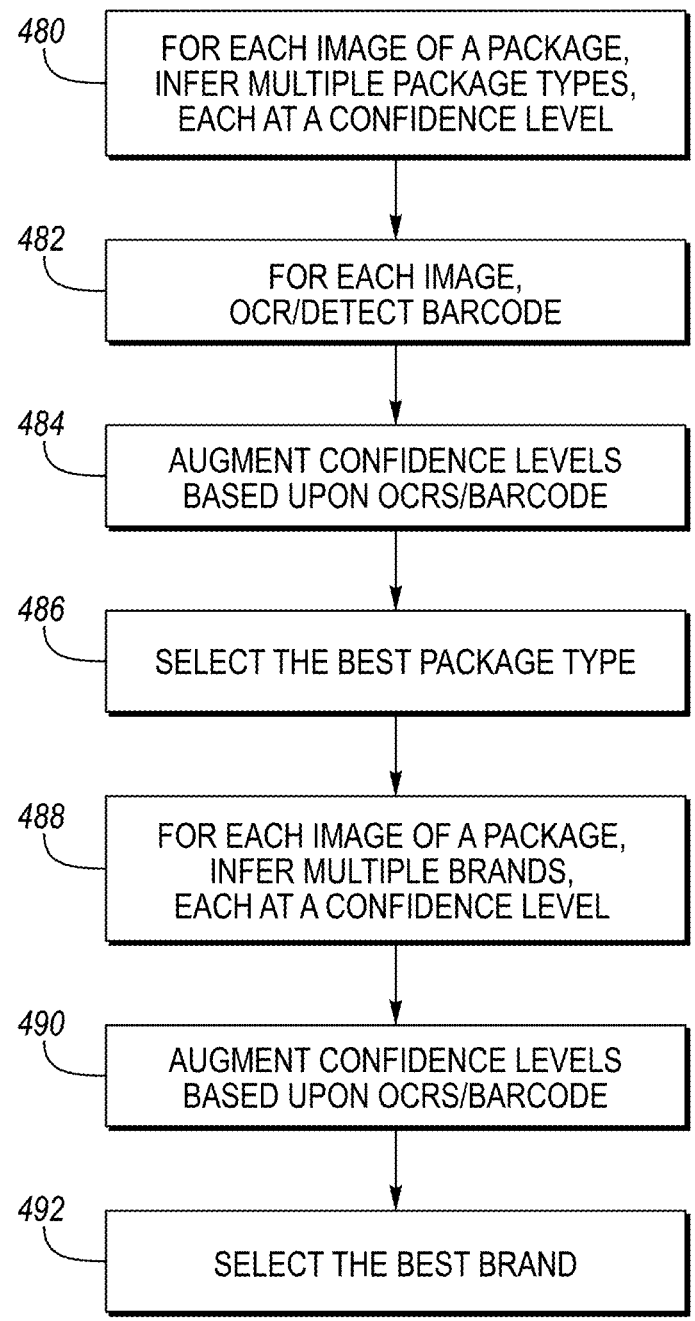
FIG. 8 is a flowchart of an alternate example for using OCR and/or barcode for validation.

An alternate method of integrating OCR with the machine learning is shown in FIG. 8. These steps could replace steps 304 to 314 of FIG. 5. After step 302 of FIG. 5, then in step 480 (FIG. 8), multiple package types are inferred for each image of each package face using the package type machine learning model(s) 56. For example, there may be five to twenty package types inferred for each image of each package face of the package 20 (i.e. the package types inferred at the top five to twenty confidence levels are selected). Each package type inferred has an associated confidence level.

In step 482, OCR is performed on each image of the package 20, identifying any text on each package face. Any barcodes are also detected and read. Step 482 could be performed before, after or in parallel with step 480. The text and/or barcode identified on each package face may be indicative of package type or brand.

In step 484, for each package face, if any text identified in step 482 matches or partially matches keywords 298 of any of the inferred package types, then the confidence levels associated with those inferred package types for that package face may be augmented. Likewise, the confidence levels may be augmented based upon a detected barcode. The identified text may be compared to the keywords 298 (FIG. 3) associated with each package type. For example, for a given image, if keywords associated with one of the inferred package types has a matched keyword from the OCR, or if the barcode matches one or more package types, then the confidence level associated with the package type(s) for that package face may be increased, for example, by 10% (or any amount). For example, if the OCR detects the text "36" on the image of that package face, then the confidence level for a 36-pack of 12 oz bottles for that package face could be increased by adding 10% to the confidence level.

Likewise, if a detected barcode matches one or more of the inferred package types, then the confidence levels for those inferred package types would be increased (e.g. by adding 10%).

Then, in step 486, the package type with the highest confidence level (as potentially augmented by the OCR/barcode step) among all of the images for that package 20 is selected and used to override the package types associated with all of the images for that package. The augmentation of the confidence levels based upon the OCR (or barcode) may change which package type has the highest confidence level as initially inferred using the machine learning model.

In step 488, as before, multiple brands are inferred, each at an associated confidence level, for each image using the machine learning model(s) (which may be selected based upon the highest confidence package type after step 484). Again, each image of the same package is inferred independently of the others, and each has its own set of inferred brands and confidence levels.

In step 490, any text identified in step 482 is compared to keywords associated with each available brand. If any text identified in step 482 matches or partially matches keywords associated with any of the inferred brands, then the confidence levels associated with those inferred brands for that package face are augmented. The identified text is compared to the keywords 298 (FIG. 3) associated with each brand. For example, for a given package face, if keywords associated with one of the inferred brands has a matched keyword from the OCR, then the confidence level associated with that brand for that package face may be increased by 10% (for example). For example, if the OCR detects the text "diet" on the image of that package face, then the confidence level for all the inferred "diet" brands would be increased by adding 10%.

Similarly, if a detected barcode matches one or more of the inferred brands, the confidence levels of those inferred brands are increased (e.g. by adding 10%).

Then, in step 492, the brand with the highest confidence level (as potentially augmented in step 490) among all of the images is selected and used to override the brands associated with all of the images for that package. The augmentation of the confidence levels based upon the OCR (and/or barcode) may change which brand has the highest confidence level compared to when they were initially inferred using the machine learning model.

According to the method shown in FIG. 8, the determination of the package type can be based upon the inferred package types using the machine learning model and based upon OCR/barcode of the package faces. The determination of the brand can also be based upon the inferred brands using the machine learning model(s) and based upon OCR/barcode of the package faces. The method can then return to step 316 of FIG. 5.

Figure 9:
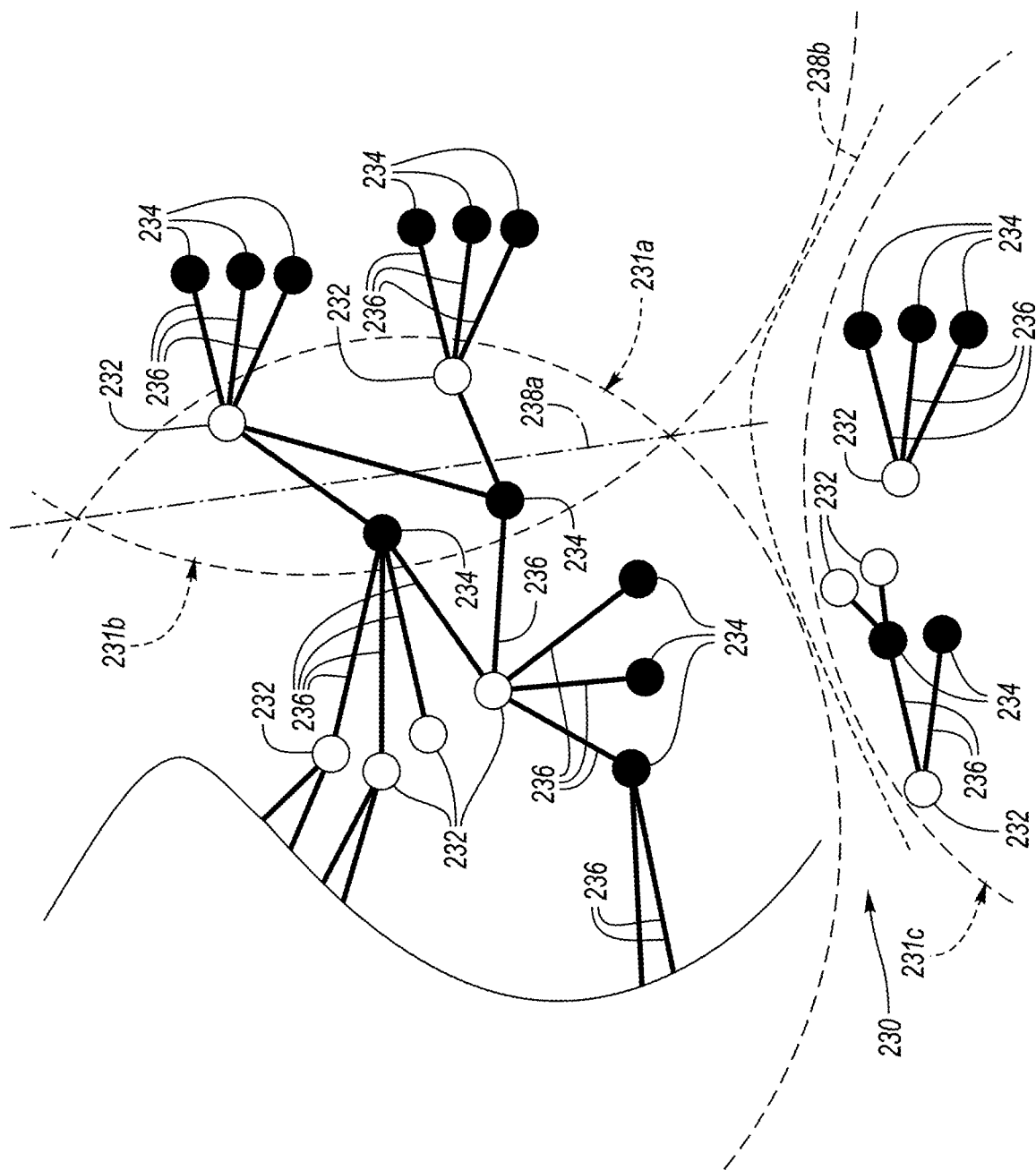
FIG. 9 shows portions of a plurality of machine learning models of the validation system.

FIG. 9 shows a portion of a brand model map 230 containing the machine learning models 56 for the brand identification, in this example brand models 231*a*, 231*b*, 231*c*. In FIG. 9, each white node is a brand node 232 that represents a particular brand and each black node is a package node 234 that represents a package type. Each edge or link 236 connects a brand node 232 to a package node 234, such that each link 236 represents a SKU. Each brand node 232 may be connected to one or more package nodes 234 and each package node 234 may connect to one or more brand nodes 232.

In practice, there may be hundreds or thousands of such SKUs and there would likely be two to five models 231. If there are even more SKUs, there could be more models 231. FIG. 9 is a simplified representation showing only a portion of each brand model 231*a*, 231*b*, 231*c*. Each model may have dozens or even hundreds of SKUs.

Within each of models 231*a* and 231*b*, all of the brand nodes 232 and package nodes 234 are connected in the graph, but this is not required. In fact, there may be one or more (four are shown) SKUs that are in both models 231*a* and 231*b*. There is a cut-line 238*a* separating the two models 231*a* and 231*b*. The cut-line 238*a* is positioned so that it cuts through as few SKUs as possible but also with an aim toward having a generally equal or similar number of SKUs in each model 231. Each brand node 232 and each package node 234 of the SKUs along the cut-line 238*a* are duplicated in both adjacent models 231*a* and 231*b*. For the separation of model 231*c* from models 231*a* and 231*b*, it was not necessary for the cut line 238*b* to pass through (or duplicate) any of the SKUs or nodes 232, 234.

In this manner, the models 231*a* and 231*b* both learn from the SKUs along the cut line 238*b*. The model 231*b* learns more about the brand nodes 232 in the overlapping region because it also learns from those SKUs. The model 231*a* learns more about the package types (package nodes 234) in the overlapping region because it also learns from those SKUs. If those SKUs were only placed in one of the models 231*a*, 231*b*, then the other model would not have as many samples from which to learn.

In brand model 231*c*, for example, as shown, there are a plurality of groupings of SKUs that do not connect to other SKUs, i.e. they do not share either a brand or a package type. The model 231*c* may have many (dozens or more) of such non-interconnected groupings of SKUs. The model 231*a* and the model 231*b* may also have some non-interconnected groupings of SKUs (not shown).

Figure 10:
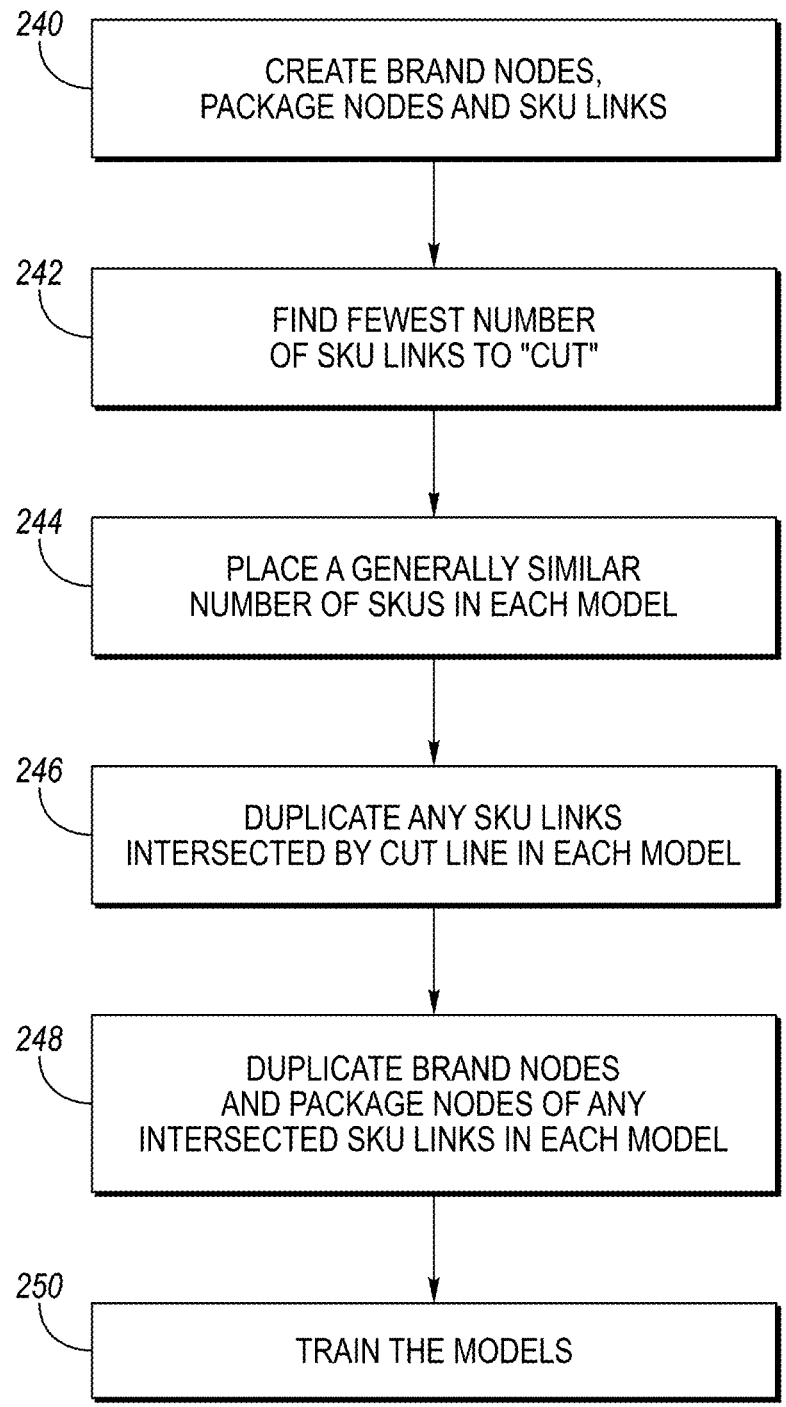
FIG. 10 is a flowchart showing a method for creating the machine learning models of FIG. 9.

Referring to FIGS. 9 and 10, the process for creating the models 231 is automated and performed in the computer 40 (FIG. 1). In particular, this is the process for creating the brand models. There would be one model for determining package type and then depending on how many brands there are, the SKUs are separated into multiple separate machine learning models for the brands.

This process is performed initially when creating the machine learning models and again when new SKUs are added. Initially, a target number of SKUs per model or a target number of models may be chosen to determine a target model size. Then the largest subgraph (i.e. a subset of SKUs that are all interconnected) is compared to the target model size. If the largest subgraph is within a threshold of the target model size, then no cuts need to be made. If the largest subgraph is more than a threshold larger than the target model size, then the largest subgraph will be cut according to the following method. In step 240, the brand nodes 232, package nodes 234, and SKU links 236 are created. In steps 242 and 244, the cut line 238 is determined as the fewest numbers of SKU links 236 to cut (cross), while placing a generally similar number of SKUs in each model 231. The balance between these two factors may be adjusted by a user, depending on the total number of SKUs, for example. In step 246, any SKU links 236 intersected by the "cut" are duplicated in each model 231. In step 248, the brand nodes 232 and package nodes 234 connected to any intersected SKU links 236 are also duplicated in each model 231. In step 250, the models 231 *a, b, c* are then trained according to one of the methods described herein, such as with actual photos of the SKUs and/or with the virtual conveyor images described below.

Again as shown in FIG. 3, each SKU 62 is associated with a text description 64, a package type 66 and a brand 68. Each package type 66 corresponds to one of the package nodes 234 of FIG. 9, and each brand 68 corresponds to one of the brand nodes 232 of FIG. 9. Therefore, again, each package type 66 may be associated with more than one brand 68, and each brand 68 may be available in more than one package type 66. The package type 66 describes the packaging of the SKU 62. For example 16OZ_CN_1_24 is a package type 66 to describe sixteen ounce cans with twenty-four grouped together in one case. A case represents the sellable unit that a store can purchase from the manufacturer. The brand 68 is the flavor of the beverage and is marketed separately for each flavor. For example, Pepsi, Pepsi Wild Cherry and Mountain Dew are all "brands." Each flavor of Gatorade is a different "brand."

Virtual conveyor images may be used to train the models 56, 231. A virtual conveyor image may be generated by digitally placing images of packages 20 (of known SKUs) into a photo of what one of the cameras 46 in the conveyor station would see (the top camera 46 would be very different from the side cameras 46). Noise, shadows, and glare can be added digitally to some of the virtual images and the images of the packages 20 can be skewed to simulate different angles. The machine learning models 56, 231 can then be trained using the virtual conveyor images.

Figure 11:
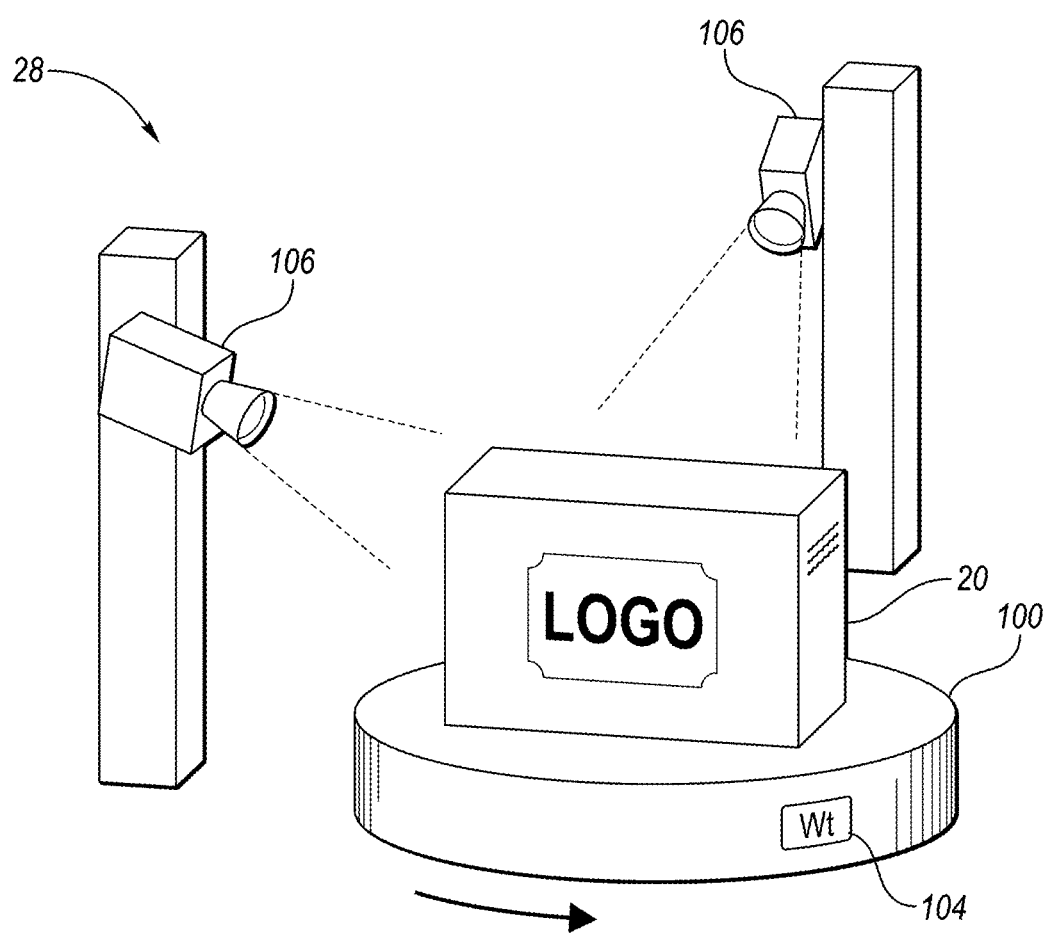
FIG. 11 shows a sample training station that could be used to train any of the machine learning models.

FIG. 11 shows a sample training station 28 including a turntable 100 onto which a new package 20 (e.g. for a new SKU or new variation of an existing SKU) can be placed to create the machine learning models 56. The turntable 100 may include a weight sensor 104 for determining the weight of the package 20. One or more cameras 106 take a plurality of images of the package 20, including any logos or any other indicia on the packaging, as the package 20 is rotated on the turntable 100. Preferably all sides and the top of the package 20 are imaged. The images, weight, identification of the known SKU are sent to the computer 40 to be used to train the models 56. Optionally, multiple images of the package 20 are taken at different angles and/or with different lighting. Alternatively, or additionally, the computer files with the artwork for the packaging for the package 20 (i.e. files from which the packaging is made) are sent directly to the computer 40 to train the models 56 (again, along with the identification of the known SKU).

Figure 12:
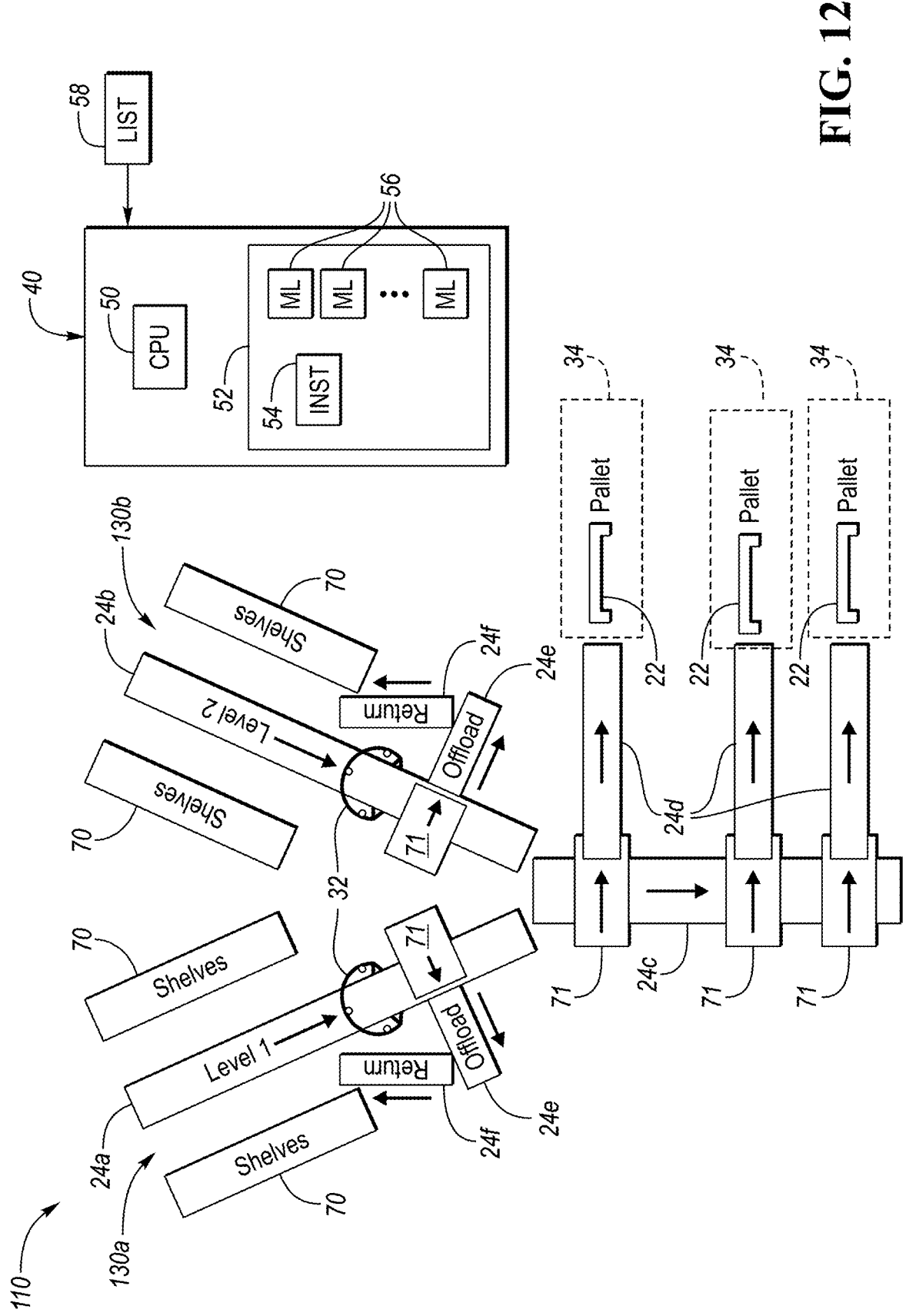
FIG. 12 is a highly schematic plan view of a more elaborate example of a pallet loading and validation system.
Figure 13:
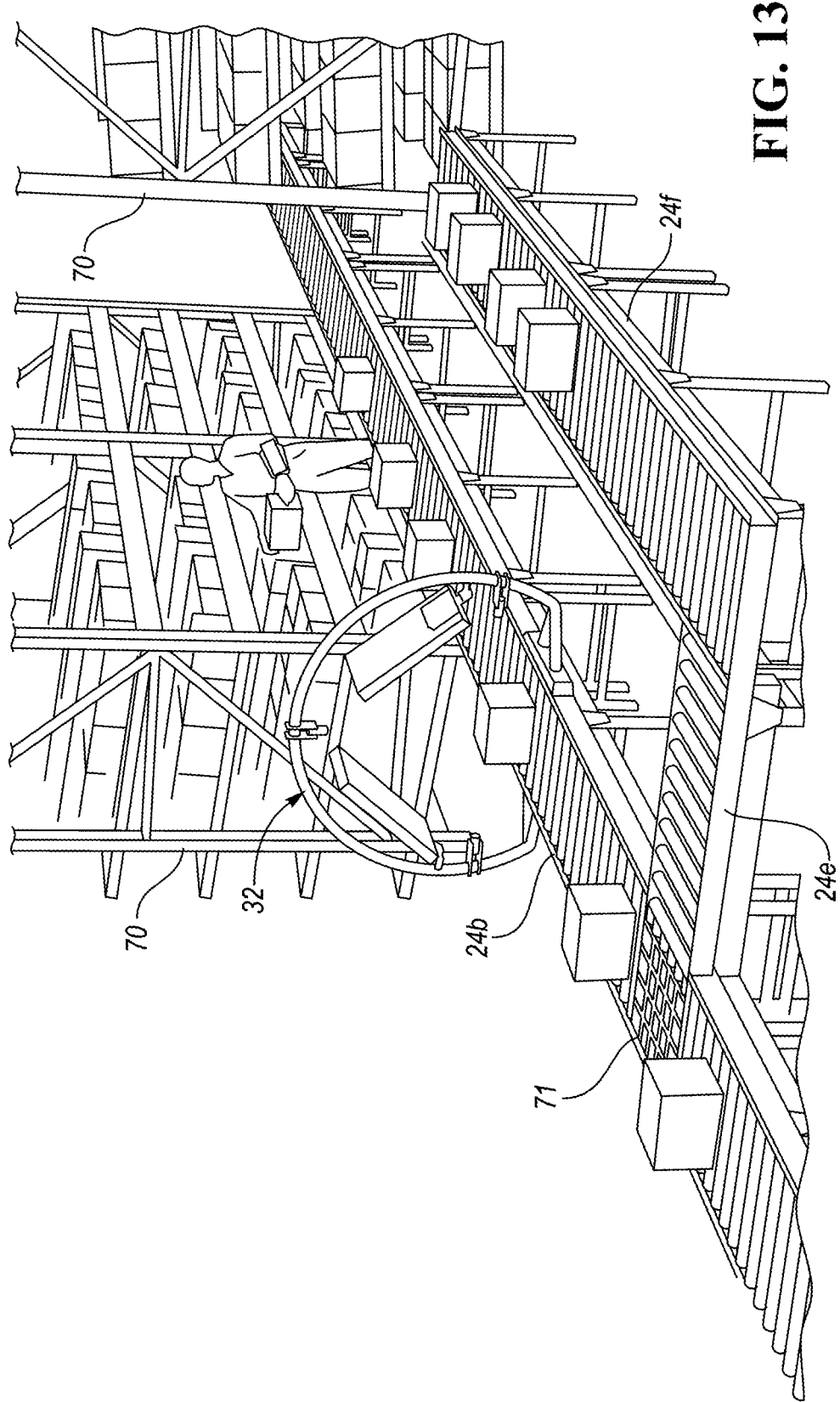
FIG. 13 is a perspective view of one of the picking stations of FIG. 12.

FIG. 12 is a highly schematic plan view of a more elaborate example of a pallet loading and validation system 110 (although it is still relatively simplified). FIG. 13 is a perspective view of one of the picking stations 130*a*, 130*b* of FIG. 12. The pallet loading and validation system 10 of FIGS. 1 and 2 was greatly simplified, but except as otherwise shown or described, corresponding components of the pallet loading and validation system 110 of FIGS. 12 and 13 are the same and operate the same. Additionally, any of the above methods could be used in the pallet loading and validation system 110.

Referring to FIG. 12, the pallet loading and validation system 110 includes a plurality of picking stations 130*a*, 130*b* (two are illustrated, but there would often be more, e.g. six or eight). The first picking station 130*a* has a first level conveyor 24*a*, which is generally the same as the conveyor 24 of FIG. 1. The first level conveyor 24*a* extends through a first pick area, such as between two rows of shelves 70 (or alternatively, any two areas where packages 20 are stored, such as on pallets or on the floor). In this example, a validation station 32 (similar to that described above) may be positioned such that the first level conveyor 24*a* carries packages 20 through the validation station 32.

Similarly the second picking station 130*b* includes a second level conveyor 24*b*, which is generally same as the conveyor 24 of FIG. 1. The second level conveyor 24*b* extends through a second pick area, such as between two rows of shelves 70 (or alternatively, any two areas where packages 20 are stored, such as on pallets or on the floor). In this example, a validation station 32 (similar to that described above) may be positioned such that the second level conveyor 24*b* carries packages 20 through the validation station 32.

The first level conveyor 24*a* and the second level conveyor 24*b* may merge at their outputs onto a wave conveyor 24*c*. The wave conveyor 24*c* receives packages from both conveyors (and optionally, from more than two conveyors) and distributes the packages to a plurality of final conveyors 24*d*, each leading to a loading station 34 where a pallet 22 may be loaded. The first level conveyor 24*a*, second level conveyor 24*b* and wave conveyor 24*c* may be powered (e.g. have driven rollers or a driven belt), while the plurality of final conveyors 24*d* may be inclined with independent free-rolling rollers, such that gravity carries packages 20 down the plurality of final conveyors 24*d*. In this manner, a plurality of packages 20 can be queued in each of the plurality of final conveyors 24*d* for a robot arm 38 (FIG. 1) or worker to move them onto a pallet 22. In fact, packages 20 for more than one pallet 22 can be queued in each of the plurality of final conveyors 24*d* (i.e. with the packages 20 for a first pallet queued in front of packages 20 for a second pallet).

Alternatively, or additionally, a single validation station 32 may be positioned at the beginning of the wave conveyor 24*c* instead of at the end of each of the first level conveyor 24*a* and second level conveyor 24*b*.

A plurality of diverters 71 are positioned along the wave conveyor 24*c*, each capable of diverting (e.g. pushing or driving via rollers) a package 20 from the wave conveyor 24*c* onto one of the plurality of final conveyors 24*d*. Although only three final conveyors 24*d* are shown, there would likely be more than three final conveyors 24*d* branching off the wave conveyor 24*c*. It is anticipated that eighteen or more final conveyors 24*d* would be used. In this manner, a plurality of pallets 22 (i.e. three, eighteen or more) are loaded in each wave. As will be explained below, the plurality of diverters 71 are controlled by the computer 40 in part based upon information from the validation stations 32.

As is known, the diverters 71 can take several forms. For example, the diverter may include an arm or lever that simply pushes the package 20 off the wave conveyor 24*c* onto the associated one of the plurality of final conveyors 24*d*. As another example, the diverter 71 may be embedded in the conveyor and may comprise a section of conveyor that can selectively (as controlled by the computer 40) present rollers that are rolling in the main direction of the conveyor or rollers that are rolling in a direction perpendicular to the main direction of the conveyor. None of the inventions disclosed herein are limited to any particular type of diverter 71. Diverters that can selectively move a package 20 from one conveyor onto another conveyor could be used.

Optionally, the pallet loading and validation system 110 may include an offload conveyor 24e and associated diverter 71, which may be positioned on each level conveyor 24a, 24b after each validation station 32. A return conveyor 24f may lead from proximate the offload conveyor 24e to one of the pick areas, e.g. to some point on the second level conveyor 24b or the first level conveyor 24a upstream of the validation station 32. The offload conveyor 24e may feed directly to the return conveyor 24f. The offload conveyor 24e and the return conveyor 24f for the second level conveyor 24b are also shown in FIG. 12 but would be similar for the first level conveyor 24a.

The offload conveyor 24e may also include powered or non-powered rollers 74 (not shown). If the validation station 32 identifies a SKU of a package 20 that the computer 40 determines is not needed for any of the current wave of pallets 22, then the computer 40 directs the diverter 71 to divert that package onto the offload conveyor 24e. A worker or robot may move the packages 20 that accumulate on the offload conveyor 24e onto a return conveyor 24f that brings the packages 20 back to the picking station 130a, 130b. If the offload conveyor 24e is powered, it can automatically feed packages 20 onto the return conveyor 24f, which may be inclined and include free-rolling rollers, such that packages 20 on the return conveyor 24f move toward the picking station 130a, 130b and can accumulate on the return conveyor 24f until the next wave.

After the current wave is complete, a worker can place them on the first level conveyor 24a or the second level conveyor 24b for the next wave of pallets 22, where at least most of them are likely to be needed (especially if there are many pallets 22 in a wave). The computer 40 records which packages 20 (i.e. which SKUs and the quantity of each) were diverted onto the offload conveyor 24e in the previous wave. The computer 40 may initially count these surplus packages 20 for the next wave of pallets 22 as already picked. The computer 40 may delay requesting workers to retrieve those same quantities of those SKUs until a worker has had an opportunity to send the surplus packages through the validation station 32 again and onto the wave conveyor 24c. The computer 40 deducts those quantities of SKUs from the quantities of SKUs for the wave of pallets 22 after they pass through the validation station 32. With the pallet loading and validation system 110 operated in this manner, the SKUs for an entire wave of pallets 22 can be picked in any order and can be picked simultaneously, all as directed by the computer 40. Multiple workers can pick packages 20 at each level conveyor 24a, 24b simultaneously because the SKUs will be identified at the validation stations 32. This significantly increases the efficiency of the system.

Of course, as before the pallet loading and validation system 110 can be operated in a single flow manner, i.e. where each validation station 32 expects a specific sequence of SKUs.

Figure 14:
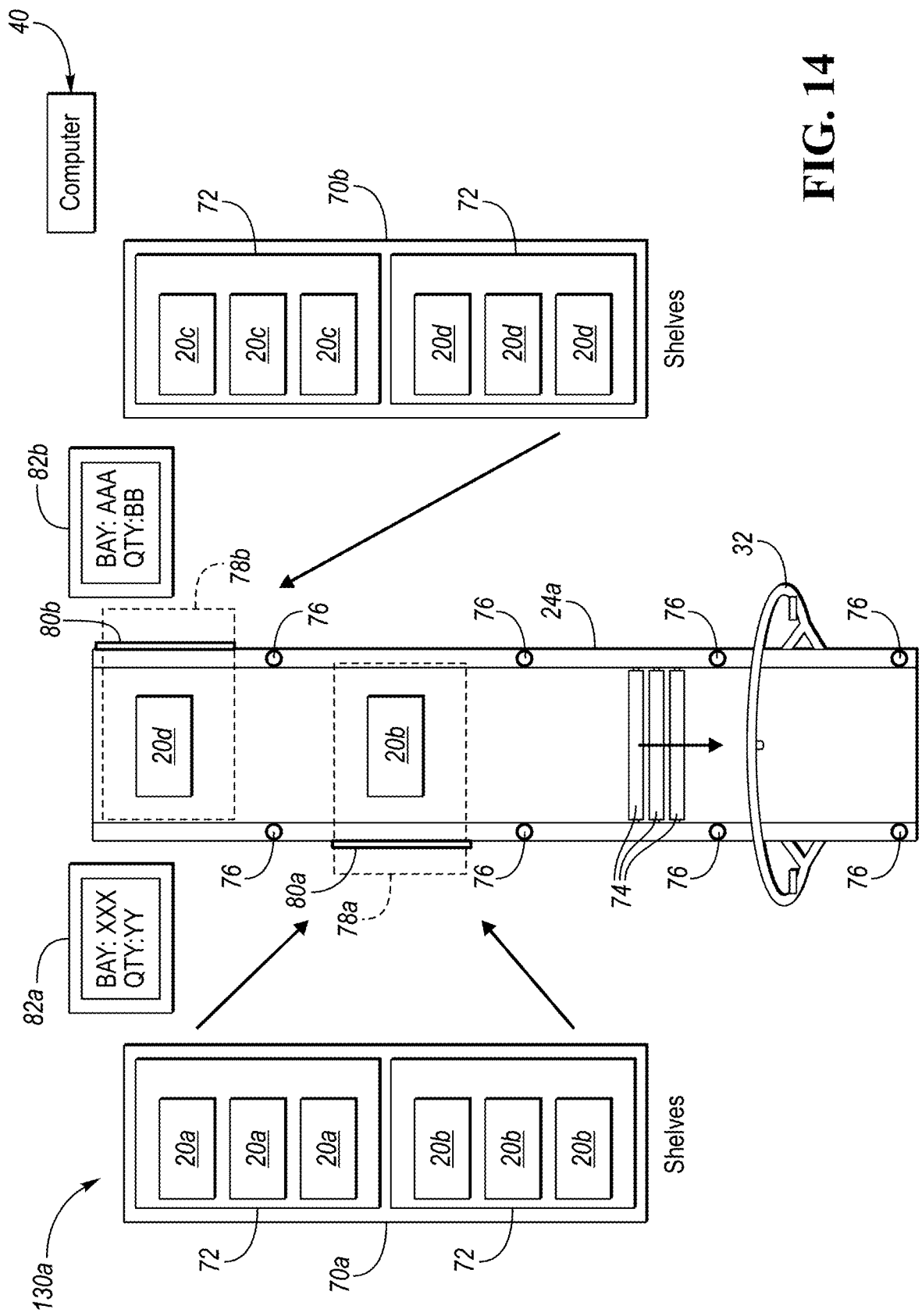
FIG. 14 is a more detailed plan view of the first picking station including the first level conveyor.

FIG. 14 is a more detailed plan view of the first picking station 130a including the first level conveyor 24a. The second level conveyor 24b (and any additional level conveyors) would be identical. The first level conveyor 24a may include a plurality of rollers 74 that are powered to move items down the conveyor. The plurality of rollers 74 may be interconnected by bands, belts, gears, screws, etc, and driven by at least one motor. Spaced along the conveyor 24, e.g. at five foot intervals, are breakbeam sensors 76 that may use lasers, infrared light, visible light, or any wavelength to detect the presence of a package 20 therebetween. Each of the breakbeam sensors 76 indicates to the computer 40 whenever presence at the associated location on the conveyor 24 is detected. The computer 40 may use these signals from the breakbeam sensors 76 to track individual packages on the conveyor 24. Other ways of tracking the location of the packages 20 are described further below and could be used with this first level conveyor 24a and this second level conveyor 24b.

One set of shelves 70 is on each side of the first level conveyor 24a and each includes a plurality of bays 72, each containing packages 20 associated with a particular SKU, e.g. packages 20a (associated with a first SKU), packages 20b (associated with a second SKU), packages 20c (associated with a third SKU), and packages 20d (associated with a fourth SKU). In this example, a first set of shelves 70a on one side of the first level conveyor 24a includes packages 20a and packages 20b, while the second set of shelves 70b on the other side of the first level conveyor 24a includes packages 20c and packages 20d. Of course, there would be many more than two SKUs on each side of each level conveyor. Again, shelves are not required, but packages 20 associated with the same SKU should be together. Optionally, certain SKUs should be selected to be on one side of the conveyor and other SKUs should be on the other side of the conveyor, as will be explained.

In one example, the workers are instructed that packages 20 from the first set of shelves 70a (e.g. packages 20a and packages 20b) should only be placed on the conveyor 24 in a first loading zone 78a, as indicated by a marker 80a. The workers are instructed that packages 20 from the second set of shelves 70b (e.g. packages 20c and packages 20d) should only be placed on the conveyor 24 in a second loading zone 78b, as indicated by a marker 80b.

There could also be a shield or short wall blocking the first loading zone 78a from the second side and a shield or short wall blocking the second loading zone 78b from the first side. The first loading zone 78a and the second loading zone 78b are positioned such that at least one set of breakbeam sensors 76 are positioned downstream before the next loading zone. In this manner, the computer 40 will know whether a package 20 on the first level conveyor 24a was retrieved from the first set of shelves 70a or from the second set of shelves 70b. The computer 40 will associate this location information with that package 20 as it travels down conveyor 24a and as the package 20 passes through the validation station 32.

Optionally, there can be more than one first loading zone 78a on the first side and more than one second loading zone 78b on the second side. In one alternative, any of the first loading zones 78a could be used for packages 20 from the first set of shelves 70a and any of the second loading zones 78b could be used for packages 20 from the second set of shelves 70b. In another alternative, workers are instructed that certain sets of bays 72 should go to specific loading zones on each side. In another alternative, workers are instructed that certain bays 72 should go to specific loading zones on each side. This could be used to provide more information to the computer 40 if necessary in certain applications.

The computer 40 will detect the first breakbeam sensor 76 that detects a package 20 and then the computer 40 will know that the package 20 was first placed in a particular loading zone 78a, 78b (i.e. the loading zone 78 just upstream of the first breakbeam sensor 76 that detected that package 20). From that point on, the computer 40 can track the location of that package 20 as it passes through every subsequent breakbeam sensor 76 (on this conveyor and any subsequent conveyors with breakbeam sensors 76). Other ways of tracking the location of the package 20 are disclosed later and could also be used.

However the package location information is tracked, the computer 40 will associate the location information with the picked package 20, which, depending on how many loading zones 78 are designated, could include some or all of: a) onto which level conveyor 24a, 24b, etc, was the package 20 picked (if no designated loading zones 78 were necessary); b) from which side of the level conveyor 24a, 24b was the package 20 picked (at least two loading zones 78 per level conveyor 24a, 24b are designated); c) from which subset of bays 72 was the package 20 picked (at least one loading zone 78 per subset of bays 72 is designated); and d) from which bay 72 was the package 20 picked (at least one loading zone 78 per bay 72 is designated). Combinations could be used as well, e.g. one loading zone 78 could be designated for a first side of a conveyor 24, another loading zone 78 could be designated for a subset of bays 72 on a second side of the conveyor, and another loading zone 78 could be designated for a specific bay 72 on the second side of the conveyor.

There are a plurality of displays 82a, 82b indicating the bay 72 (i.e. the SKU) of the packages 20 that should be retrieved next and the quantity of such packages 20. This can be done in any of several known ways. First, the displays 82a, 82b could be large displays mounted in a highly visible location(s) throughout the pick area. Second, the displays 82a, 82b could be small displays, each one secured to a different worker's arm (in which case there would be as many displays as workers, each potentially instructing the workers to pick different SKUs). Third, there could be a display 82a, 82b mounted adjacent each of the plurality of bays 72 simply indicating a quantity of packages 20 to be retrieved from that bay 72 and to be placed on the conveyor 24. The displays 82a, 82b are controlled by the computer 40, which sends the quantities of the SKUs necessary to fill the entire wave of pallets 22. The computer 40 sends the quantities of SKUs that are the total of all of the pick lists 60 for all of the pallets 22 in the current wave. Alternatively, the workers can receive instructions via voice to headsets or earpieces, or visual instructions on augmented reality (AR) goggles.

The validation station 32 will detect if a worker picks the wrong SKU, e.g. the display 82a called for a package 20a associated with a first $SKU_A$, but the worker placed a package 20b associated with a second $SKU_B$ on the loading zone 78a. The validation station 32 will detect the $SKU_B$ of package 20b when the $SKU_A$ of package 20a was instructed to be picked. The computer 40 can stop the conveyors 24, or divert the package 20b to the offload conveyor 24e.

As an optional method for handling mis-picks, the computer 40 checks the pick lists for all the pallets 22 in the current wave to see if the incorrectly-picked package 20b is still needed by any of the pallets 22. If so, the computer 40 will reduce by one the quantity of the $SKU_B$ associated with package 20b still needed for the current wave and direct the incorrectly-picked package 20b to the pallet 22 that requires it. If the computer 40 determines that the current wave of pallets 22 does not require the incorrectly-picked package 20b (either the current wave never needed package 20b or all quantities of package 20b have already been picked), then the computer 40 directs the incorrectly-picked package 20b onto the offload conveyor 24e (FIG. 12). The computer 40 also re-instructs a pick of the $SKU_A$ that was originally instructed.

When a package reaches the validation station 32, the computer 40 identifies the SKU using any of the methods as explained herein. However, in this embodiment, the computer 40 has additional information and in some implementations the computer 40 may not have information that was available in the previous embodiment.

First, the computer 40 may know the location from which the package 20 was picked to at least some degree. Even if it just knows the level conveyor 24a, 24b, etc onto which the package 20 was picked, that may be sufficient to resolve a SKU set. If there are not more SKUs in the SKU set than there are levels, then one only needs to ensure that the packages associated with each of the SKUs in the SKU set are staged at different levels (i.e. at different picking stations 130a, 130b). Alternatively, the packages associated with each of the SKUs in the SKU set could be staged on different sides of the level conveyor(s) 24a, 24b. Ultimately, each SKU in a SKU set could be assigned to a different loading zone 78a, 78b, etc.

For example if there are eight SKUs in a particular SKU set, then four loading zones 78 on the first level conveyor 24a (e.g. two from each side) and four loading zones 78 on the second level conveyor 24b (e.g. two from each side) would be sufficient to completely resolve the SKU set. Each of the eight SKUs would be placed in a bay 72 that would be assigned to a different one of the eight loading zones 78. In this manner, since the computer 40 would know from which of the eight loading zones 78 the package 20 was picked, the computer would be able to resolve the SKU set after inferring any one of the SKUs in the SKU set.

Figure 15:
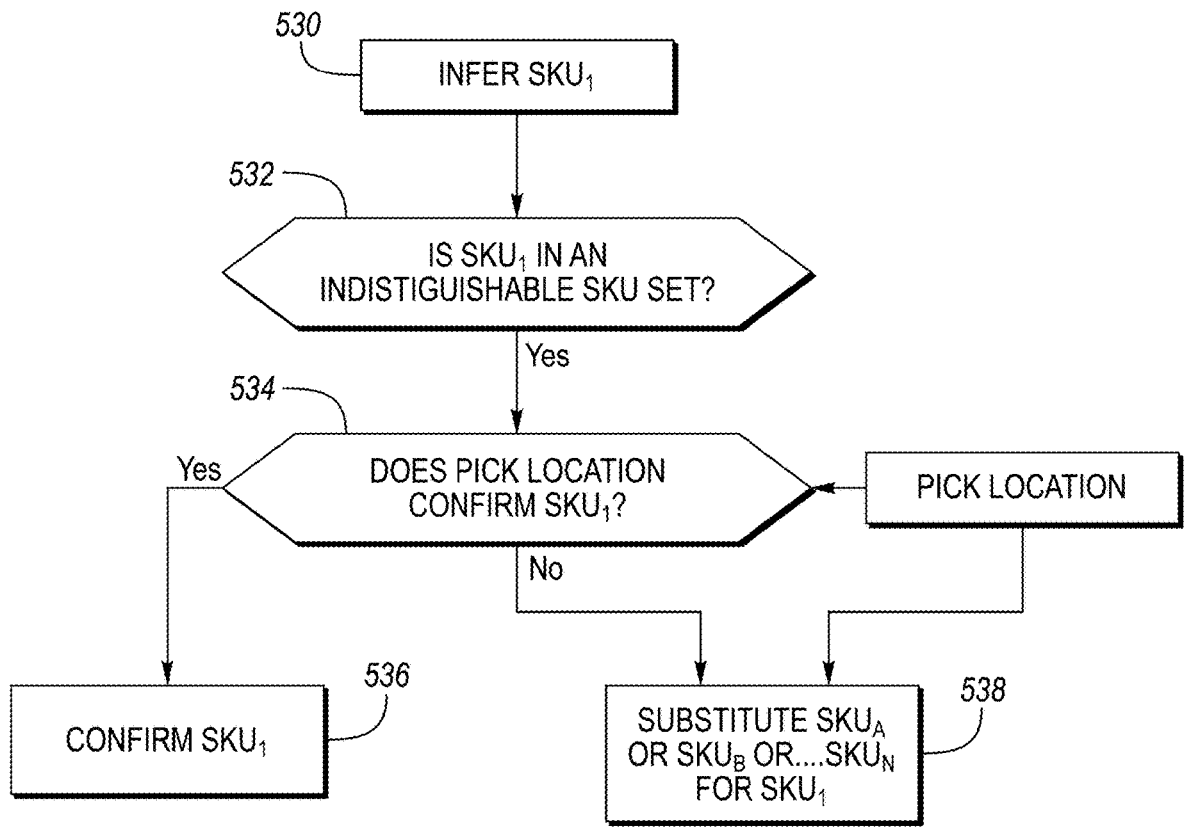
FIG. 15 is a flowchart illustrating one possible method for handling indistinguishable SKU sets.

Referring additionally to FIG. 15, in step 530, the validation station infers $SKU_1$ as described herein. In step 532, the computer 40 determines whether $SKU_1$ is in an indistinguishable SKU set. If so, then the computer 40 examines the pick location information in step 534 (pick location could be any or all of the information described above). If the inferred $SKU_1$ matches the pick location information, then $SKU_1$ is confirmed for the package 20 in step 536. If not, then the computer 40 substitutes the SKU that is associated with the location information in step 538. Alternatively, once any SKU is inferred that is in a SKU set in step 532, the computer 40 could proceed directly to step 538 to resolve the SKU based on the pick location information (i.e. choosing one of the SKUs within the identified SKU set based upon the pick location information).

More generally, the location information could be used to override the highest confidence inferred SKU(s) (or package type(s) or brand(s)) that are inconsistent with the location information. Instead, the computer 40 may determine that the SKU of the package 20 is the highest confidence inferred SKU (or package type or brand) that is consistent with the location information.

Figure 16:
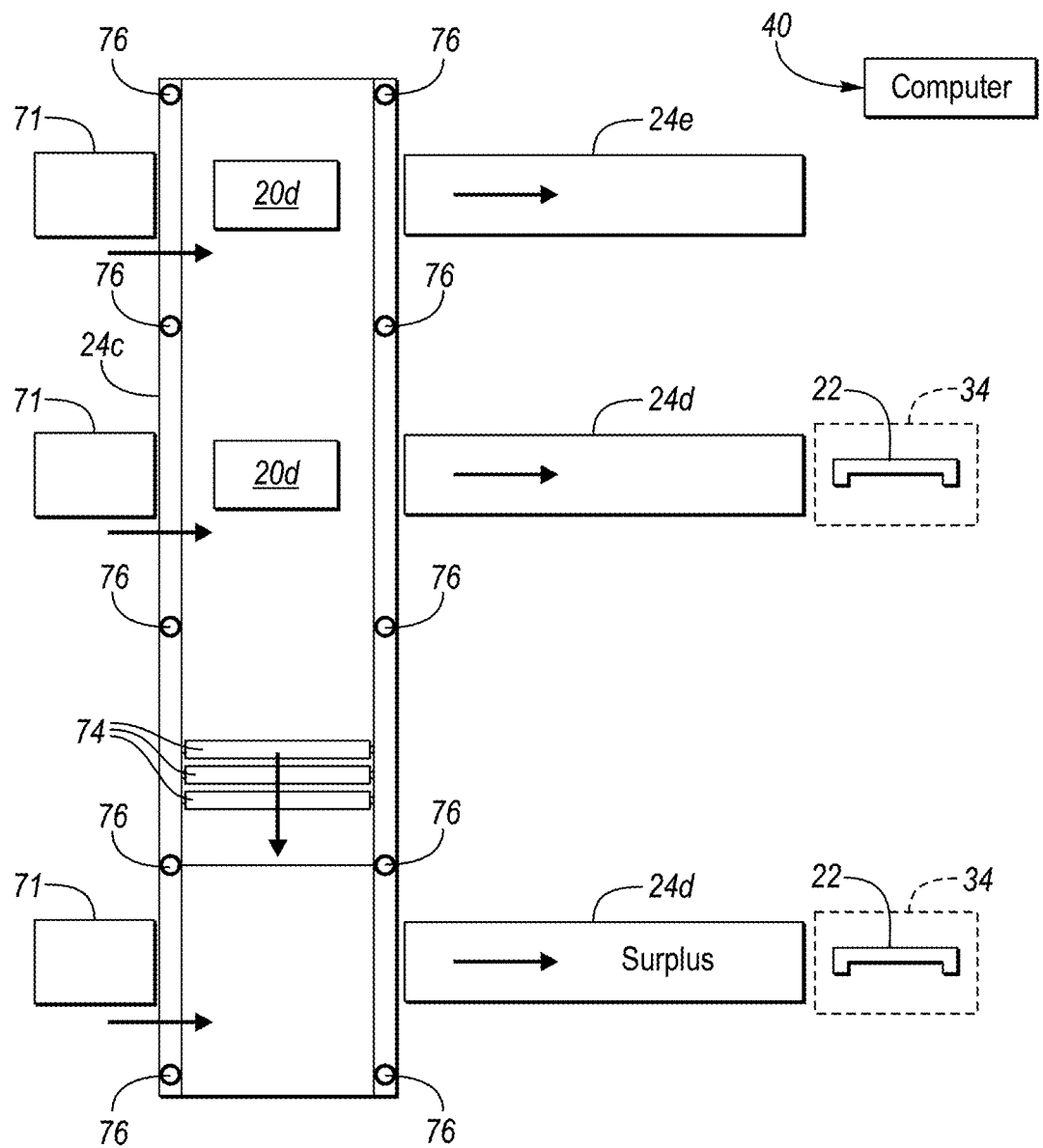
FIG. 16 is a more detailed plan view of the wave conveyor of FIG. 12.

FIG. 16 is a more detailed plan view of the wave conveyor 24c of FIG. 12. As shown, the wave conveyor 24c also includes the breakbeam sensors 76 so that the location of each of the packages 20, having been identified at the validation stations 32, continues to be tracked. Again, other ways of tracking the location of the packages 20 are described below and could be used with this wave conveyor 24c. As each package 20 travels the wave conveyor 24c, when the computer 40 determines that that package 20 (having the associated SKU) is needed for a particular one of the plurality of pallets 22, the computer 40 commands the appropriate diverter 71 to divert that package 20 onto the final conveyor 24d associated with that pallet 22. The package 20 then travels down that final conveyor 24*d*, e.g. via gravity, where it waits for a worker (or robot) to move it onto the pallet 22.

A plurality of packages 20 may be queued on each of the plurality of final conveyors 24*d*, waiting for the workers (or robots) to move them onto the pallets 22. In fact, packages 20 for the next wave of pallets 22 can also be queued on the plurality of final conveyors 24*d*, so there is no need to stop picking packages 20 while waiting for a wave of pallets 22 to be moved out and a new wave of pallets 22 to be moved in. As shown, the wave conveyor 24*c* also includes a plurality of rollers 74 (only three shown) that are powered to move the packages 20 along the wave conveyor 24*c*. Optionally, the offload conveyor 24*e* of FIGS. 12 and 13 may be positioned at the start of the wave conveyor 24*c* instead of at the end of the level conveyors, i.e. soon after the validation stations 32 of the level conveyors.

Figure 17:
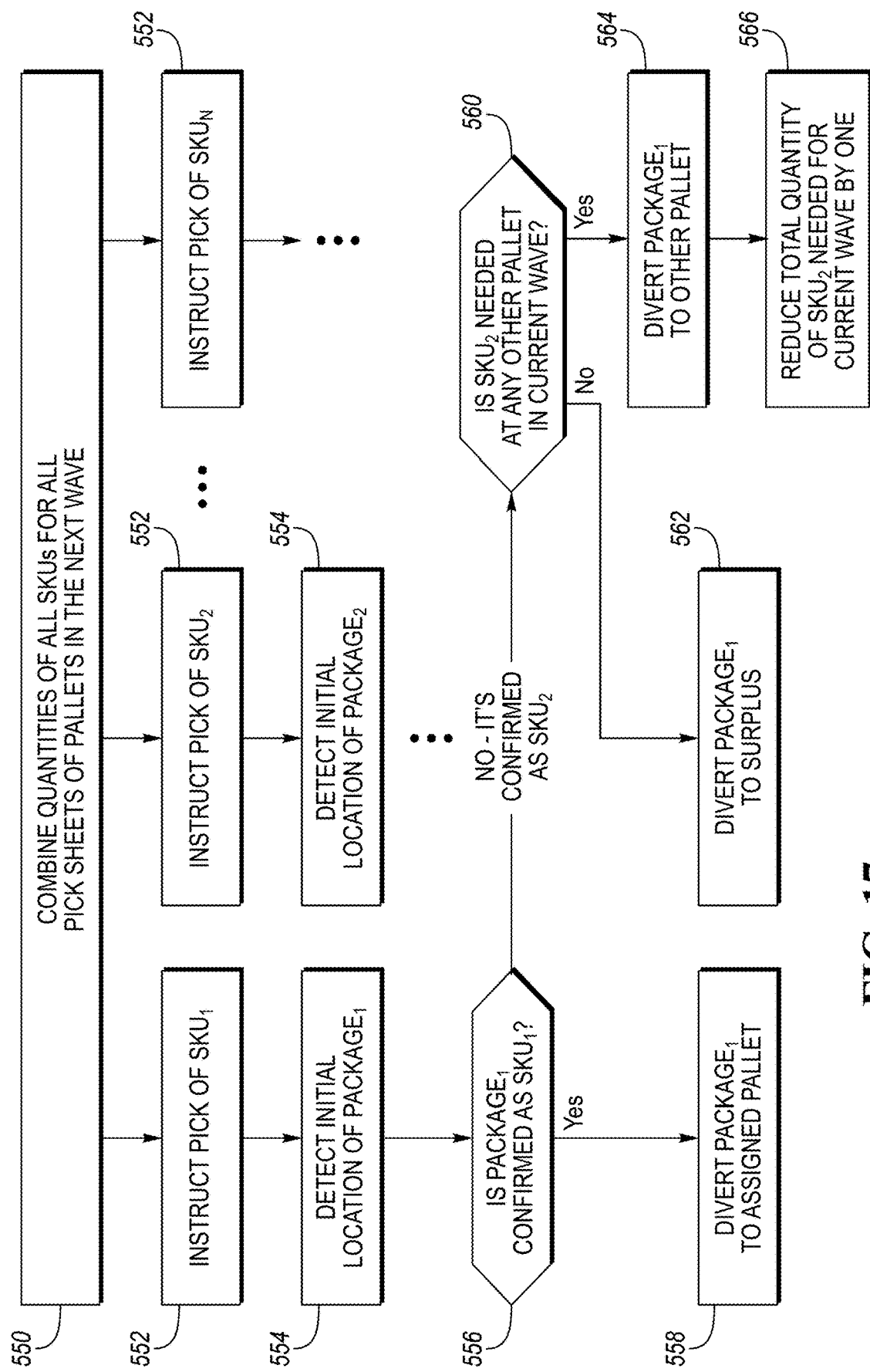
FIG. 17 is a flow chart of one possible method by which the pallet loading and validation system handles mis-picks.

FIG. 17 is a flow chart of one example of how the pallet loading and validation system 110 could handle mis-picks. First, in step 550, the quantities of all the SKUs needed for all the pallets 22 in the next wave are aggregated. For example, if one pallet 22 requires three $SKU_1$, another pallet requires four $SKU_1$ and another pallet requires five $SKU_1$, then the computer 40 aggregates these into a single pick request for twelve packages 20 associated with $SKU_1$. This is done for all the SKUs required by all of the pallets 22 in the next wave.

In step 552, the computer 40 instructs the pick of $SKU_1$ including the quantity to pick (e.g. twelve). This may be done using one of the displays 82*a* (FIG. 14). In parallel, the computer 40 instructs the pick of a quantity of $SKU_2$ and the quantities of a plurality of additional SKUs, up to the number of displays 82 or workers at each of the levels.

The computer 40 detects the initial location of a package 20 that was placed in response to the pick instruction of $SKU_1$ in step 554. For example, the computer 40 may detect the loading zone 78 just upstream of the first breakbeam sensor 76 that detected package 20.

In step 556, the computer 40 determines (via any of the methods described herein) whether the package 20 picked in response to the instruction to retrieve a package 20 associated with $SKU_1$ was correctly picked and is actually $SKU_1$. If so, then the package 20 is diverted to the assigned pallet 22 as described above. If not, then in step 560 the computer 40 determines that the package 20, which was actually identified as $SKU_2$, is needed to fill any other pallet 22 in the current wave. If so, that package 20 is directed to that pallet 22 in step 564 and the computer 40 marks that $SKU_2$ as having been picked in step 566 (e.g. decreasing the quantity of $SKU_2$ that will be instructed to be picked for the current wave). The pick items requested on displays 82*a*, 82*b* would be adjusted in real time for pick mistakes previously made but diverted to another pallet 22 in the current wave. If the mis-picked $SKU_2$ is not needed in the current wave, then the package ($SKU_2$) is diverted to the offload conveyor 24*e*.

Erroneous or surplus picked packages 20 are not a problem because they are easily handled by the offload conveyor 24*e* and returned to a level conveyor 24*b*.

Alternatively, the method of FIG. 17 could be operated without step 556. In other words, the package is always identified but not compared to a specific pick. Rather, the identified SKU of the package is always compared against the remaining needs of the current wave in step 560 and then diverted to the appropriate pallet.

Because the SKUs in an entire wave can be picked in any order, this also alleviates the problems with short picks. The shelves 70 can only hold a limited number of packages 20. If some SKUs run out during a wave, those SKUs can be delayed to the end of the wave (via an input from a worker to the computer 40). First, by the end of the wave, it is likely that those SKUs have been replenished and can then be picked. Alternatively, a worker at one of the pick stations 130*a*, 130*b*, can signal to the computer 40 (via a user interface on displays 82*a*, 82*b*) to close out the wave, in which case invoices for the pallets 22 that are short would be adjusted by the computer 40. Alternatively, the worker can close out the wave, start picking the next wave, and another worker can still bring the missing SKUs directly to the needy pallet(s) 22 (or adjacent its associated final conveyor 24*d*).

Figure 18:
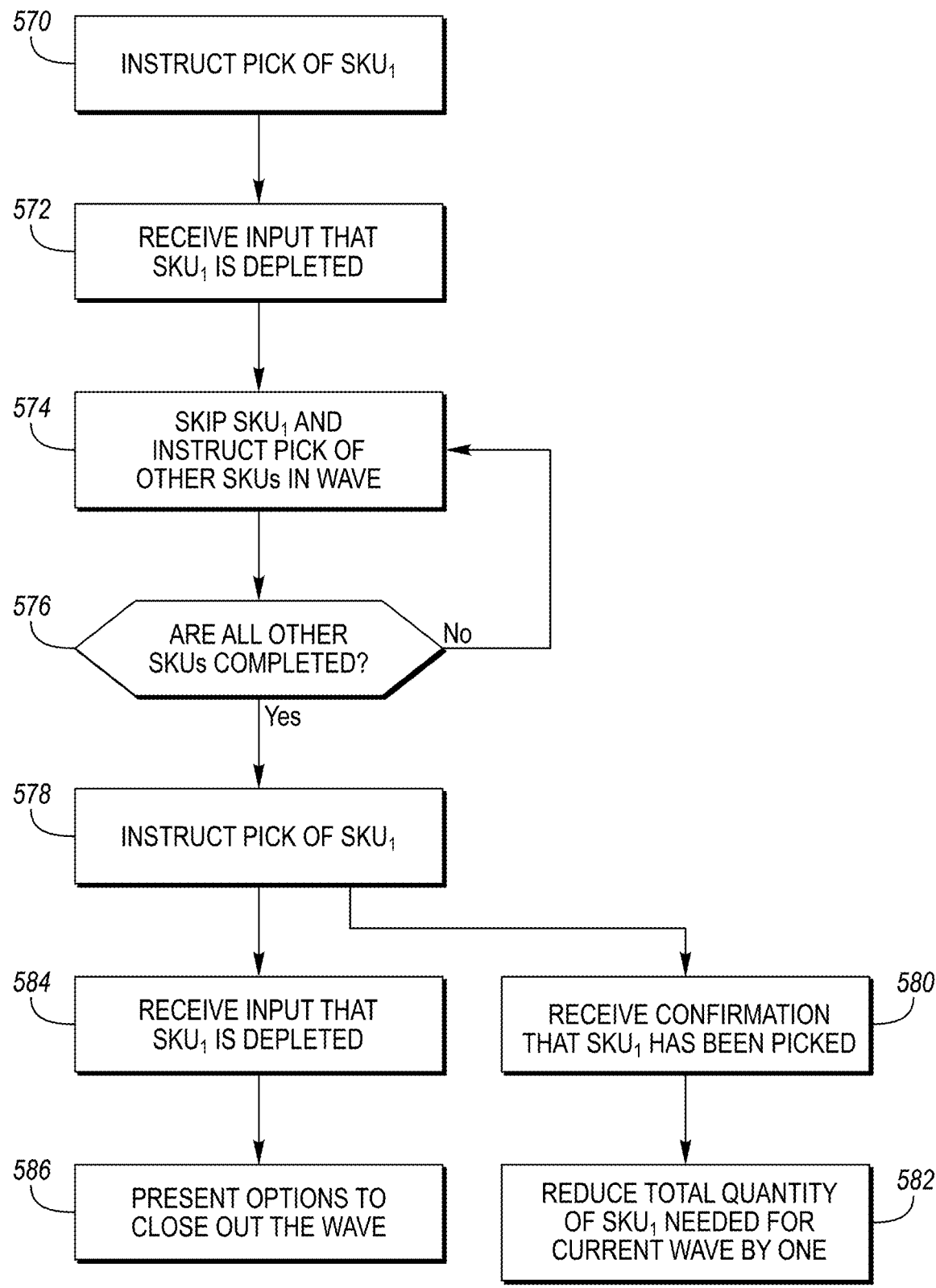
FIG. 18 is a flow chart of one possible method by which the system handles short picks.

FIG. 18 is a simplified flow chart of one way the computer 40 could handle short picks. In step 570, the computer 40 instructs a worker to pick a particular SKU. Via a user interface, such as the display 82, voice, buttons or other means, the computer 40 receives an input from the worker that the requested SKU is depleted at the picking station 130. In step 574, the computer 40 skips that SKU and continues instructing the remainder of the SKUs for that wave. When all the other SKUs have been completed in step 576, the computer 40 again instructs the worker to pick that SKU (and any other SKUs that were indicated as depleted).

If the computer 40 receives a confirmation from a validation station 32 that the requested SKU has been picked, then the computer 40 reduces by one the quantity of that SKU that remains to be picked in step 582. The computer 40 tracks how many packages 20 of the requested SKU are picked and how many still need to be picked. If there are still other SKUs that had previously been indicated as depleted in this wave, the computer 40 returns to step 578.

If the computer 40 receives an input in step 584 that the requested SKU is still depleted, then the computer 40 may present options for closing out the wave in step 586, such as: adjusting the invoice(s) for the affected pallet(s) or bringing the missing SKU(s) to the affected pallet(s) later. Of course, if multiple SKUs were temporarily skipped as depleted, the computer 40 would try again to fill all quantities of all of those SKUs before permitting the wave to be closed out. The computer 40 can then start processing the next wave, e.g. returning to step 550 of FIG. 17.

Figure 19:
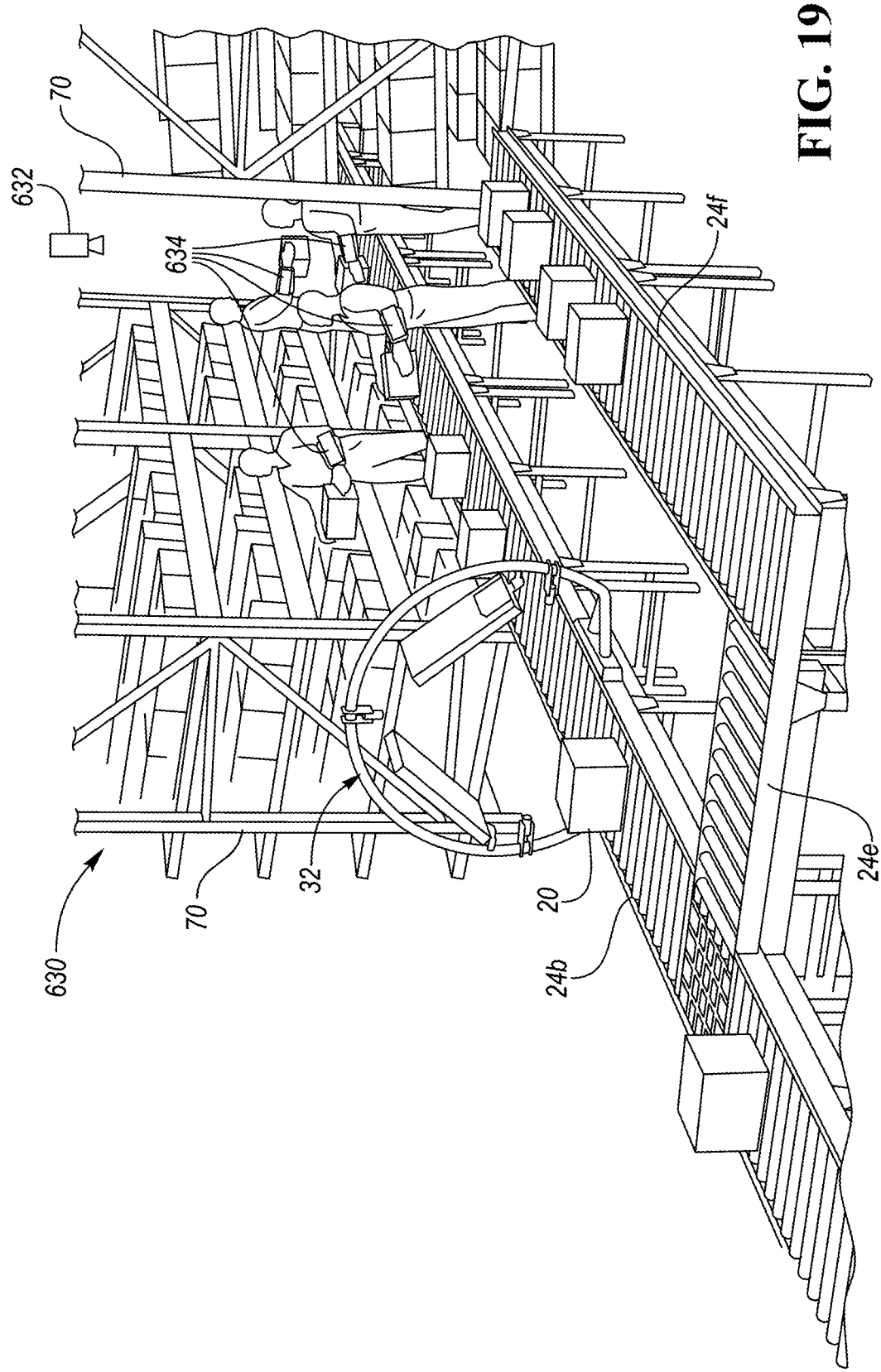
FIG. 19 shows a picking station according to another embodiment that could be implemented in the pallet loading and validation system of FIG. 12.

FIG. 19 shows a picking station 630 according to another embodiment that could be implemented in the pallet loading and validation system 110 of FIG. 12. The picking station 630 again includes the second level conveyor 24*b*, offload conveyor 24*e*, return conveyor 24*f*, validation station 32, and shelves 70 previously described.

The picking station 630 further includes a top camera 632 mounted above the picking station 630, such as to the ceiling. The top camera 632 is directed downward to get an overhead view of the shelves 70 and the entire second level conveyor 24*b* at least up to the validation station 32. The top camera 632 takes images at a rate sufficient to track packages 20 as explained herein, e.g. every half-second. Alternatively, multiple top cameras 632 could be used.

With the overhead view, the computer 40 receives images from the top camera(s) 632 that enable the computer 40 to track packages 20 as they are brought from the shelves 70 to the second level conveyor 24*b*. The top camera(s) 632 then image the packages 20 as they travel on the conveyors, e.g. from the second level conveyor 24*b* to the validation station 32 so that the computer 40 can track the package 20. If the package 20 is diverted to the offload conveyor 24*e* and the return conveyor 24*f*, the top camera(s) 632 will take images of the package 20 and send them to the computer 40, so that the computer 40 can continue to track the package 20. In other words, the computer 40 will know the initial location of the package 20 (e.g. which shelf) as it travels through the validation station 32 and (if appropriate) back on the offload conveyor 24e and the return conveyor 24f.

Additional top cameras 632 could track the packages 20 onto the wave conveyor 24c, etc. The top camera(s) 632 could provide the location information described above and replace the loading zones 78a, 78b and the breakbeam sensors 76 in any of the embodiments disclosed herein. Alternatively, the top camera(s) 632 could be in addition to or in supplement to the loading zones 78a, 78b and/or breakbeam sensors 76.

In the example shown, the sets of shelves 70 each have four shelves or packages 20 at four heights. Therefore, the computer 40, based upon the images from the top camera(s) 632 may not be able to discern between the four heights. The computer 40 may only be able to discern that a package 20 was picked from a one of four vertically-aligned bays 72 (FIG. 14), but not which one. Even if each of those bays 72 each contains a different SKU, this provides significant information regarding the SKUs of those packages 20, i.e. narrowed down to one of only four SKUs. As explained above, by placing the SKUs strategically (i.e. do not place indistinguishable SKUs in the same column of bays 72), this can be used to resolve SKU sets (indistinguishable SKUs).

Alternatively, the camera 632 may only be able to discern confidently that the package 20 came from a group of three columns of four vertically-aligned bays 72. In the worst case, the computer 40 then already knows that the package 20 is one of twelve SKUs. Again, by keeping SKUs in a SKU set (indistinguishable SKUs) further away from each other than the ability of the top camera 632 to discern a bay 72, the computer 40 can track the location from which the package 20 was picked and resolve a SKU set.

The location information can also be used to learn a new SKU. If the computer 40 knows that there are packages 20 associated with a new SKU (i.e. the SKU is not trained in the machine learning model(s)), in a particular location, the computer 40 can use location information (such as from the top camera 632) to identify the new SKU. When the computer 40 instructs a worker to pick the new SKU for the first time, the computer 40 knows (at least within some range, as explained above) the location from which the package 20 was picked. The computer 40 then receives the inferences from the validation station 32 of the package 20. Because the package 20 corresponds to a new, untrained SKU, the confidence levels of the inferences are likely below a threshold. Based upon the inferences, the computer 40 can eliminate the package 20 being one of the other SKUs in bays 72 near the tracked location and deduce that the package 20 has been correctly picked and is the new SKU. Of course, in some implementations the computer 40 may be able to completely resolve the SKU of the package 20 just based upon the initial location as determined from the images from the top camera(s) 632, either because the top camera(s) 632 is positioned to sufficiently resolve the shelf from which the package 20 was retrieved, or because enough shelves contain the same SKU that the computer 40 can resolve the SKU.

Because the machine learning models have not yet been trained on the new SKU, the computer 40 will still generate outputs based upon the images of the package 20 and it will infer some known classifiers (e.g. SKUs and/or package types and/or brands), each at a confidence level—presumably a low confidence level. Even though the machine learning models have still not been trained on images of the new SKU, the computer 40 now knows the "fingerprint" of the new SKU (i.e. the numeral output of the image feature extractor) such that any subsequent package 20 passing through the validation station 32 can now be identified as the new SKU by comparing the numeral output generated based upon images of this first package 20 confirmed as the new SKU and the numerical outputs of subsequent packages 20 using a feature similarity technique. The computer 40 may record several outputs based upon images of the new SKUs to make sure that they are all sufficiently similar to each other to eliminate the possibly of error before identifying other packages 20 to be the new SKU based upon the image similarity analysis.

The top camera 632 may also provide many other advantages, as will be described herein. Again, the top camera 632 may be more than one camera 632, and other top cameras may cover the rest of the pallet loading and validation system 110 so that the computer 40 can track every package 20 from a shelf 70 to a pallet 22.

As before, multiple workers can pick packages 20 simultaneously. Each worker is given instructions to pick different SKUs by the computer 40, which may communicate with them through a mobile device 634 carried by or mounted to each worker. In the example shown in FIG. 19 and FIG. 20, the mobile device 634 is secured to each worker's wrist.

As can also be seen in FIG. 20, each mobile device 634 may have a user interface, such as a touch display, speaker, and/or microphone. Each mobile device 634 also includes a wireless communication circuit (such as Bluetooth, wifi, cell data, etc) for communicating with the computer 40. The mobile device 634 also includes a barcode scanner 636. The mobile device 634 could be used to instruct workers to pick SKUs in any of the embodiments herein.

The use of the mobile device 634 will be described with respect to FIGS. 19 and 20.

First, if the computer 40 knows that it is giving an instruction to pick a new SKU for the first time (e.g. the machine learning model(s) 56 have not been trained on the SKU not even an old version of the SKU), the computer 40 can instruct the worker via the mobile device 634 to pick the package 20 corresponding to that SKU such as is shown in FIG. 20, i.e. referencing a specific bay 72 and/or a specific location, showing a picture of the SKU, indicating the quantity, etc. The computer 40 also instructs the worker to use the barcode scanner 636 on the mobile device 634 to scan the barcode on the package 20. This confirms to the computer 40 that the package 20 picked by the worker is indeed the new SKU (again, possibly in combination with location information). The computer 40 then instructs the worker to place the package 20 onto the conveyor 24. The computer 40 tracks the location of the package 20, e.g. via the top camera 632.

The package 20 corresponding to the new SKU is then imaged by the validation station 32. The machine learning models 56 have not yet been trained on the new SKU, but again the computer 40 will generate an output using the machine learning models 56. This output uniquely identifies the appearance of the new SKU and is stored by the computer 40 in association with the new SKU. Even though the machine learning models have still not been trained on images of the new SKU, any subsequent package 20 passing through the validation station 32 can now be identified as the new SKU if the output of the computer 40 using the machine learning models 56 is similar enough to the output stored by the computer 40 and associated with the new SKU. The image similarity techniques described herein could be used.

After gathering images of a sufficient number of packages 20 associated with the new SKU, the machine learning models can then be trained on those images, such that the new SKU will then be inferred at a high confidence level. This may occur at the end of the day, or the end of the week. In the meantime, the packages 20 associated with the new SKU are accurately identified at the validation station 32 via the image similarity technique.

Optionally, the computer 40 may instruct worker(s) to scan the barcode of a known new SKU more than once following the above process to eliminate any potential for error.

Second, the same process can be followed if the computer 40 knows that the packaging (appearance) of an existing SKU has changed.

Figure 21:
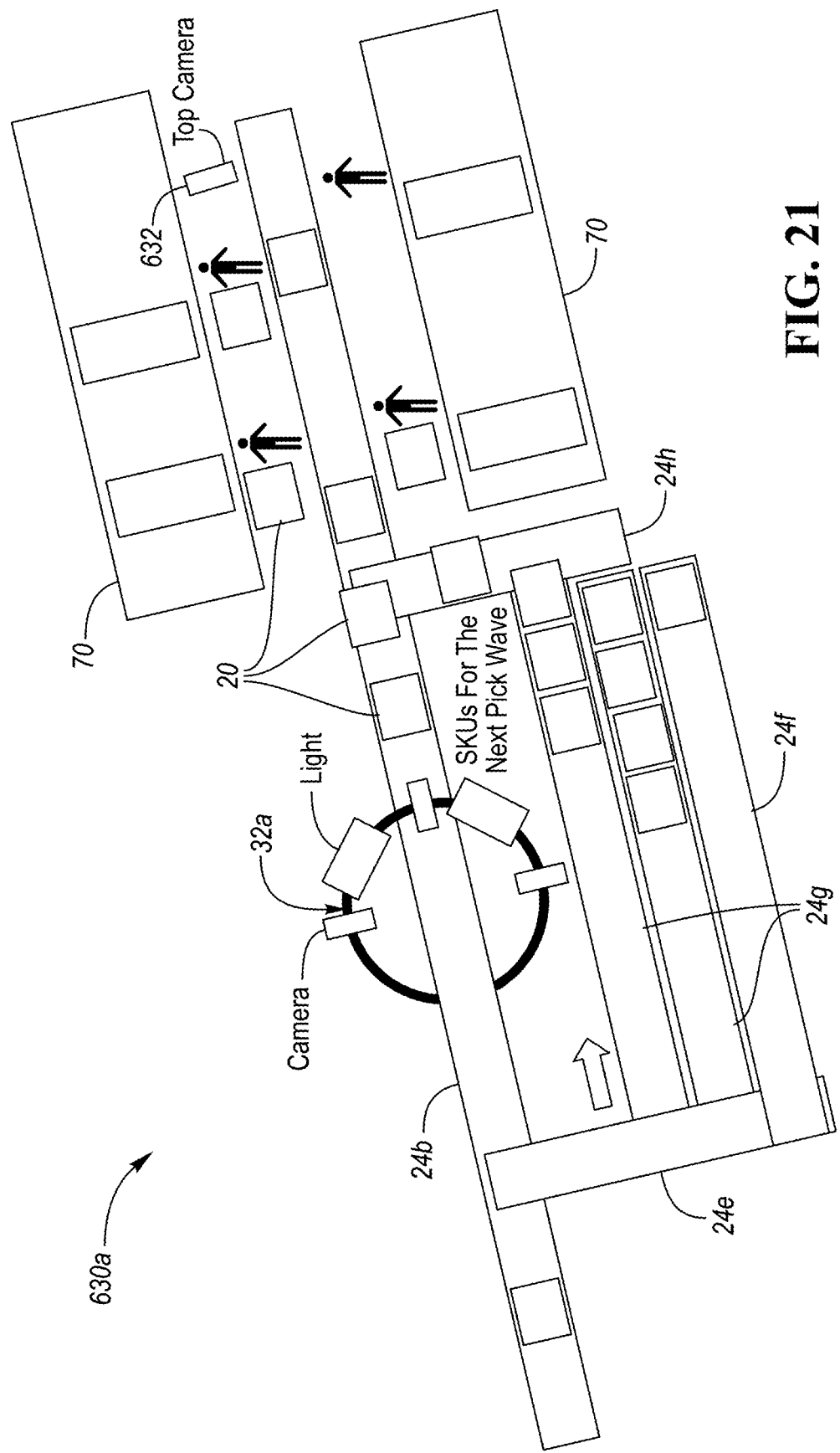
FIG. 21 is a plan view of another picking station that could be used in the pallet loading and validation system of FIG. 12.

Third, it may happen that the computer 40 is not expecting a change in the packaging appearance of an existing SKU, but after instructing a worker to pick a SKU, the validation station 32 returns inferences at low confidence levels (at least for the expected SKU or brand or package type) and probably for all SKUs (or brands or possibly the package types, if it is a new package type)). Again, the computer 40 registers an output of the machine learning models 56 (such as via a feature extractor) of the SKU whose appearance has changed. Referring to FIG. 21, the computer 40 then causes the package 20 to be diverted onto offload conveyor 24e and then onto a recirculating conveyor 24g. There may be more than one recirculating conveyor 24g. When commanded by the computer 40, the recirculating conveyors 24g feed a feedback conveyor 24h that feeds each package 20 back onto the conveyor 24 just upstream of the validation station 32.

The computer 40 may hold the package 20 on one of the recirculating conveyors 24g while it instructs the worker to pick another package 20 associated with the same SKU, but this time the computer 40 instructs the worker to scan the barcode with the mobile device 634 and then place it on the conveyor 24. If the validation station 32 returns the same (i.e. sufficiently similar) output after imaging the second package 20, which was confirmed with a barcode scan, then the computer 40 determines that the packaging for that SKU has changed. The computer 40 then routes that package 20 according to the pick list.

If needed to satisfy quantity, the first package 20 can then be routed as well. The computer 40 commands the recirculating conveyor 24g holding the packages 20 associated with the changed SKU and the feedback conveyor 24h to direct onto the level conveyor all of the packages 20 held on the recirculating conveyor 24g. The locations of the packages 20 are also tracked by the top camera 632 and computer 40, but the packages 20 are validated again at the validation station 32. Now that the computer 40 has stored the output of the new appearance of the SKU, the first package 20 will be confirmed at the validation station 32 and will not be diverted onto offload conveyor 24e but will be passed onto wave conveyor 24c and then to the appropriate pallet 22. Any other packages 20 that have been held on the recirculating conveyor 24g will again be diverted back to the recirculating conveyor 24g for subsequent waves.

From then on, the computer 40 accepts packages 20 that return the same output (i.e. sufficiently similar using an image similarity technique) as that SKU. If there are still packages 20 with the old packaging/appearance in inventory as well, those packages 20 would continue to be validated as that SKU in the validation station 32.

The picking station 630a of FIG. 21 is the same as the picking station 630 except as described herein or shown in the drawings. The picking station 630a would feed the wave conveyor 24c of FIGS. 12 and 16.

As explained above, any mis-picked packages 20 can be diverted onto offload conveyor 24e and onto recirculating conveyor 24g (in this example, there is more than one recirculating conveyor 24g). With the addition of the feedback conveyor 24h, the packages 20 cached in the recirculating conveyors 24g can be fed back onto the level conveyor 24 at the beginning of the next wave. At the beginning of the next wave, the computer 40 controls the recirculating conveyor 24g and the feedback conveyor 24h to feed the cached packages 20 onto the level conveyor 24.

Having previously identified them at the validation station 32 and tracked them (e.g. via the overhead camera 632), the computer 40 knows what packages 20 (i.e. what SKUs) are cached in the recirculating conveyors 24g, so the computer 40 does not send instructions to pick those SKUs (at least, that quantity of those SKUs that are cached) at the beginning of the next wave. After each package 20 is run through the validation station 32 and the identified SKU is confirmed and the computer 40 confirms that the SKU is needed in this wave, the package 20 is routed to wave conveyor 24c and to the appropriate pallet 22. The computer 40 can mark that quantity of those SKUs as already picked. If it is not needed in this wave, then it is again diverted to the cache for use in a future wave.

If for some reason, the packages 20 that were previously diverted to the cache do not show up at the validation station 32 at the beginning of the next wave, then the computer 40 can then send instructions to pick those SKUs to the workers, if necessary.

In this manner, the mis-picked SKUs can keep being re-fed into each succeeding wave. A mis-picked SKU never stops the system. Mis-picked SKUs are either diverted to other pallets 22 in the current wave (as explained previously) or cached for future waves.

The picking station 630a of FIG. 21 is the same as the picking station 630 except as described herein or shown in the drawings. The picking station 630a would feed the wave conveyor 24c of FIGS. 12 and 16. Optionally, a package 20 that generates low confidence levels at the validation station 32 can be diverted to the return conveyor 24f. The computer 40 then instructs a worker to scan the barcode of that package 20 with the mobile device 634. The computer 40 may then determine that the package 20 is a new SKU or an existing SKU with new packaging/appearance. The computer 40 associates the image feature numeral output with the new SKU (or changed SKU). The computer 40 then instructs the worker to place the package 20 onto the feedback conveyor 24h (or the level conveyor 24) where the package 20 again passes through the validation station 32 and gets routed to the appropriate pallet 22.

Figure 22:
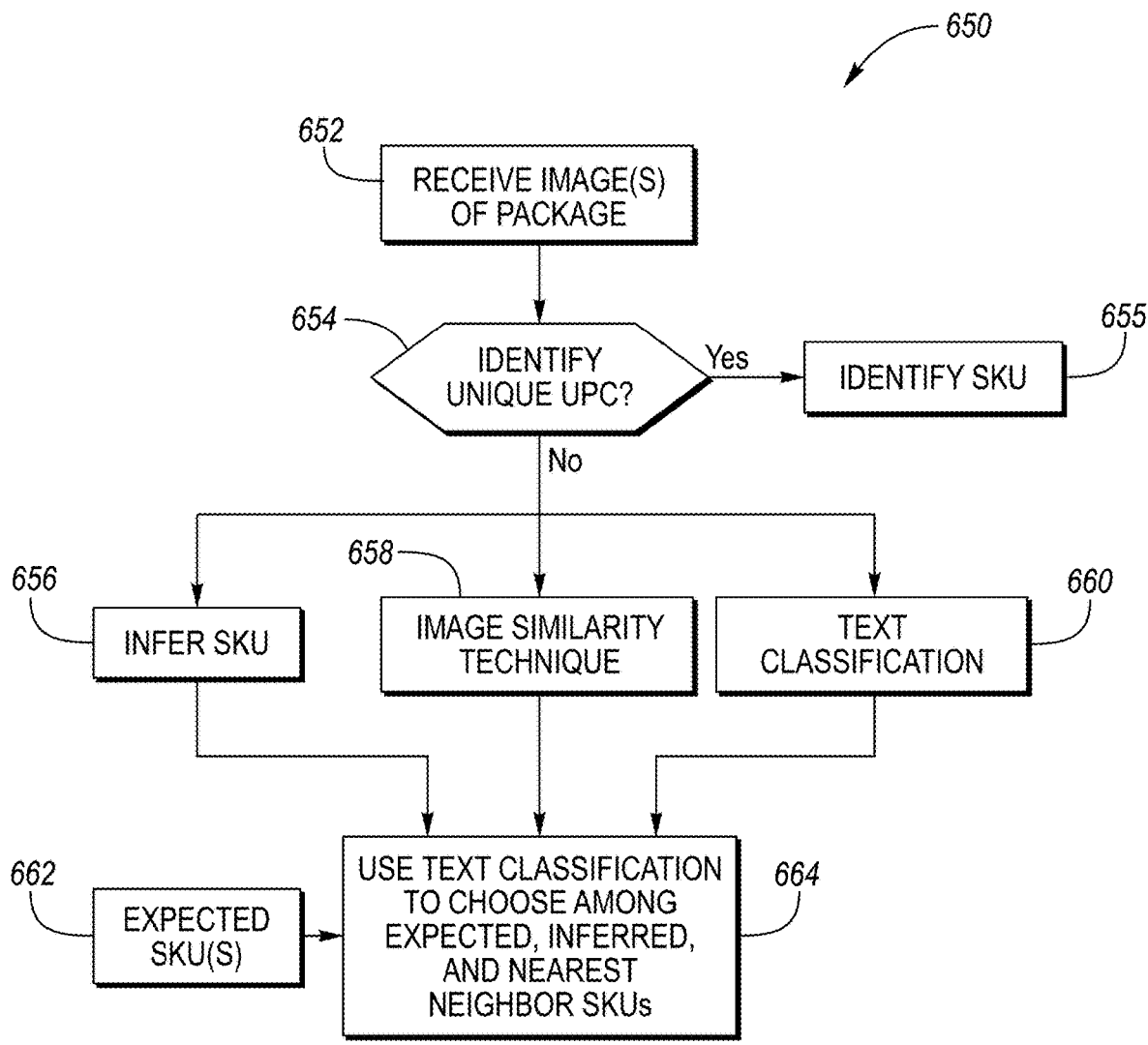
FIG. 22 is a flowchart of one example method for the computer to use a plurality of different techniques together to identify a SKU of a package.

FIG. 22 is a flowchart of one example method 650 for the computer 40 to use a plurality of different techniques together to identify a SKU of a package 20. This could be implemented in any of the embodiments disclosed herein. In step 652, the computer 40 receives at least one image of a package 20. In step 654, the computer 40 first determines whether a UPC can be read from the at least one image of the package 20, and if so, whether that UPC uniquely identifies a SKU. Again, some UPCs uniquely identify a single SKU and some UPCs are associated with a plurality of different SKUs. If the computer 40 can identify a UPC that uniquely identifies a SKU in step 654, then the computer 40 associates that SKU with the package 20 and the other steps are not performed.

If the UPC is either not identified or is not uniquely associated with a single SKU, then the computer 40 performs the methods described herein using one or more machine learning models to infer a SKU in step 656. The computer 40 also performs an image analysis using Image Similarity Techniques (such as supervised contrastive (SupCon) learning and Nearest Neighbor techniques) in step 658. These will be described with respect to FIGS. 24 and 25 below.

The computer 40 also performs Optical Character Recognition (OCR) on the image(s) of the package 20 to detect text and optionally reads barcodes other than UPC. In step 660, the computer 40 performs a text classification process and optionally identifies barcodes other than UPC. This will be described in more detail with respect to FIG. 23 later below.

The computer 40 receives one or more expected SKUs 662, e.g. based upon what has been instructed to be picked recently from the pick list and has not yet passed through the validation station 32. There may only be one expected SKU 662 in a single flow configuration or there may be many expected SKUs (up to an entire wave) in other configurations.

In step 664, the computer 40 first compiles a list of SKUs including the expected SKU 662 (or SKUs 662), the SKU that was identified using the machine learning models (and other associated techniques described above) in step 656, and the one or more SKUs identified from the Image Similarity Techniques in step 658.

If a single SKU identified from the Image Similarity Technique in step 658 has a confidence level exceeding an upper threshold, then text classification is not used and the SKU identified in step 658 is chosen as the SKU associated with the package 20.

If the SKUs identified from the Image Similarity Technique in step 658 have a confidence level below a lower threshold and if the text classification also has a low confidence level, then the SKU inferred in step 656 is associated with the package 20.

If the SKU(s) identified from the Image Similarity Technique in step 658 have a confidence level exceeding the lower threshold but below the upper threshold, and the text classification step 660 found some text with high confidence, then the computer 40 uses the text to choose between the inferred SKU (step 656), the SKU(s) from the Image Similarity Technique step 658, and the expected SKU 662.

Figure 23:
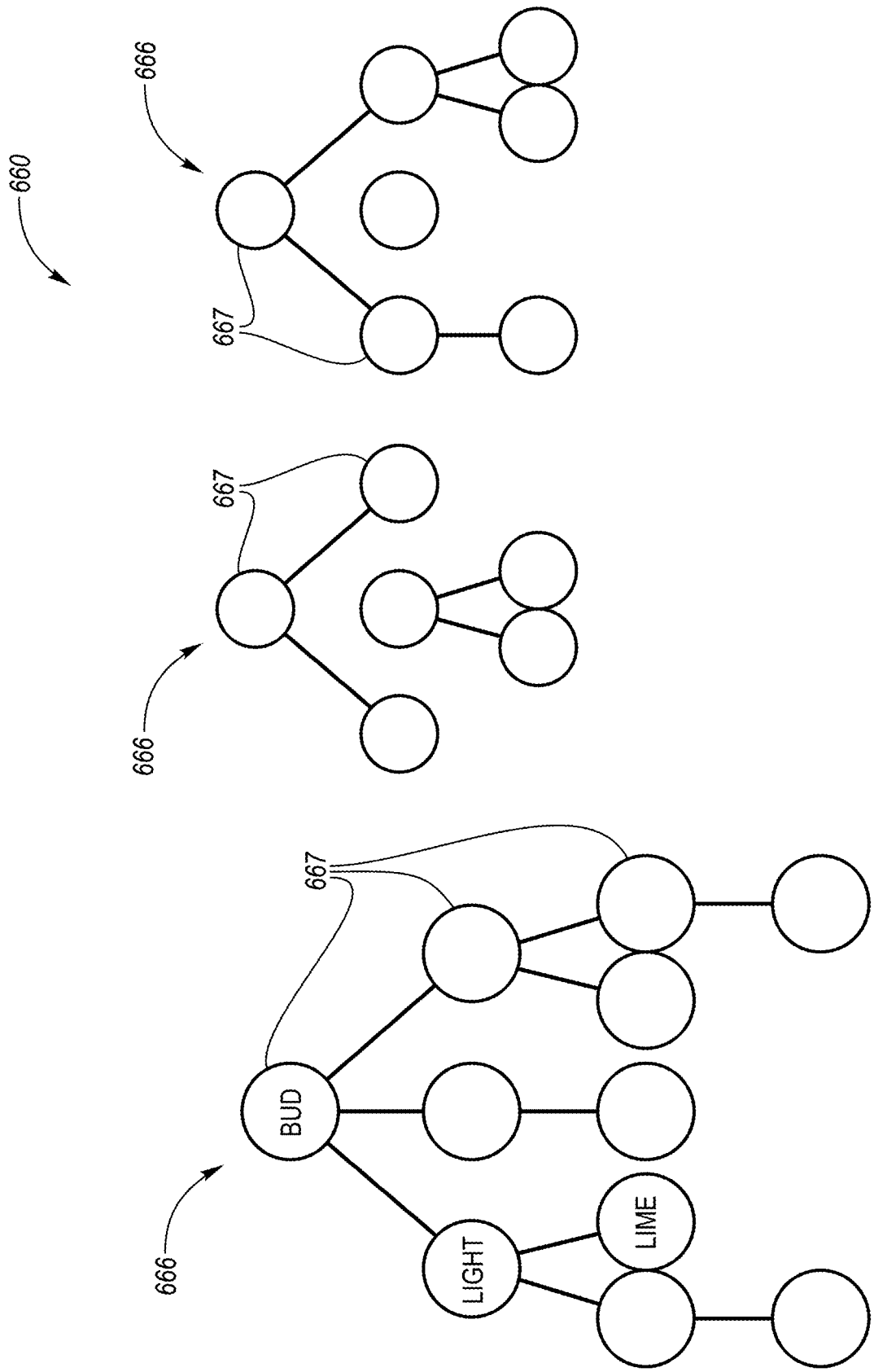
FIG. 23 shows a decision forest that can be used by the computer for text matching to identify a SKU.

One example method for the text classification step 660 (or text matching) is shown in FIG. 23. One example method for performing text classification is by using a decision forest. FIG. 23 shows a decision forest, i.e. a plurality of decision trees 666, more than one of which may be traveled simultaneously depending on how many text portions (words or partial words) or barcodes or partial barcodes were detected in the image(s). Each node 667 may comprise a relevant text portion (or barcode or partial barcode). Nodes 667 connected by branches from other nodes 667 are all present on at least one available SKU. For example, the text portion "bud" may be present on a large set of SKUs. If the text portion "bud" is detected, the computer 40 also determines if the text portion "light" is also detected, which reduces the number of possible SKUs. If the computer 40 also detects that the text portion "lime" was present in the image(s), then the possible SKUs associated with the image(s) is even further reduced. Other text portions (or barcodes) may also be detected on the same package 20 and may be processed along other decision trees 666 simultaneously. The combination of nodes 667 detected on the package 20 creates a subset of possible SKUs.

Referring again to FIG. 22, the subset of possible SKUs created in step 660 can be used in step 664 by the computer 40 to choose between the expected SKU, the inferred SKU from step 656, and the SKUs derived from the Image Similarity Technique step 658. In other words, the subset of possible SKUs created in step 660 (text classification) may include only one of the SKUs from step 656, step 658, and the expected SKU 662. If so, the computer 40 associates the package 20 with that SKU. If the subset of SKUs from step 660 (text classification) includes more than one of the SKUs from step 656, step 658, and the expected SKU 662, then the computer 40 does not use the text matching, but instead associates the package 20 with SKU with the highest confidence level from step 656 and step 658. Alternatively, the computer 40 associates the package 20 with SKU with the highest confidence level from step 656 and step 658, but only among such SKUs that were not excluded by the text classification results.

Figure 24:
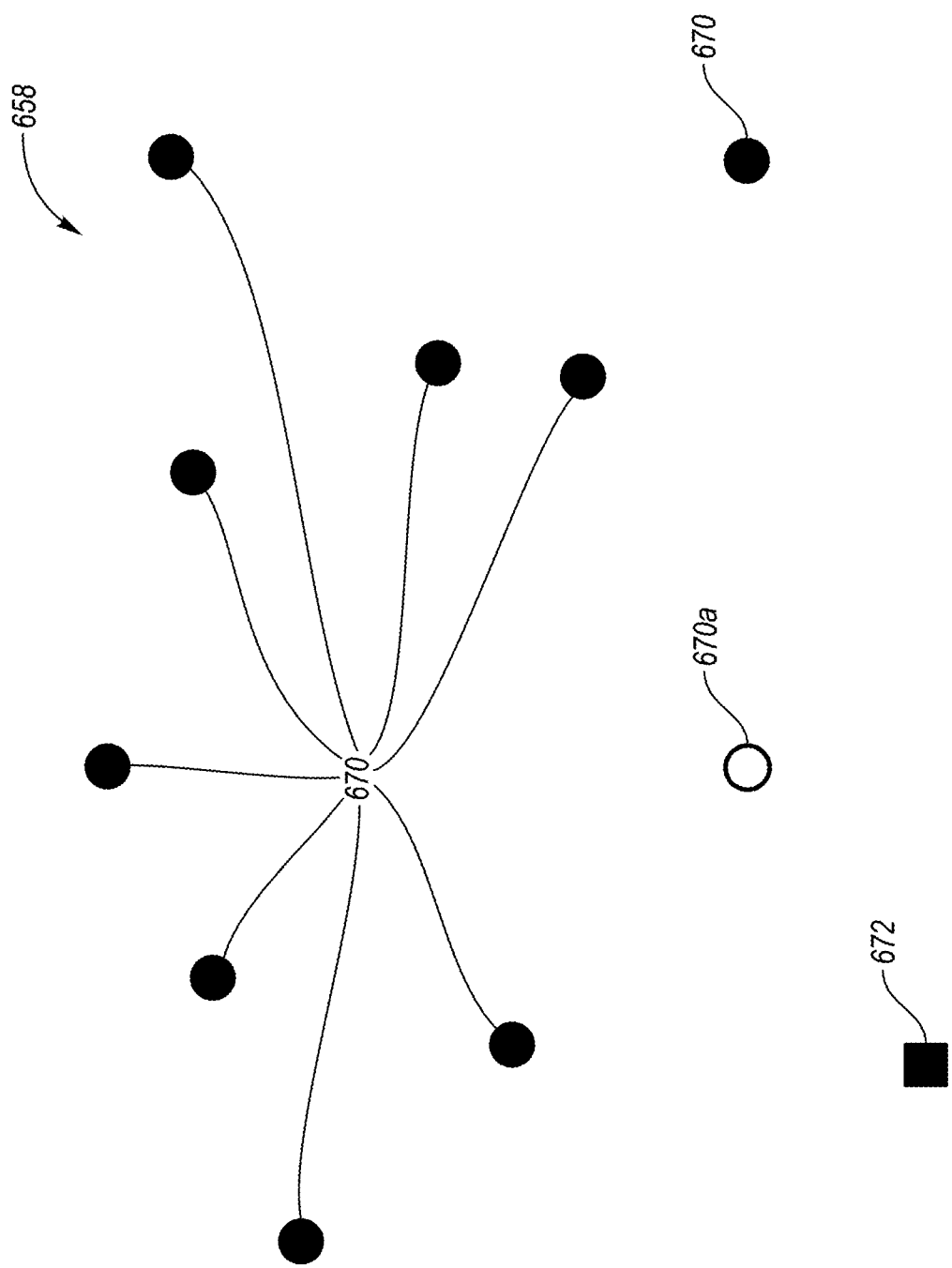
FIG. 24 illustrates the SupCon and Nearest Neighbor method of FIG. 22 identifying a known SKU.
Figure 26:
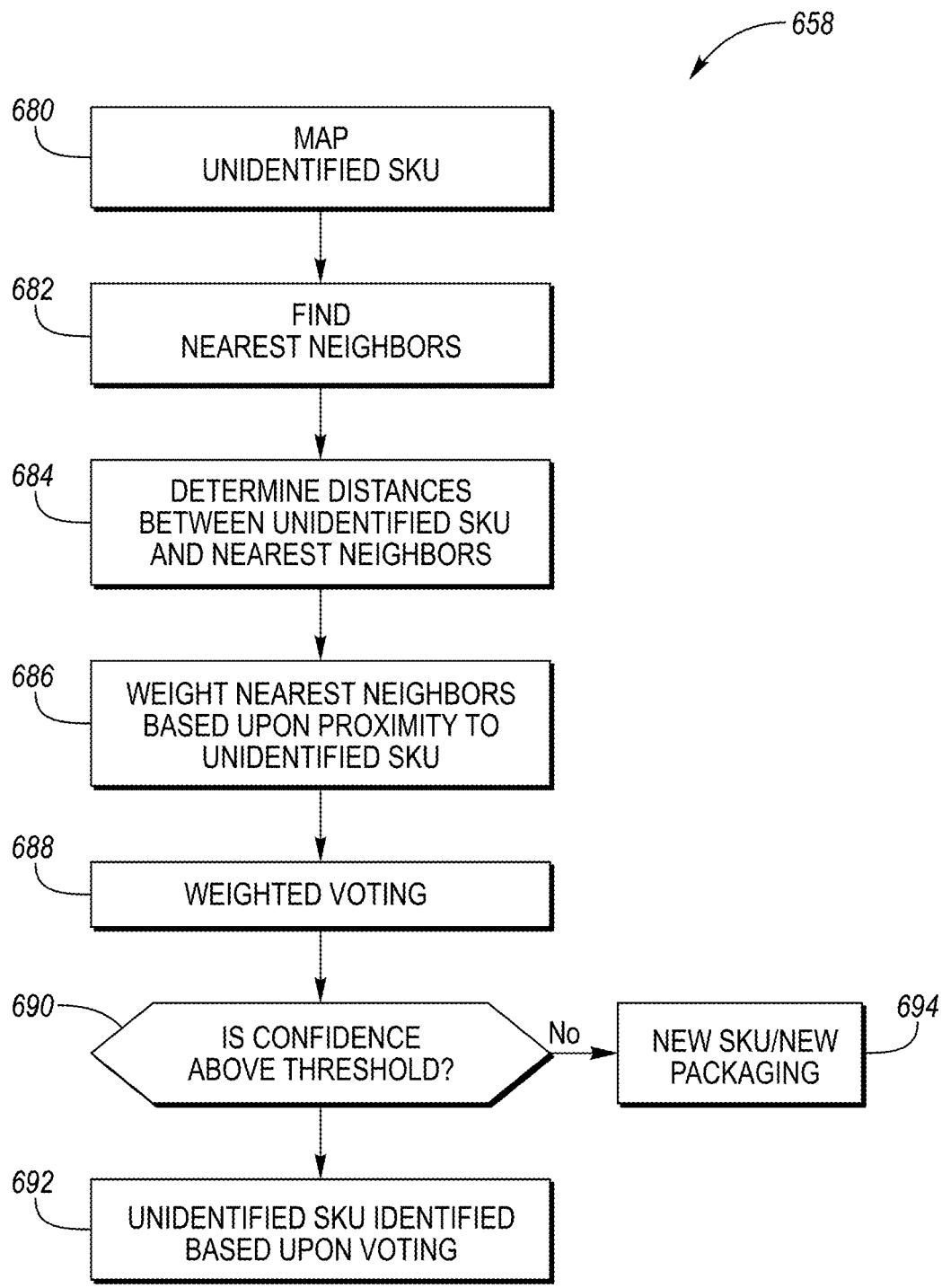
FIG. 26 is a flowchart of one example method for the SupCon and Nearest Neighbor method.

FIG. 24 illustrates one example Image Similarity Technique method that can be used in step 658 for a known SKU whose packaging has not changed (i.e. the machine learning models 56 have been trained with images of that SKU with that packaging). FIG. 26 is a flowchart of one example method for the Image Similarity Technique used in step 658.

FIG. 24 shows a two-dimensional representation of multiple outputs of the computer 40 analyzing images of a package face using the machine learning models 56. In practice, there would be many more dimensions (e.g. dozens or hundreds). Distances between points are calculated with respect to those many dimensions, but for ease of illustration, only two dimensions are shown.

The shaded shapes are known SKUs, i.e. the output based upon an image that was known to be a certain SKU. White shapes are as-yet unidentified SKUs.

The circles are outputs based upon images known to be a first SKU 670. The square is an output based upon an image known to be a second SKU 672 (i.e. different from the first SKU 670). The white circle is an output based upon an image of a package 20 with an as-yet unidentified SKU 670*a*.

In step 680 (FIG. 26), the computer 40 maps the unidentified SKU 670*a* as shown using an image feature extractor. An image feature extractor analyzes an image using one or more of the machine learning models 56 to generate a many-dimensional number. One type of image feature extraction technique that can be used is Supervised Contrastive Learning (SupCon). Again, in this example the machine learning model(s) 56 has been trained on the packaging that is the same as the package 20 in the image. The output of the image feature extractor (again, SupCon can be used) is the location of SKU 670*a*.

Again, the outputs can be considered multi-dimensional. For ease of illustration, they are shown as two-dimensional, but many more dimensions could be generated as the outputs generated by the computer 40 based upon each image using the machine learning models 56.

The computer 40 then uses a feature similarity technique to compare the output of the unknown SKU 670*a* to the known outputs (including but not limited to the first SKUs 670 and second SKU 672). One feature similarity technique that can be used is a "nearest neighbor technique" as will be described. The computer 40 finds a number of known SKUs that are nearest to the unidentified SKU 670*a* in step 682*a*. The computer 40 calculates a distance between the unidentified SKU 670*a* and a plurality of nearest neighbors in step 684. Again, "distance" is calculated across the dozens or hundreds of dimensions. In this example, the computer 40 finds the ten nearest neighbors, which in this example is nine of the first SKU 670 and one of the second SKU 672 as shown in FIG. 24.

The computer 40 conducts a "vote" of the ten nearest neighbors as to the SKU that should be associated with the unidentified SKU 670a. Each vote is weighted based upon proximity to the unidentified SKU 670a, i.e. the closer the neighbor is, the more heavily that neighbor's vote is weighted, in step 686. The computer 40 then tallies the weighted votes of the Nearest Neighbors in step 688 and determines a confidence level for that vote. For example, if all of the distances of the Nearest Neighbors are high and/or there are many different SKUs, then the confidence level will be low. If the distances are low and the nearest SKUs are all the same (or mostly the same) SKU, then the confidence level will be high. If the difference between the weighted votes for the highest-vote-receiving SKU and for the second-highest-vote-receiving SKU is high, then the confidence level will be high.

In this case, the unidentified SKU 670a is closest to a second SKU 672 by a little, but the other nine of the ten nearest neighbors are the first SKU 670 (and some are nearly as close). In step 690, the computer 40 determines whether the confidence with which the weighted voting identified a SKU. If the confidence level is above a threshold, then the computer 40 determines the SKU of the previously-unidentified SKU based upon the voting in step 692. In this case, the computer 40 determines that the previously-unidentified SKU 670a is the first SKU (like first SKUs 670) with a fairly high confidence level.

FIG. 25 shows a plurality of known first SKUs 670, a plurality of known second SKUs 672, and an unidentified SKU 674. The ten Nearest Neighbors are four of the first SKU 670 and six of the second SKU 672. The distance between the unidentified SKU 674 and the Nearest Neighbors is greater than a threshold. The confidence level that the unidentified SKU 674 would be the first SKU 670 or the second SKU 672 is below a threshold, e.g. all of the known SKUs are at a great distance from the unidentified SKU. The difference between the weighted votes for the highest-vote-receiving SKU 672 and for the second-highest-vote-receiving SKU 670 is low, so the confidence level will be low. Therefore, in step 694, the computer 40 determines that the package 20 is either associated with a new SKU or the package 20 is associated with a previously known SKU with new packaging.

When a new SKU is added to the computer 40 (i.e. the computer 40 knows to expect the new SKU) but the machine learning models 56 are not yet trained with images of the new SKU, the computer 40 stores an indication that the SKU is new (such as in the text file of FIG. 3). If the computer 40 is expecting a new SKU because it had instructed a pick of a new SKU, the computer 40 can conclude that the unidentified SKU 674 is the new SKU. If the pallet loading and validation system 110 is being implemented as a single flow method, then the computer 40 could assume that the unidentified SKU 674 was picked in response to the instruction to pick the new SKU. However, even in a non-single flow implementation, the computer 40 assumes that the unidentified SKU 674 is the new SKU if the new SKU has been instructed but has not yet been detected by the validation station 32.

If the computer 40 did not instruct a new SKU, but unidentified SKU 674 is still farther away from Nearest Neighbors than a given threshold, then the computer 40 may conclude that the packaging of a previously-known SKU has changed.

Whether the computer 40 concludes that the unidentified SKU 674 is new or is simply a previously known SKU with changed packaging, the computer 40 may practice one or more the methods described above for handling new or changed SKUs in combination with the SupCon and Nearest Neighbor method. For example, the computer 40 may cause the conveyors to stop and then instruct manual or other remedial action. As another example, the computer 40 may use location information about the package 20 to confirm that the unidentified SKU 674 is known to be a new SKU or to confirm that the unidentified SKU 674 is a previously-known SKU, but appears to have new packaging. The computer 40 may instruct the worker to scan a barcode on the package 20, either before placing it on the conveyor (if it is known to be new SKU), or the computer 40 may divert the package back to the worker via the offload conveyor 24e and return conveyor 24f to scan the barcode.

The computer 40, possibly after one or more of these confirmations, may then store the unidentified SKU 674 as a known SKU-either a known new SKU, or another instance of a previously-known SKU (i.e. a known SKU with new packaging). Thus, the computer 40 learns the new or altered SKU. This learned SKU could be used to identify future SKUs using image similarity techniques (e.g. the SupCon and Nearest Neighbor methods). Optionally, the computer 40 may seek confirmation of a few more instances of the new/altered SKU, learn those instances, and make sure they are within a threshold of the first learned SKU before using the learned SKUs as potential Nearest Neighbors. Thus, the pallet loading and validation system 110 can learn SKUs and validate SKUs before the machine learning models 56 have been trained on them. Eventually, the computer 40 has gathered sufficient images of packages determined to be associated with the new or altered SKU to train the machine learning models 56.

As another option, the computer 40 could be trained by adding the validation station 32 to an existing pallet loading system. The computer 40 instructs the user to pick each SKU, one by one, in accordance with one or more pick lists 60. The validation station 32 detects the picked package 20 and captures images from at least one of the plurality of cameras 46 (and again, preferably three). The images are stored in association with the current SKU that was instructed to be picked. In other words, the computer 40 generally assumes that the SKU was picked correctly and labels the images accordingly. The computer generates a numerical output (using an image feature extractor, such as SupCon) based upon each image and associates it with the current SKU. By capturing images of many instances of each SKU, errors will appear as outliers and can be discarded. In other words, the numeral outputs generated based upon each image by the image feature extractor will show correctly-picked packages of the same SKU grouped together within a certain distance from one another while the erroneously-picked packages will be at a much greater distance (and likely near another group of outputs for images of another SKU). Optionally, a sample or a few samples from the set of similar images of each SKU can be verified by a human.

After discarding the outliers, the remaining numerical outputs of known SKUs can be used to identify SKUs of future packages such as by using the above-described image similarity techniques. Additionally, or alternatively, the labeled images remaining after discarding outliers can be used to train the machine learning models 56 (again, there may be a separate package-type machine learning model 56 and a plurality of brand machine learning models 56, as explained above).

Of course, this method would be simpler to implement in a single flow system (i.e. the system instructs the SKUs one at a time and expects a particular sequence). However, the method could also be implemented in a non-single flow system where the computer 40 could deduce the identity of each SKU in a pick list (or even a plurality of pick lists) based upon the quantity of each SKU in the pick list (or the total quantity in a plurality of pick lists in a wave) and matching them to quantities (when unique) of packages that are similar in appearance (e.g. output of one or more machine learning models). This would not be reliable if done for one pick list or one wave, but over the course of a day or a week, because of the sheer volume of pick lists (or waves) the computer would eliminate outliers and find a consensus matching SKU for each group of similar images.

Figure 27:
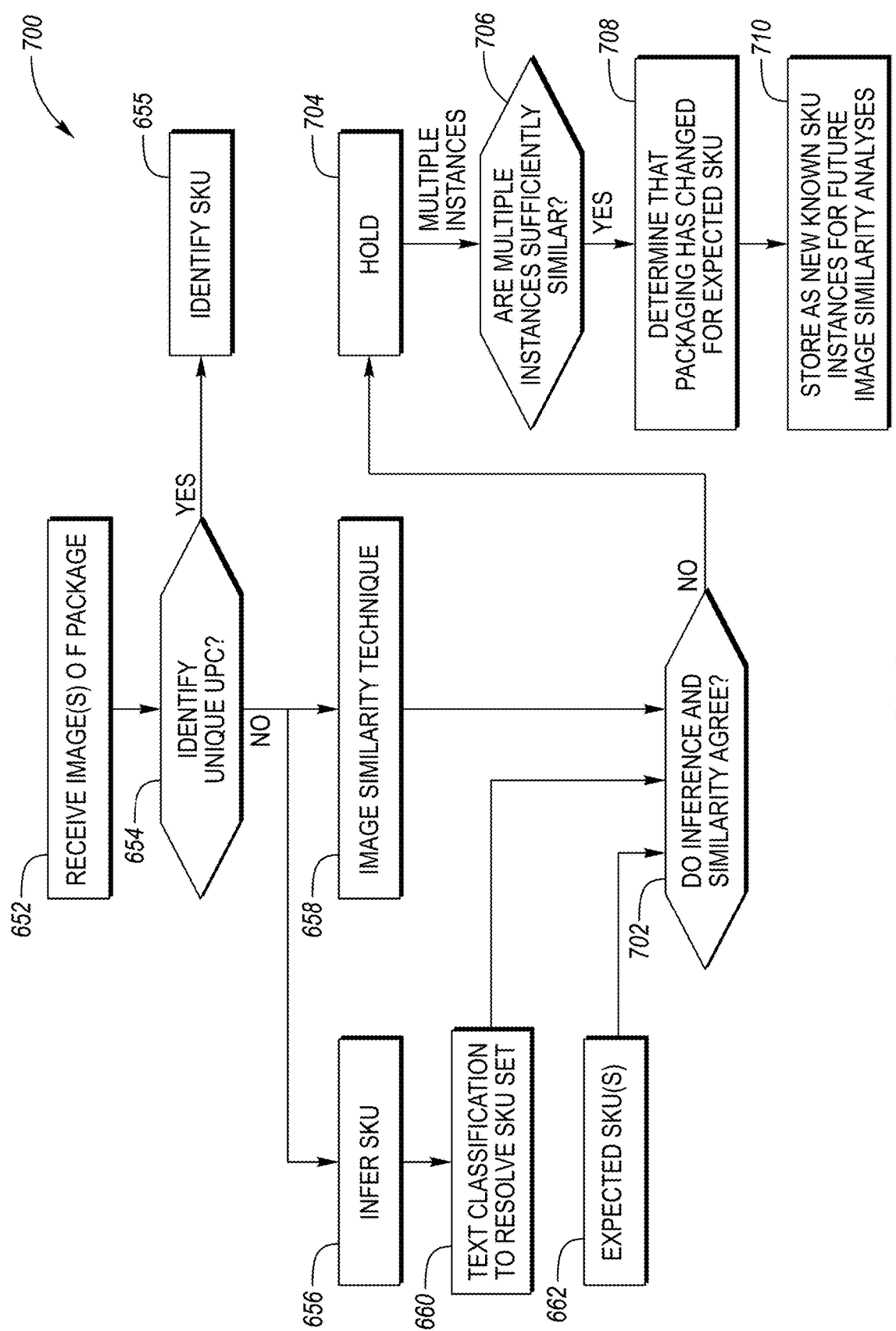
FIG. 27 is a flowchart of an example method for integrating the inference and image similarity analysis techniques.

FIG. 27 is a flowchart of an example method 700 for integrating the inference and image similarity analysis techniques. To the extent that the method steps are the same as the method 650 of FIG. 22, the same reference numerals are used. In step 652, the computer 40 receives at least one image of a package 20. In step 654, the computer 40 first determines whether a UPC can be read from the at least one image of the package 20, and if so, whether that UPC uniquely identifies a SKU. If the computer 40 can identify a UPC that uniquely identifies a SKU in step 654, then the computer 40 associates that SKU with the package 20 and the other steps are not performed.

If the UPC is either not identified or is not uniquely associated with a single SKU, then the computer 40 performs the methods described above using one or more machine learning models to infer a SKU in step 656. The computer 40 also performs an image analysis using Image Similarity Techniques (such as supervised contrastive (SupCon) learning and Nearest Neighbor techniques) in step 658. These were described above.

The computer 40 also performs Optical Character Recognition (OCR) on the image(s) of the package 20 to detect text (and optionally barcodes other than UPC). The computer 40 performs a text classification process in step 660. Optionally, this may also include identifying barcodes other than UPC. In this example, the text classification in step 660 is used to resolve any SKU sets. i.e. the inference cannot reliably distinguish SKUs within a SKU set from one another but the text classification can resolve which of the SKUs within the SKU set is correct, as explained above.

The computer 40 receives one or more expected SKUs 662, e.g. based upon what has been instructed to be picked recently from the pick list and has not yet passed through the validation station 32. There may only be one expected SKU 662 in a single flow configuration or there may be many expected SKUs (up to an entire wave) in other configurations.

In step 702, the computer 40 determines whether the inferred SKU (from step 656 and optionally step 660) is the same as the SKU identified using the image similarity technique in step 658. If not, the computer 40 directs the conveyor system to direct the package 20 to a hold area in step 704. In step 702, the computer 40 may also proceed to step 704 in the event that the image similarity technique performed in step 658 did not identify a SKU with sufficient similarity to the image of package 20 and/or the inferred SKU was not inferred at a sufficiently high confidence level.

If the computer 40 determines that the computer 40 has proceeded to step 704 for multiple instances involving the same expected SKU (e.g. six instances), then the computer 40 determines whether the multiple instances are sufficiently similar to one another, i.e. whether the outputs (using a feature extractor, such as SupCon) of images of multiple packages 20 with the same expected SKU are sufficiently similar using a feature similarity technique, such as nearest neighbor, described above. If so, the computer 708 determines that the packaging for the expected SKU has been changed. In step 710, the computer 40 then stores the outputs of those images as known SKU images for use in future image similarity analyses, Then, when another package 20 with the new packaging is imaged, the image similarity technique of step 658 will determine that the image of the package 20 is sufficiently similar to the images that were stored as a known SKU in step 710. The inference in step 656 may still provide an incorrect inferred SKU, but the high similarity of the image similarity technique of step 658 will override and the SKU will be identified. Eventually, these images can be used to train the models 56 so that the inference of step 656 will also infer the correct SKU for future packages. 20.

In accordance with the provisions of the patent statutes and jurisprudence, exemplary configurations described above are considered to represent preferred embodiments of the inventions. However, it should be noted that the inventions can be practiced otherwise than as specifically illustrated and described without departing from its spirit or scope. Alphanumeric identifiers on method steps are solely for ease in reference in dependent claims and such identifiers by themselves do not signify a required sequence of performance, unless otherwise explicitly specified in the claims.

What is claimed is:

1. A method for identifying a SKU of a package using a computer system having at least one processor, wherein the computer system stores a plurality of pick lists, wherein each pick list indicates a quantity of each of a plurality of desired SKUs to be placed on one of a plurality of pallets, wherein the plurality of desired SKUs are each associated with a package of beverage containers, the method including:
   a) the computer system identifying an initial location of the package;
   b) taking at least one image of a package on a conveyor;
   c) receiving the at least one image in the computer system;
   d) based upon the at least one image and based upon the initial location, the computer system determining a SKU associated with the package; and
   e) comparing the SKU determined in step d) with at least one of the plurality of desired SKUs.

2. The method of claim 1 wherein step e) includes comparing the SKU determined in step d) with the plurality of desired SKUs on the plurality of pick lists, the method further including:
   f) based upon the comparison in step e), directing the package toward one of the plurality of pallets.

3. The method of claim 1, the method further including:
   f) based upon the comparison in step e), directing the package toward one of the plurality of pallets;
   g) instructing a pick of a first SKU of the plurality of desired SKUs of the plurality of pick lists, wherein the plurality of pick lists for the plurality of pallets are a first wave;
   h) receiving an instruction to close the first wave without the computer system determining that a package is associated with the first SKU in step d); and
   i) adjusting an invoice associated with one of the plurality of pallets based upon step h).

4. The method of claim 1, the method further including:
f) based upon the comparison in step e), directing the package toward one of the plurality of pallets;
g) instructing a pick of a first SKU of the plurality of desired SKUs of the plurality of pick lists, wherein the plurality of pick lists for the plurality of pallets are a first wave;
h) after step g), receiving an instruction from a user to skip the pick of the first SKU;
i) after step h), instructing a pick of a second SKU of the plurality of desired SKUs of the plurality of pick lists, wherein the first SKU is different from the second SKU; and
j), instructing the pick of the first SKU.

5. The method of claim 1 wherein step a) is performed by an imaging system including at least one camera, the method further including:
f) based upon the comparison in step e), directing the package to an area proximate the conveyor upstream of the imaging system.

6. The method of claim 1 wherein step d) includes the computer system inferring the SKU associated with the package using at least one machine learning model, wherein the computer system includes at least one non-transitory computer-readable media storing the at least one machine learning model, wherein the at least one machine learning model is trained with a plurality of images of packages of beverage containers.

7. The method of claim 1 wherein the computer system includes at least one non-transitory computer-readable media storing at least one machine learning model, wherein the at least one machine learning model is trained with a plurality of images of packages of beverage containers and wherein the method includes:
f) the computer system inferring the SKU associated with the package using the at least one machine learning model;
g) the computer system analyzing the at least one image using text matching;
h) the computer system analyzing the at least one image using supervised contrastive learning and nearest neighbor methods; and
i) the computer system determining the SKU associated with the package in step d) based upon at least one of step f) or step g) or step h).

8. The method of claim 7 wherein step g) includes using a decision forest.

9. A computing system for identifying a SKU of a package of beverage containers comprising:
at least one processor; and
at least one non-transitory computer-readable media storing:
at least one machine learning model that has been trained with a plurality of images of packages of beverage containers; and
instructions that, when executed by the at least one processor, cause the computing system to perform the following operations:
a) receiving at least one image of a package on a conveyor, wherein the package is a package of beverage containers;
b) receiving an initial location of the package;
c) after operation b), identifying a SKU associated with the package based upon the initial location and based upon the at least one image using the at least one machine learning model; and d) comparing the SKU identified in step c) to at least one desired SKU.

10. The computing system of claim 9 wherein the computing system stores a plurality of pick lists, wherein each pick list indicates a quantity of each of a plurality of desired SKUs to be placed on one of a plurality of pallets, wherein operation d) includes comparing the SKU identified in step c) with at least one of the plurality of desired SKUs, wherein the operations further include:
e) based upon the comparison in operation d), directing the package toward one of the plurality of pallets.

11. The computing system of claim 10 wherein the operations further include:
f) instructing a pick of a first desired SKU of the plurality of desired SKUs of the plurality of pick lists, wherein the plurality of pick lists for the plurality of pallets are a first wave;
g) receiving an instruction to close the first wave without the computing system having determined that a package is associated with the first desired SKU in operation d); and
h) adjusting an invoice associated with one of the plurality of pallets based upon operation g).

12. The computing system of claim 10 wherein the operations further include:
f) instructing a pick of a first desired SKU of the plurality of desired SKUs of the plurality of pick lists, wherein the plurality of pick lists for the plurality of pallets are a first wave;
g) after operation f), receiving an instruction from a user to skip the pick of the first desired SKU;
h) after operation g), instructing a pick of a second desired SKU of the desired SKUs of the plurality of pick lists; and
i) after operation h), instructing the pick of the first SKU.

13. A validation system including the computing system of claim 9, the validation system further including an imaging system including at least one camera, the operations further including:
e) based upon the comparison in operation d), directing the package to an area proximate the conveyor upstream of the imaging system.

14. The computing system of claim 10 wherein the initial location of the package in step b) is the initial location of the package prior to being placed on the conveyor.

15. The computing system of claim 10 wherein the initial location of the package is determined based upon at least one initial image.

16. The computing system of claim 9 wherein operation c) further includes inferring a plurality of classifications each at a confidence level, analyzing the at least one image to detect text, and augmenting the confidence level of at least one of the plurality of classifications based upon the detected text, wherein a size of the augmentation is based upon a number of classifications with which the detected text is associated.

17. The computing system of claim 9 wherein the at least one image is a plurality of images and wherein operation c) includes:
e) determining at least one classification independently based upon each of the plurality of images; and
f) identifying the SKU associated with the package based upon the classifications determined in step e);
wherein operation e) includes inferring the at least one classification independently based upon each of the plurality of images using the at least one machine learning model.

18. A computing system for identifying a SKU of a package of beverage containers comprising:
at least one processor; and
at least one non-transitory computer-readable media storing:
instructions that, when executed by the at least one processor, cause the computing system to perform the following operations:
a) receiving a plurality of overhead images of a package as it picked and placed on a conveyor;
b) determining a location of the package in at least one of the plurality of images;
c) identifying a SKU associated with the package based upon the location; and
d) comparing the SKU identified in step c) to at least one desired SKU on at least one picklist.

19. The computing system of claim 18 further including:
e) directing the package toward one of a plurality of final conveyors based upon the comparison of step d).

20. The computing system of claim 19 further including an overhead camera configured to generate the plurality of images.

21. The computing system of claim 19 wherein the at least one non-transitory computer-readable media further stores at least one machine learning model trained with images of packages of beverage containers and wherein the operations further include:
f) receiving at least one package image of the package;
g) generating an output based upon the at least one package image using the at least one machine learning model; and
h) using the output to identify an associated SKU of a subsequent package.

22. A method for identifying a SKU of a package using a computer system having at least one processor, the method including:
a) instructing a pick of a first desired SKU of a plurality of desired SKUs on a pick list, wherein the first desired SKU has an appearance unknown to the computer system;
b) receiving at least one image of a package in the computer system, wherein the package is a package of beverage containers;
c) the computer system generating an output based upon the at least one image using an image feature extractor;
d) the computer system comparing the output of step c) to a plurality of known outputs each having an associated known SKU using a feature similarity technique;
e) based upon step d), the computer system determining that a SKU of the package is different from the known SKUs associated with the plurality of known outputs;
f) the computer system instructing a user to scan a barcode on the package based upon step e);
g) based upon step e) and step f), the computer system determining that the SKU of the package is the first desired SKU; and
h) based upon step g) the computer system diverting the package.

23. The method of claim 22 wherein in step d) the computer system performs a nearest neighbor technique and weighs each of a plurality of known outputs based upon a distance of each of the plurality of known outputs to the output of step c).

24. The method of claim 22 wherein the package is a first package and the output is a first output, the method further including:
i) after step g), receiving at least one image of a second package in the computer system;
j) the computer system generating a second output based upon the at least one image of the second package using the image feature extractor;
k) the computer system comparing the second output of step j) to the plurality of known outputs and the first output using the feature similarity technique;
l) based upon step k), the computer system determining that a SKU of the second package is the first desired SKU; and
m) based upon step l), the computer system diverting the second package.

25. A method for identifying a SKU of a package using a computer system having at least one processor, the method including:
a) instructing a pick of a first desired SKU of a plurality of desired SKUs on a pick list, wherein the first desired SKU has an expected appearance in the computer system;
b) receiving at least one image of a package in the computer system, wherein the package is a package of beverage containers;
c) the computer system generating an output based upon the at least one image using an image feature extractor;
d) the computer system comparing the output of step c) to a plurality of known outputs each having an associated known SKU using a feature similarity technique;
e) based upon step d), the computer system determining distances between the output and the plurality of known outputs;
f) based upon step a) and step e) the computer system determining that the SKU of the package is the first desired SKU, but that an appearance of the first desired SKU has changed; and
g) based upon step f), the computer system diverting the package.

26. The method of claim 25 wherein in step f) the computer system performs a nearest neighbor technique and weighs each of a plurality of known outputs based upon the distance of each of the plurality of known outputs to the output of step c).

27. The method of claim 25 wherein the computer system instructs a user to scan a barcode on the package based upon step e).

* * * * *